United States Patent
Chen

(10) Patent No.: US 12,231,288 B2
(45) Date of Patent: Feb. 18, 2025

(54) SYSTEM AND METHOD FOR BORDER GATEWAY PROTOCOL (BGP) CONTROLLED NETWORK RELIABILITY

(71) Applicant: Huawei Technologies Co., Ltd., Shenzhen (CN)

(72) Inventor: Huaimo Chen, Bolton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 384 days.

(21) Appl. No.: 17/890,088

(22) Filed: Aug. 17, 2022

(65) Prior Publication Data

US 2022/0393936 A1 Dec. 8, 2022

Related U.S. Application Data

(63) Continuation of application No. PCT/US2020/064888, filed on Dec. 14, 2020.
(Continued)

(51) Int. Cl.
*H04L 41/0654* (2022.01)
*H04L 45/02* (2022.01)
(Continued)

(52) U.S. Cl.
CPC .......... *H04L 41/0654* (2013.01); *H04L 45/02* (2013.01); *H04L 45/58* (2013.01); *H04L 67/141* (2013.01)

(58) Field of Classification Search
None
See application file for complete search history.

(56) References Cited

U.S. PATENT DOCUMENTS 9,660,897 B1 5/2017 Gredler
2014/0281669 A1* 9/2014 DeCusatis ........... H04L 41/0695
714/4.11

(Continued)

FOREIGN PATENT DOCUMENTS

| CN | 104468236 A | 3/2015 |
| CN | 108881059 A | 11/2018 |
| CN | 109936505 A | 6/2019 |

OTHER PUBLICATIONS

K. Talaulikar, Ed. et al., Distribution of Link-State and Traffic Engineering Information Using BGP, draft-ietf-idr-rfc7752bis-02, Nov. 1, 2019, 59 pages.

*Primary Examiner* — Hong S Cho
(74) *Attorney, Agent, or Firm* — Conley Rose, P.C.

(57) ABSTRACT

A method implemented by a first controller in a network comprising a cluster of controllers including the first controller and a second controller, the method comprises transmitting, to a network element (NE), a first BGP message comprising a first controllers network layer reachability information (NLRI), the first controllers NLRI carrying a position of the first controller relative to other controllers in the cluster of controllers, receiving, from the NE, a second BGP message comprising a second controllers NLRI, the second controllers NLRI carrying a position of the second controller relative to the other controllers in the cluster of controllers, and determining the primary controller from the cluster of controllers based on the position of the first controller and the position of the second controller, with the primary controller being responsible for controlling the network.

20 Claims, 31 Drawing Sheets

Related U.S. Application Data

(60) Provisional application No. 62/978,099, filed on Feb. 18, 2020.

(51) Int. Cl.
  *H04L 45/58* (2022.01)
  *H04L 67/141* (2022.01)

(56) References Cited

U.S. PATENT DOCUMENTS

| | | |
|---|---|---|
| 2014/0371880 A1 | 12/2014 | Lee et al. |
| 2017/0093646 A1 | 3/2017 | Chanda et al. |
| 2017/0257228 A1* | 9/2017 | Chen ............... H04L 45/38 |
| 2018/0091366 A1* | 3/2018 | Muniswamy ......... H04L 41/044 |
| 2019/0104061 A1 | 4/2019 | Zhang et al. |

* cited by examiner

450

```
 0                   1                   2                   3
 0 1 2 3 4 5 6 7 8 9 0 1 2 3 4 5 6 7 8 9 0 1 2 3 4 5 6 7 8 9 0 1 2
```

| Par. Type 451 | Par. Length 452 |

Triples for Multiple Capabilities
(including Controllers Capability Triple 400 or 425)

Capability Optional Parameter

Version 476

My Autonomous System 477

Hold Time 478

BGP Identifier 479

Par. Length 480

Optional Parameters
(including Capability Optional Parameter 450)

OPEN Message with Capability Optional Paramaters

FIG. 4D

| 0 | | | | | | | | | | 1 | | | | | | | | | | 2 | | | | | | | | | | 3 | | |
|---|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 |

Type 511 / Length 512

Flags 513 | C | Position 515 | NoControllers 516 | OldPosition 517

Reserved 518 | Priority 519

Connected Controller 1 ID 520A
.
.
.
Connected Controller N ID 520N

Controllers NLRI

600

MP_REACH_NLRI

610

MP_UNREACH_NLRI

Unreach Controllers NLRI in the MP_UNREACH_NLRI

140B

```
 0                   1                   2                   3
 0 1 2 3 4 5 6 7 8 9 0 1 2 3 4 5 6 7 8 9 0 1 2 3 4 5 6 7 8 9 0 1 2
```

| BGP Message Common Header (with Type for BGP UPDATE) 700B |
|---|
| Withdrawn Routes Length 753 |
| Withdrawn Routes 756 |
| Path Attributes Length 759 |
| Path Attributes 762 including<br>MP_REACH_NLRI 600 with Controllers NLRI 510 or<br>MP_UNREACH_NLRI 610 with Unreach Controllers NLRI 615 |

BGP UPDATE Message with Controllers NLRI

800 ↘

```
 0                   1                   2                   3
 0 1 2 3 4 5 6 7 8 9 0 1 2 3 4 5 6 7 8 9 0 1 2 3 4 5 6 7 8 9 0 1 2
```

| Type 511 | | | Length 512 | |
|---|---|---|---|---|
| Flags 513 | 1 | Position 515 = 1 | NoControllers 516 = 2 | OldPosition 517 = 1 |
| Reserved 518 | | | | Priority 519 |
| Connected Controller ID 520A | | | | |
| Connected Controller ID 520B | | | | |

514 points to the Flags/Position/NoControllers/OldPosition row.

Controllers NLRI Sent from Controller 109A

| Type 511 | | | Length 512 | |
|---|---|---|---|---|
| Flags 513 | 0 | Position 515 = 2 | NoControllers 516 = 2 | OldPosition 517 = 2 |
| Reserved 518 | | | | Priority 519 |
| Connected Controller ID 520A | | | | |
| Connected Controller ID 520B | | | | |

Controllers NLRI Sent from Controller 109B

FIG. 8C

Controllers NLRI Sent from Controller 109A

Controllers NLRI Sent from Controller 109B

Controllers NLRI Sent from Controller 109B after Controller 109A Fails

Controllers NLRI Sent from Controller 109B after Controller 109B becomes the Primary Controller Controllers NLRI Sent from Controller 109A Controllers NLRI Sent from Controller 109B Controllers NLRI Sent from Controller 109A after Detecting Failures Controllers NLRI Sent from Controller 109B after Detecting Failures Controllers NLRI Sent from Controller 109C after Detecting Failures Controllers NLRI Sent from Controller 109B after Detecting Failures Controllers NLRI Sent from Controller 109B after Becoming the Primary Controller of the Entire Controller Cluster Network

SYSTEM AND METHOD FOR BORDER GATEWAY PROTOCOL (BGP) CONTROLLED NETWORK RELIABILITY

CROSS-REFERENCE TO RELATED APPLICATIONS

The present application is a continuation of International Patent Application PCT/US2020/064888 filed Dec. 14, 2020 by Futurewei Technologies, Inc., and titled "System and Method for Border Gateway Protocol (BGP) Controlled Network Reliability," which claims the benefit of U.S. Provisional Patent Application No. 62/978,099 filed Feb. 18, 2020 by Huaimo Chen, and titled "System and Method for BGP Controlled Network Reliability," which is hereby incorporated by reference.

TECHNICAL FIELD

The present disclosure is generally related to network communications, and in particular, to various systems and methods for increasing the reliability of one or more controllers in a network implementing BGP (Border Gateway Protocol).

BACKGROUND

BGP is a protocol that manages the transmission of packets across the Internet through the exchange of routing and reachability information between edge network elements (NEs), such as routers, positioned within a communications system. BGP directs packets between autonomous systems (ASs), or networks managed by a single enterprise or service provider. BGP offers network stability guaranteeing that network elements (NEs) can quickly adapt to send packets through another reconnection when a particular path fails. An NE implementing BGP performs routing decisions based on paths, rules, or network policies configured by a network administrator.

In a network implemented as a software defined network (SDN), a controller cluster operates to control all the NEs in the network by communicating with one or more NEs in the network. A controller cluster includes two or more controllers, in which a single controller is elected as the primary controller that controls the NEs in the network. The primary controller receives information from the NEs in the network through a BGP session and sends the information to the other controllers in the controller cluster. In these networks, the reliability and availability of the network is heavily dependent on the proper functioning of the controllers and connections in the controller cluster. Any issues or failures that arise in the controller cluster will severely impact the functioning and reliability of the NEs in the network.

SUMMARY

According to a first aspect of the present disclosure, there is provided a method implemented by a first controller in a network comprising a cluster of controllers including the first controller and a second controller. The method comprises establishing a border gateway protocol (BGP) session with a network element (NE) in the network, transmitting, to the NE, a first BGP message comprising a first controllers network layer reachability information (NLRI), the first controllers NLRI carrying an identifier (ID) of each controller in the cluster of controllers, the first controllers NLRI also carrying a position of the first controller relative to other controllers in the cluster of controllers based on an order of priority, receiving, from the NE, a second BGP message comprising a second controllers NLRI, the second controllers NLRI carrying the ID of each controller in the cluster of controllers, the second controllers NLRI carrying a position of the second controller relative to the other controllers in the cluster of controllers based on the order of priority, and determining the primary controller from the cluster of controllers based on the position of the first controller carried in the first controllers NLRI and the position of the second controller carried in the second controllers NLRI, with the primary controller being responsible for controlling the network.

Optionally, in a first implementation according to the first aspect, the first BGP message comprises at least one of a flag indicating whether the first controller is the primary controller of the network, the position of the first controller, an old position of the first controller, a quantity of controllers in the cluster of controllers, and a priority of the first controller relative to other controllers in the cluster of controllers.

Optionally, in a second implementation according to the first aspect or any other implementation of the first aspect, the second BGP message comprises at least one of a second flag indicating whether the second controller is the primary controller of the network, the position of the second controller, an old position of the second controller, a quantity of controllers in the cluster of controllers, and a priority of the second controller relative to other controllers in the cluster of controllers.

Optionally, in a third implementation according to the first aspect or any other implementation of the first aspect, establishing the BGP session with the NE comprises establishing a plurality of BGP sessions with a plurality of NEs in the network to create a plurality of control channels, the plurality of NEs including the NE, and separately establishing a BGP with extensions session with the NE to create an information channel.

Optionally, in a fourth implementation according to the first aspect or any other implementation of the first aspect, establishing the BGP session with the NE comprises establishing a plurality of BGP sessions with a plurality of NEs in the network to create a plurality of control channels, the plurality of NEs excluding the NE, and establishing a BGP with extensions session with the NE to create an information channel.

Optionally, in a fifth implementation according to the first aspect or any other implementation of the first aspect, establishing the BGP session with the NE comprises sending, to the NE, a first OPEN message with a high availability support capability triple, the high availability support capability triple comprising a flag indicating that the first controller is a controller, and receiving, from the NE, a second OPEN message with a high availability support capability triple, the high availability support capability triple comprising a flag indicating that the NE is a node in the network.

Optionally, in a sixth implementation according to the first aspect or any other implementation of the first aspect, the high availability support capability triple in the first OPEN message is carried in an optional parameter of the first OPEN message, and wherein the high availability support capability triple in the second OPEN message is carried in an optional parameter of the second OPEN message.

Optionally, in a seventh implementation according to the first aspect or any other implementation of the first aspect, the first BGP message comprises a first controllers address family identifier (AFI), a first controllers sub-address family identifier (SAFI), and the first controllers NLRI, wherein the second BGP message comprises a second controllers AFI, a second controllers SAFI, and the second controllers NLRI.

Optionally, in an eighth implementation according to the first aspect or any other implementation of the first aspect, the first BGP message is encoded as a BGP UPDATE, wherein the first controllers NLRI is carried in a first path attributes field of the first BGP message, wherein the second BGP message is encoded as a BGP UPDATE, and wherein the second controllers NLRI is carried in a second path attributes field of the second BGP message.

Optionally, in a ninth implementation according to the first aspect or any other implementation of the first aspect, the method further comprises determining whether the second controller has failed in response to receiving an indication that the second controller has failed from the NE or in response to determining that a BGP message has not been received from the secondary controller for a predetermined period of time, electing the first controller to be the primary controller of the network in response to the second controller having failed, and sending, to the NE, a third BGP message comprising a third controllers NLRI indicating that the first controller is the primary controller of the network.

Optionally, in a tenth implementation according to the first aspect or any other implementation of the first aspect, the cluster of controllers comprises a plurality of controllers including the first controller and the second controller, and wherein the method further comprises determining that at least one failure has occurred within the cluster of controllers to create a first group of controllers and a second group of controllers within the cluster of controllers, and determining that the first controller is coupled to the first group of controllers excluding the second controller, the second controller being coupled to the second group of controllers excluding the first controller.

Optionally, in an eleventh implementation according to the first aspect or any other implementation of the first aspect, the first group of controllers has a first quantity of controllers, wherein the second group of controllers has a second quantity of controllers, and wherein the method further comprises determining that the first controller from the first group of controllers is an intent primary controller of the first group of controllers based on an old position of the first controller or a priority of the first controller relative to other controllers in the first group of controllers, sending a third BGP message indicating a status of the first group of controllers to the NE, the third BGP message comprising a quantity of controllers in the first group of controllers, the old position of the first controller, and the priority of the first controller, and receiving a fourth BGP message indicating a status of the second group of controllers from the NE, the fourth BGP message indicating that the second controller is an intent primary controller of the second group of controllers, the fourth BGP message comprising a quantity of controllers in the second group of controllers, an old position of the second controller, and a priority of the second controller relative to other controllers in the second group of controllers.

Optionally, in a twelfth implementation according to the first aspect or any other implementation of the first aspect, the method further comprises electing the first controller to be the primary controller of the network based on a quantity of controllers in each of the first group of controllers and the second group of controllers, a highest old position of the first controller or the second controller, or a highest priority of the first controller or the second controller.

Optionally, in a thirteenth implementation according to the first aspect or any other implementation of the first aspect, the cluster of controllers further includes a third controller, wherein the method further comprises receiving a third BGP message comprising a third controllers NLRI, the third controllers NLRI carrying the ID of each controller in the cluster of controllers, the third controllers NLRI carrying a position of a second controller relative to the other controllers in the cluster of controllers based on the order of priority, and wherein the primary controller is determined based on the position of the first controller carried in the first controllers NLRI, the position of the second controller carried in the second controllers NLRI, and the position of the third controller carried in the third controllers NLRI.

According to a second aspect of the present disclosure, there is provided a method by a network element (NE) in a network comprising a cluster of controllers. The method comprises establishing a first border gateway protocol (BGP) session with a primary controller of the network, establishing a second BGP session with a secondary controller of the network, the cluster of controllers comprising the primary controller and the secondary controller, with the primary controller being responsible for controlling the network, receiving a BGP message from the primary controller, the BGP message comprising a controllers network layer reachability information (NLRI) indicating that the BGP message is sent by the primary controller, the controllers NLRI carrying a position of the primary controller relative to other controllers in the cluster of controllers and an identifier (ID) of each controller in the cluster of controllers, and forwarding the BGP message to the secondary controller.

Optionally, in a first implementation according to the second aspect, the BGP message comprises at least one of a flag indicating that the primary controller controls the network, the position of the primary controller relative to other controllers in the cluster of controllers, an old position of the primary controller, a quantity of controllers in the cluster of controllers, and a priority of the primary controller relative to other controllers in the cluster of controllers.

Optionally, in a second implementation according to the second aspect or any other implementation of the second aspect, establishing the first BGP session with the primary controller comprises sending, to the primary controller, a first OPEN message with a high availability support capability triple, the high availability support capability triple comprising a flag indicating that the NE is a node in the network, and receiving, from the primary controller, a second OPEN message with a high availability support capability triple, the high availability support capability triple comprising a flag indicating that the primary controller is a controller in the network.

Optionally, in a third implementation according to the second aspect or any other implementation of the second aspect, the high availability support capability triple in the first OPEN message is carried in an optional parameter of the first OPEN message, and wherein the high availability support capability triple in the second OPEN message is carried in an optional parameter of the second OPEN message.

Optionally, in a second implementation according to the second aspect or any other implementation of the second aspect, the method further comprises detecting a failure of the primary controller, and sending a second BGP message comprising a third controllers NLRI indicating that the primary controller has failed to the secondary controller, the second BGP message instructing the secondary controller to withdraw information regarding the primary controller from a status database.

According to a third aspect of the present disclosure, there is provided a first controller implemented in a network comprising a cluster of controllers including the first controller and a second controller. The first controller comprises a memory configured to store instructions, and a processor coupled the memory and configured to execute the instructions, which cause the first controller to be configured to establish a border gateway protocol (BGP) session with a network element (NE) in the network, transmit, to the NE, a first BGP message comprising a first controllers network layer reachability information (NLRI), the first controllers NLRI carrying an identifier (ID) of each controller in the cluster of controllers, the first controllers NLRI also carrying a position of the first controller relative to other controllers in the cluster of controllers based on an order of priority, receive, from the NE, a second BGP message comprising a second controllers NLRI, the second controllers NLRI carrying the ID of each controller in the cluster of controllers, the second controllers NLRI carrying a position of the second controller relative to the other controllers in the cluster of controllers based on the order of priority, and determine the primary controller from the cluster of controllers based on the position of the first controller carried in the first controllers NLRI and the position of the second controller carried in the second controllers NLRI, with the primary controller being responsible for controlling the network.

Optionally, in a first implementation according to the third aspect, the first BGP message comprises at least one of a flag indicating whether the first controller is the primary controller of the network, the position of the first controller, an old position of the first controller, a quantity of controllers in the cluster of controllers, and a priority of the first controller relative to other controllers in the cluster of controllers.

Optionally, in a second implementation according to the third aspect or any other implementation of the third aspect, the second BGP message comprises at least one of a second flag indicating whether the second controller is the primary controller of the network, the position of the second controller, an old position of the second controller, a quantity of controllers in the cluster of controllers, and a priority of the second controller relative to other controllers in the cluster of controllers.

Optionally, in a third implementation according to the third aspect or any other implementation of the third aspect, the instructions further cause the first controller to be configured to establish a plurality of BGP sessions with a plurality of NEs in the network to create a plurality of control channels, the plurality of NEs including the NE, and separately establish a BGP with extensions session with the NE to create an information channel.

Optionally, in a fourth implementation according to the third aspect or any other implementation of the third aspect, the instructions further cause the first controller to be configured to establish a plurality of BGP sessions with a plurality of NEs in the network to create a plurality of control channels, the plurality of NEs excluding the NE, and establish a BGP with extensions session with the NE to create an information channel.

Optionally, in a fifth implementation according to the third aspect or any other implementation of the third aspect, the instructions further cause the first controller to be configured to send, to the NE, a first OPEN message with a high availability support capability triple, the high availability support capability triple comprising a flag indicating that the first controller is a controller, and receive, from the NE, a second OPEN message with a high availability support capability triple, the high availability support capability triple comprising a flag indicating that the NE is a node in the network.

Optionally, in a sixth implementation according to the third aspect or any other implementation of the third aspect, the high availability support capability triple in the first OPEN message is carried in an optional parameter of the first OPEN message, and wherein the high availability support capability triple in the second OPEN message is carried in an optional parameter of the second OPEN message.

Optionally, in a seventh implementation according to the third aspect or any other implementation of the third aspect, the first BGP message comprises a first controllers address family identifier (AFI), a first controllers sub-address family identifier (SAFI), and the first controllers NLRI, wherein the second BGP message comprises a second controllers AFI, a second controllers SAFI, and the second controllers NLRI.

Optionally, in an eighth implementation according to the third aspect or any other implementation of the third aspect, the first BGP message is encoded as a BGP UPDATE, wherein the first controllers NLRI is carried in a first path attributes field of the first BGP message, wherein the second BGP message is encoded as a BGP UPDATE, and wherein the second controllers NLRI is carried in a second path attributes field of the second BGP message.

Optionally, in a ninth implementation according to the third aspect or any other implementation of the third aspect, the instructions further cause the first controller to be configured to determine whether the second controller has failed in response to receiving an indication that the second controller has failed from the NE or in response to determining that a BGP message has not been received from the secondary controller for a predetermined period of time, elect the first controller to be the primary controller of the network in response to the second controller having failed, and send, to the NE, a third BGP message comprising a third controllers NLRI indicating that the first controller is the primary controller of the network.

Optionally, in a tenth implementation according to the third aspect or any other implementation of the third aspect, the cluster of controllers comprises a plurality of controllers including the first controller and the second controller, and wherein the instructions further cause the first controller to be configured to determine that at least one failure has occurred within the cluster of controllers to create a first group of controllers and a second group of controllers within the cluster of controllers, and determine that the first controller is coupled to the first group of controllers excluding the second controller, the second controller being coupled to the second group of controllers excluding the first controller.

Optionally, in an eleventh implementation according to the third aspect or any other implementation of the third aspect, the first group of controllers has a first quantity of controllers, wherein the second group of controllers has a second quantity of controllers, and wherein the instructions further cause the first controller to be configured to determine that the first controller from the first group of controllers is an intent primary controller of the first group of controllers based on an old position of the first controller or a priority of the first controller relative to other controllers in the first group of controllers, send a third BGP message indicating a status of the first group of controllers to the NE, the third BGP message comprising a quantity of controllers in the first group of controllers, the old position of the first controller, and the priority of the first controller, and receive a fourth BGP message indicating a status of the second group of controllers from the NE, the fourth BGP message indicating that the second controller is an intent primary controller of the second group of controllers, the fourth BGP message comprising a quantity of controllers in the second group of controllers, an old position of the second controller, and a priority of the second controller relative to other controllers in the second group of controllers.

Optionally, in a twelfth implementation according to the third aspect or any other implementation of the third aspect, the instructions further cause the first controller to be configured to elect the first controller to be the primary controller of the network based on a quantity of controllers in each of the first group of controllers and the second group of controllers, a highest old position of the first controller or the second controller, or a highest priority of the first controller or the second controller.

Optionally, in a thirteenth implementation according to the third aspect or any other implementation of the third aspect, the cluster of controllers further includes a third controller, wherein the instructions further cause the first controller to be configured to receive a third BGP message comprising a third controllers NLRI, the third controllers NLRI carrying the ID of each controller in the cluster of controllers, the third controllers NLRI carrying a position of a second controller relative to the other controllers in the cluster of controllers based on the order of priority, and wherein the primary controller is determined based on the position of the first controller carried in the first controllers NLRI, the position of the second controller carried in the second controllers NLRI, and the position of the third controller carried in the third controllers NLRI.

According to a fourth aspect of the present disclosure, there is provided a NE implemented a network comprising a cluster of controllers. The NE comprises a memory configured to store instructions, and a processor coupled to the memory and configured to execute the instructions, which cause the NE to be configured to establish a first border gateway protocol (BGP) session with a primary controller of the network, establish a second BGP session with a secondary controller of the network, the cluster of controllers comprising the primary controller and the secondary controller, with the primary controller being responsible for controlling the network, receive a BGP message from the primary controller, the BGP message comprising a controllers network layer reachability information (NLRI) indicating that the BGP message is sent by the primary controller, the controllers NLRI carrying a position of the primary controller relative to other controllers in the cluster of controllers and an identifier (ID) of each controller in the cluster of controllers, and forward the BGP message to the secondary controller.

Optionally, in a first implementation according to the fourth aspect, the BGP message comprises at least one of a flag indicating that the primary controller controls the network, the position of the primary controller relative to other controllers in the cluster of controllers, an old position of the primary controller, a quantity of controllers in the cluster of controllers, and a priority of the primary controller relative to other controllers in the cluster of controllers.

Optionally, in a second implementation according to the fourth aspect or any other implementation of the fourth aspect, the instructions further cause the NE to be configured to send, to the primary controller, a first OPEN message with a high availability support capability triple, the high availability support capability triple comprising a flag indicating that the NE is a node in the network, and receive, from the primary controller, a second OPEN message with a high availability support capability triple, the high availability support capability triple comprising a flag indicating that the primary controller is a controller in the network.

Optionally, in a third implementation according to the fourth aspect or any other implementation of the fourth aspect, the high availability support capability triple in the first OPEN message is carried in an optional parameter of the first OPEN message, and wherein the high availability support capability triple in the second OPEN message is carried in an optional parameter of the second OPEN message.

Optionally, in a second implementation according to the fourth aspect or any other implementation of the fourth aspect, the instructions further cause the NE to be configured to detect a failure of the primary controller, and send a second BGP message comprising a third controllers NLRI indicating that the primary controller has failed to the secondary controller, the second BGP message instructing the secondary controller to withdraw information regarding the primary controller from a status database.

According to a fifth aspect of the present disclosure, there is provided a first controller implemented in a network comprising a cluster of controllers including the first controller and a second controller, the first controller comprising a means for establishing a border gateway protocol (BGP) session with a network element (NE) in the network, a means for transmitting, to the NE, a first BGP message comprising a first controllers network layer reachability information (NLRI), the first controllers NLRI carrying an identifier (ID) of each controller in the cluster of controllers, the first controllers NLRI also carrying a position of the first controller relative to other controllers in the cluster of controllers based on an order of priority, a means for receiving, from the NE, a second BGP message comprising a second controllers NLRI, the second controllers NLRI carrying the ID of each controller in the cluster of controllers, the second controllers NLRI carrying a position of the second controller relative to the other controllers in the cluster of controllers based on the order of priority, and a means for determining the primary controller from the cluster of controllers based on the position of the first controller carried in the first controllers NLRI and the position of the second controller carried in the second controllers NLRI, with the primary controller being responsible for controlling the network.

According to a sixth aspect of the present disclosure, there is provided a NE implemented in a network comprising a cluster of controllers, the NE comprising a means for establishing a first border gateway protocol (BGP) session with a primary controller of the network, a means for establishing a second BGP session with a secondary controller of the network, the cluster of controllers comprising the primary controller and the secondary controller, with the primary controller being responsible for controlling the network, a means for receiving a BGP message from the primary controller, the BGP message comprising a controllers network layer reachability information (NLRI) indicating that the BGP message is sent by the primary controller, the controllers NLRI carrying a position of the primary controller relative to other controllers in the cluster of controllers and an identifier (ID) of each controller in the cluster of controllers, and a means for forwarding the BGP message to the secondary controller.

For the purpose of clarity, any one of the foregoing embodiments may be combined with any one or more of the other foregoing embodiments to create a new embodiment within the scope of the present disclosure These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 4A-D are diagrams illustrating TLVs used to encode the capability of a controller and an NE according to various embodiments of the disclosure.

FIGS. 8A-C are diagrams showing BGP messages communicated through the controller cluster network before any failures occur to the cluster in the controller cluster network according to various embodiments of the disclosure.

DETAILED DESCRIPTION

It should be understood at the outset that although an illustrative implementation of one or more embodiments are provided below, the disclosed systems and/or methods may be implemented using any number of techniques. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
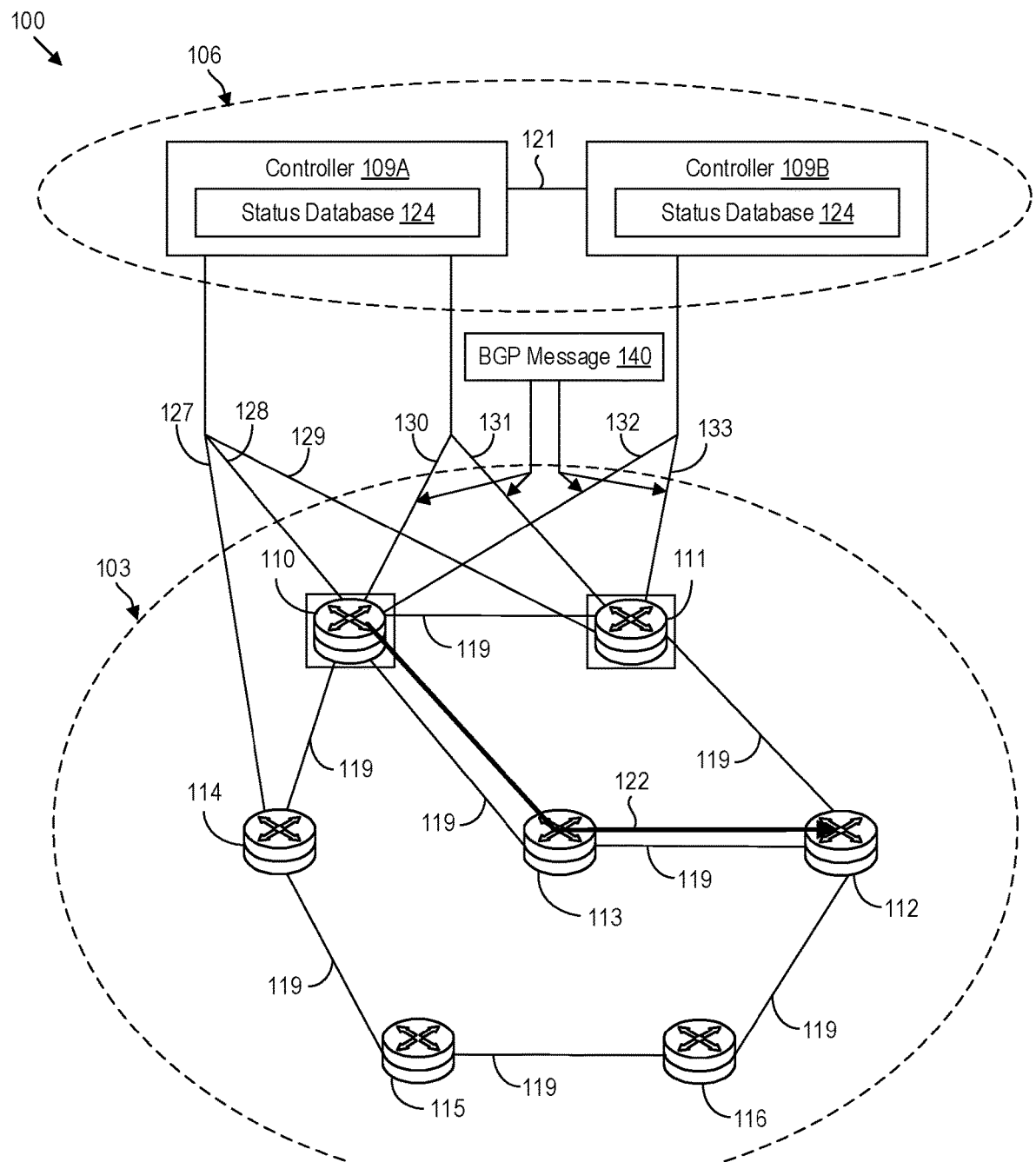
FIG. 1 is a diagram illustrating a controller cluster network configured to implement BGP for network high availability (HA) according to various embodiments of the disclosure.

FIG. 1 is a diagram illustrating a controller cluster network 100 configured to implement BGP for network high availability (HA) according to various embodiments of the disclosure. The controller cluster network 100 includes a network 103 and a cluster 106 of controllers 109A-B.

The controller cluster network 100 includes NEs 110-116 interconnected by links 119. NEs 110-116 may be a physical device, such as a router, a bridge, a virtual machine, a network switch. NEs 110-116 may also be a logical device, such as a virtual machine, configured to perform switching and routing according to various routing protocols. As described herein, NEs 110-116 are configured to implement BGP. BGP is further defined in the Inter-Domain Routing Working Group (IDR WG) Request for Comments (RFC) 4271, entitled "A Border Gateway Protocol 4 (BGP-4)," by Y. Rekhter, et. al., dated January 2006 (hereinafter referred to as "RFC 4271").

Links 119 interconnecting NEs 110-116 may be wired or wireless links, or interfaces interconnecting each of the NEs 110-116. Each of links 119 is configured to forward traffic according to various routing protocols, such as BGP.

The cluster 106 includes at least two controllers 109A and 109B, interconnected by a link 121. While FIG. 1 shows the cluster 106 including two controllers 109A-B, it should be appreciated that the cluster 106 may include any number of controllers 109A-B. Similar to links 119, link 121 may be a wired or wireless link or interface interconnecting controllers 109A and 109B. Link 121 is configured to forward traffic between controllers 109A and 109B.

Each controller 109A-B may be implemented as a central entity that is configured to control the NEs 110-116 in the controller cluster network 100. In an embodiment, each controller 109A-B may be implemented as an SDN controller, which is further described in the IETF RFC 8402 entitled "Segment Routing Architecture," by C. Filsfils, dated July 2018. In another embodiment, each controller 109A-B may be implemented as a Path Computation Element (PCE), which is further described in Internet Engineering Task Force (IETF) Request for Comments (RFC) 8281, entitled "Path Computation Element Communication Protocol (PCEP) Extensions for PCE-Initiated LSP Setup in a Stateful PCE Model," by E. Crabbe, dated December 2017. In another embodiment, each controller 109A-B may be implemented as an Application Layer Traffic Optimization (ALTO) server, which is further described in the IETF RFC 7285, entitled "Application Layer Traffic Optimization (ALTO) Protocol," by R. Alimi, dated September 2014.

In the controller cluster network 100, a single controller 109A-B functions as the primary controller of the controller cluster network 100, which is responsible for controlling and managing NEs 110-116 in the network 103. The other controllers 109A-B that do not function as the primary controller act as backup controllers in controller cluster network 100. To this end, each of the controllers 109A-B in the cluster 106 maintains the same, up-to-date information regarding each of the NEs 110-116 in a status database 124 locally stored at the controller 109A-B. As shown by FIG. 1, controller 109A stores a status database 124 with the most recent information regarding NEs 110-116 in network 103. Similarly, controller 109B stores the same status database 124 with the most recent information regarding NEs 110-116 in network 103.

While the cluster 106 includes multiple controllers 109A-B, the NEs 110-116 view the cluster 106 as a single controller because one or more of the NEs 110-116 only communicate with a single controller, namely, the primary controller. In this way, the NEs 110-116 do not maintain information regarding the different controllers 109A-B within the cluster 106. Instead, NEs 110-116 may only maintain information regarding the link established between one or more of the NEs 110-116 and the primary controller of the controller cluster network 100.

In the example shown in FIG. 1, the controller 109A is the primary controller (sometimes referred to herein as the "primary controller 109A"). The controller 109A establishes a link 127, 128, and 129 with one or more NEs 110-116 in the network 103. The links 127, 128, and 129 may be similar to links 119 and 121, in that the links 127, 128, and 129 may be wired or wireless links or interfaces interconnecting the controller 109A with NEs 114, 110, and 111, respectively.

In FIG. 1, link 127 interconnects the primary controller 109A with NE 114, link 128 interconnects the primary controller 109A with NE 110, and link 129 interconnects the primary controller 109A with NE 111. In the controller cluster network 100, the links 127-129 represent BGP sessions established between the primary controller 109A and NEs 114, 110, and 111. As such, the links 127-129 are also referred to herein as BGP sessions 127-129, respectively.

To establish the BGP sessions 127-129, the primary controller 109A and the NEs 114, 110, and 111 exchange OPEN messages pursuant to RFC 4271. The primary controller 109A sends an OPEN message to the NEs 114, 110, and 111. Each OPEN message includes information used to negotiate and establish a BGP session 127-129 between the primary controller 109A and the NEs 114, 110, and 111. For example, the OPEN messages include a version of BGP that the primary controller 109A is capable of implementing, a BGP identifier, a hold down timer, and one or more optional parameters. Similarly, each of the NEs 114, 110, and 111 sends an OPEN message to the primary controller 109A. The OPEN messages sent by the NEs 114, 110, and 111 include information used to negotiate and establish a BGP session 127-129 between the primary controller 109A and the NEs 114, 110, and 111. For example, the OPEN messages include a version of BGP that the respective NE 114, 110, and 111 is capable of implementing, a BGP identifier, a hold down timer, and one or more optional parameters. When the features and capabilities of the primary controller 109A and the NEs 114, 110, and 111 are compatible, the BGP sessions 127-129 are established between the primary controller 109A and each of NEs 114, 110, and 111. In this way, the controller 109A and NEs 114, 110, and 114 are BGP speakers in the controller cluster network 100. While only three BGP sessions 127-129 are shown as being established in FIG. 1, it should be appreciated that the primary controller 109A may establish a BGP session with any number of the NEs 110-116.

In the controller cluster network 100, only the controller 109A in the cluster 106 establishes the BGP sessions 127-129 with the NEs 114, 110, and 111. The other controllers 109B in the cluster 106 that are not the primary controller 109A do not establish a BGP session 127-129 with any of the NEs 110-116 in the network 103. The primary controller 109A is responsible for communicating with the NEs 110-116 to control the network 103, and the primary controller 109A sends the other controllers 109B the relevant information to maintain the status database 124 across all the controllers 109A-B in the cluster 106.

For example, the primary controller 109A may provision a path 122 in the network 103. As shown in FIG. 1, the path 122 flows through NEs 110, 113, and 112. To provision the path 122, the primary controller 109A may send a message to NE 110 with information regarding the path 122 through the BGP session 128. For example, the message may be encoded as a BGP UPDATE message pursuant to IETF document titled "Advertising Segment Routing Policies in BGP" by S. Previdi, et. al., dated May 2020, and the BGP UPDATE message may include a segment routing (SR) path attributes field that carries the information such as the segment identifiers (SIDs) of NE 113 and NE 112 describing path 122, which may be a SR path 122. After receiving the message from the primary controller 109A, NE 110 updates a local forwarding table to indicate the information regarding the SR path 122. After updating the local forwarding table to indicate the information regarding the SR path 122, the NEs 110, 113, and 112 on the path 122 have successfully provisioned the path 122 in network 103.

After successfully provisioning the path 122, one or more of the NEs 110, 113, and 112 generates a feedback message indicating that the path 122 has been successfully provisioned by the respective NEs 110, 113, and 112 on the path 122. In one case, the header or ingress NE 110 of the SR path 122 generates a feedback message indicating that the path 122 has been successfully provisioned. In another case, any BGP message acting as a keep live message to the controller from NE 110 may be used a feedback message indicating that the SR path 122 has been successfully provisioned. In another case, there may be a link established between the primary controller 109A and each of the NEs 110, 113, and 112 on the path 122, and each NE 110, 113, and 112 sends the feedback message back to the primary controller 109A through these links. In another case, NEs 112 and 113 transmit the feedback message back to NE 110, which is a BGP speaker. NE 110 then forwards the feedback messages indicating that the path 122 has been successfully provisioned across NEs 110, 113, and 112 to the primary controller 109A through the BGP session 128.

After the primary controller 109A receives the feedback messages, the controller 109A updates the local status database 124 to indicate that the path 122 has been successfully provisioned across NEs 110, 113, and 112 in the network 103. To ensure that all the controllers 109A-B in the cluster 106 maintain a common status database 124, the primary controller 109A forwards the information from the feedback messages to the controller 109B through link 121. The controller 109B similarly updates the local status database 124 to indicate that the path 122 has been successfully provisioned across NEs 110, 113, and 112 in the network 103.

At this stage, all the controllers 109A-B maintain a common status database 124. Subsequently, when a failure occurs to the primary controller 109A, the controller 109B is promoted to be the primary controller 109B of the controller cluster network 100. For example, when the controller 109B detects that a failure occurs at the primary controller 109A, the controller 109B determines that the controller 109B is promoted to be the primary controller 109B, which is responsible for controlling the network 103. In this case, the controller 109B takes over a BGP session 127-129 with one or more NEs 110-116 in the network 103, and begins to control the network 103, without the NEs 110-116 having knowledge of the change to the primary controller from controller 109A to controller 109B.

However, in some cases, controller 109B may incorrectly detect that the primary controller 109A has failed. In this case, the controller 109B steps into the role of the primary controller, while controller 109A is still acting as the primary controller of the network 103. For example, the controller 109B may detect that the link 121 between controllers 109A and 109B failed, and assume that the primary controller 109A has failed as well. However, in reality, the primary controller 109A may still be fully functioning and controlling the NEs 110-116 in the network 103. The controller 109B may then determine that the controller 109B is the primary controller 109B of the network 103, and also begin controlling the NEs 110-116 in the network 103. When this occurs, the network 103 is controlled by two different primary controllers 109A and 109B, which can result in a failure of the network 103 due to inconsistencies between how the primary controllers 109A and 109B program the NEs 110-116 within network 103. Therefore, any failure or issue that occurs within the cluster 106 of controllers 109A-B is likely to lead to a crash or failure of the entire network 103 as well.

Disclosed herein are embodiments directed to prevent the network 103 from failing when a failure occurs within the cluster 106 of controllers 109A-B by configuring each of the controllers 109A-B and one or more of the NEs 110-116 in the network 103 to implement BGP for network HA. To implement BGP for network HA, all the controllers 109A-B in the cluster 106 and one or more NEs 110-116 establish a BGP with extensions session (also referred to herein as an "enhanced BGP session"). Instead of only communicating with the primary controller 109A in the controller cluster network 100, one or more of the NEs 110-116 communicate with all of the controllers 109A-B in the cluster 106.

In an embodiment, one or more NEs 110-116 establish an enhanced BGP session with each of the controllers 109A-B in the cluster 106. In the example shown in FIG. 1, the controllers 109A-B and/or the NEs 110-116 select the NEs 110 and 111 as the two designated NEs in the network 103 that communicate with all the controllers 109A-B in the cluster 106. The NEs 110 and 111 may be selected based on an identifier (ID) identifying each of the NEs 110-116. For example, the NEs 110 and 111 having the highest IDs in the network 103 are designated to communicate with all the controllers 109A-B in the cluster 106. For example, NEs 110 and 111 may have the highest ID and the second highest ID respectively in the network 103. In this way, each of NEs 110 and 111 establish an enhanced BGP session with each of the controllers 109A-B in the cluster 106.

As shown in FIG. 1, NE 110 is coupled to controller 109A by link 130 and coupled to controller 109B by link 132. NE 111 is coupled to controlled 109A by link 131 and coupled to controller 109B by link 133. Links 130-133 are similar to links 127-129. Each of the links 130-133 represent an enhanced BGP session, and as such, may also be referred to herein as enhanced BGP sessions 130-133 through which BGP messages 140 with extensions can be communicated. In an embodiment, the enhanced BGP sessions 130-133 are established and maintained over an Internet Protocol (IP) path between the NEs 110 and 111 and the controllers 109A and 109B. The enhanced BGP sessions 130-133 may also be referred to herein as "information channels 130-133."

Figure 4A:
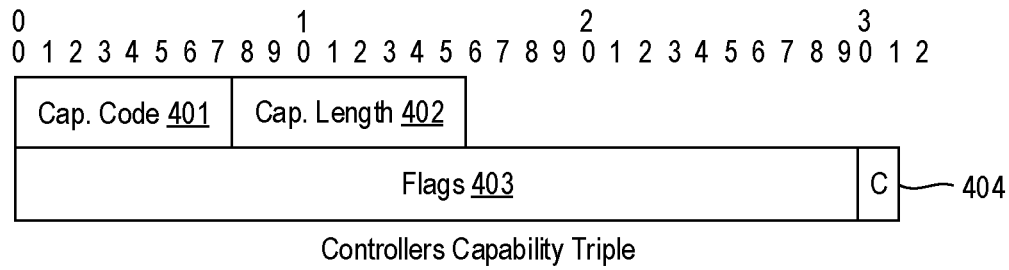

To establish the enhanced BGP sessions 130-133, each of the controllers 109A and 109B exchange OPEN messages with the NEs 110 and 111. The OPEN messages may include information used to negotiate and establish the enhanced BGP session 130-133 between the controllers 109A and 109B and NEs 110 and 111. For example, the OPEN messages may include a version of BGP that the controllers 109A-B and NEs 110-111 are capable of implementing, a BGP identifier, a hold down timer, and one or more optional parameters. In an embodiment, the OPEN messages include a controllers capability triple, which, when included in the OPEN message, indicates that the controller 109A-B or NEs 110-111 sending the OPEN message is capable of implementing BGP for network HA. A capability triple comprises three elements: a capability code of 1 byte, a capability length of 1 byte and a capability value. The value of the code indicates the capability. The value of the length indicates the size of the capability value in bytes. FIG. 4A shows an example of a controllers capability triple that may be sent in the embodiments disclosed herein. When the features and capabilities of the controllers 109A-B and NEs 110-111 are compatible, the enhanced BGP sessions 130-133 are established between the controllers 109A-B and NEs 110-111.

In the embodiment shown in FIG. 1, the primary controller 109A establishes the BGP session 128 and the enhanced BGP session 130 separately as separate sessions (e.g., with separate sets of OPEN messages) with NE 110. In another embodiment, the primary controller 109A may only establish the enhanced BGP session 130 with NE 110, which would function as both the control channel and the information channel between the primary controller 109A and NE 110.

Similarly, the embodiment shown in FIG. 1 shows that the primary controller 109A establishes the BGP session 129 and the enhanced BGP session 131 separately as separate sessions with NE 111. In another embodiment, the primary controller 109A may only establish the enhanced BGP session 131 with NE 111, which would function as both the control channel and the information channel between the primary controller 109A and NE 111.

After the enhanced BGP sessions 130-133 have been established in the controller cluster network 100, the controllers 109A-B and NEs 110-111 exchange BGP messages 140 with one another to communicate information describing the cluster 106 of controllers 109A-B. In an embodiment, the controller 109A generates a first BGP message 140 including information indicating a status of the controller 109A and the cluster 106. The first BGP message 140 may indicate whether the controller 109A is the primary controller 109A. The first BGP message 140 may also include a position of the controller 109A relative to other controllers 109B in the cluster 106. The position refers to a current or intended position of the controller 109A within an order of priority of the controllers 109A-B within the cluster 106.

The order of priority indicates an order of controllers 109A-B by which to elect a primary controller 109A from the cluster 106. For example, an operator of the controller cluster network 100 may set a priority of each controller 109A-B in the cluster 106, indicating the order of priority of the controllers 109A-B from the highest priority to the lowest priority. The controller 109A with the highest priority (for example, a priority of 200) is the first primary controller 109A, a secondary controller 109B with the next highest priority (for example, a priority of 180) is the backup controller for the first primary controller 109A, a third controller with the next highest priority (for example, a priority of 178) is the backup controller for the first primary controller 109A and the second controller 109B, and so on.

The position of the controller 109A-B relative to other controllers 109A-B in the cluster 106 refers to a current or intended position within the order of priority of the controllers 109A-B of the cluster 106. In the example shown in FIG. 1, the order of priority may be {controller 109A, controller 109B}. The position of the primary controller 109A is 1, because the current position of the controller 109A within the order of priority is first. The position of the secondary controller 109B is 2, because the current position of the controller 109B within the order of priority is second.

In an embodiment, the first BGP message 140 includes an old position of the controller 109A relative to other controllers 109B in the cluster 106. The old position refers to a previous position of the controller 109A within the order of priority of the controllers 109A-B. For example, suppose that, previously, the order of priority was {another controller X, controller 109A, controller 109B}, and then the other controller X failed. In this case, the controller 109A became the primary controller 109A, and the old position of controller 109A is 2 because the previous position of the controller 109A within the order of priority was second.

In an embodiment, the first BGP message 140 includes the priority of the controller 109A. As described above, an operator of the controller cluster network 100 may pre-configure the priority of each controller 109A-B in the cluster 106.

In an embodiment, the first BGP message 140 includes a quantity of controllers 109A-B in the cluster 106. In the example shown in FIG. 1, the quantity of controllers 109A-B is two. However, as should be appreciated, the cluster 106 may include any quantity of controllers 109A-B.

In an embodiment, the first BGP message 140 includes a controller ID for each of the controllers 109A-B in the cluster 106. In the example shown in FIG. 1, the first BGP message 140 includes a controller ID for controller 109A and a controller ID for controller 109B. As should be appreciated, the first BGP message 140 may include other information not described herein. Examples of the first BGP message 140 will be further described below with reference to FIGS. 5-7.

After generating the first BGP message 140, the primary controller 109A transmits the first BGP message 140 to NE 110 via the enhanced BGP session 130 and transmits the first BGP message 140 to NE 111 via the enhanced BGP session 131. The NE 110 forwards the first BGP message 140 to controller 109B via the enhanced BGP session 132. The NE 111 also forwards the first BGP message 140 to controller 109B via the enhanced BGP session 133. The redundancy of transmission of the first BGP message 140 from both NEs 110 and 111 to controller 109B serves to further ensure that the controller 109B receives the first BGP message 140 from controller 109A when one of NE 110 and NE 111 fails. Controller 109B receives the first BGP message 140 and updates the status database 124 to include the information indicating a status of the controller 109A and the cluster 106 carried in the first BGP message 140.

Similarly, controller 109B generates a second BGP message 140. The second BGP message 140 includes information similar to the first BGP message 140, except that the second BGP message 140 includes information indicating a status of the controller 109B and the cluster 106. After generating the second BGP message 140, the controller 109B transmits the second BGP message 140 to NE 111 via the enhanced BGP session 133 and transmits the second BGP message 140 to NE 110 via the enhanced BGP session 132. The NE 110 forwards the second BGP message 140 to controller 109A via the enhanced BGP session 130. The NE 111 also forwards the second BGP message 140 to controller 109A via the enhanced BGP session 131. The redundancy of transmission of the second BGP message 140 from both NEs 110 and 111 serves to further ensure that the controller 109A receives the second BGP message 140 from controller 109B when one of NE 110 and NE 111 fails. Controller 109A receives the second BGP message 140 and updates the status database 124 to include the information indicating a status of the controller 109B and the cluster 106 carried in the second BGP message 140.

In some embodiments, each of the controllers 109A-B sends subsequent BGP messages 140 with updated information regarding the status of the respective controller 109A-B and the cluster 106 when an update to the status of the respective controller 109A-B or the cluster 106 occurs. Similarly, each of the controllers 109A-B sends subsequent BGP messages 140 with updated information regarding the status of the respective controller 109A-B and the cluster 106 when a failure or issue occurs at the cluster 106.

In this embodiment shown in FIG. 1, both controllers 109A-B maintain information regarding the status of all the controllers 109A-B in the cluster 106 and maintain enhanced BGP sessions 130-133 with two NEs 110-111 in network 103. In this embodiment, when a failure occurs at link 121 interconnecting controllers 109A-B, controller 109B will not mistakenly assume the role of the primary controller. Instead, the controller 109B will wait a pre-determined period of time after detecting the failure at link 121 to determine whether a subsequent BGP message 140 is received from controller 109A via either NE 110 or NE 111.

For example, when the primary controller 109A detects the failure of link 121, the primary controller 109A sends a third BGP message 140 to NE 110 via the enhanced BGP session 130 and sends the third BGP message 140 to NE 111 via the enhanced BGP session 131. The third BGP message 140 indicates that the primary controller 109A detected the failure at link 121, and thus is no longer coupled to controller 109B. In this example, the third BGP message 140 may indicate that the quantity of controllers 109A-B in the cluster 106 is one because controller 109A can no longer communicate with controller 109B via link 121, and thus, assumes that controller 109B is down. NE 110 forwards the third BGP message 140 to controller 109B via the enhanced BGP session 132, and NE 111 forwards the third BGP message 140 to controller 109B via the enhanced BGP session 133.

In an embodiment, controller 109B waits a predetermined period of time to receive the third BGP message 140 from the controller 109A through NEs 110 and/or 111. When controller 109B receives the third BGP message 140, controller 109B determines that the primary controller 109A is still active and functioning properly, and thus, will not assume the role of the primary controller. When the controller 109B does not receive the third BGP message 140 during the predetermined period of time, the controller 109B assumes the role of the primary controller and begins to control network 103.

In this way, the embodiments of the present disclosure prevent the network 103 from failing when multiple controllers 109A-B in the cluster 106 assume the role of the primary controller in the controller cluster network 100. To this end, the embodiments of the present disclosure increase the lifespan of the NEs 110-116 within the controller cluster network 100 and increase the accuracy of controlling the controller cluster network 100.

Figure 2:
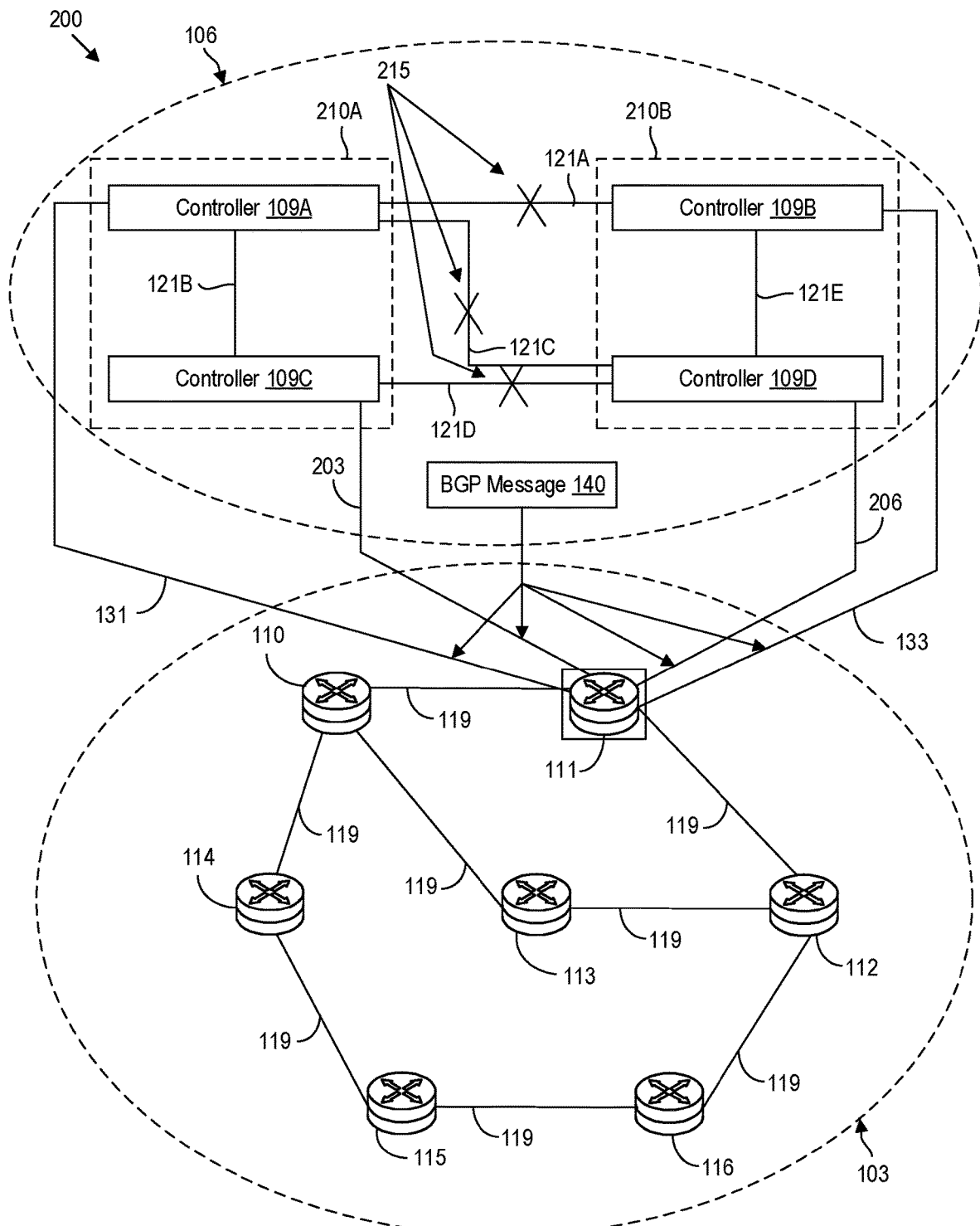
FIG. 2 is a diagram illustrating another controller cluster network configured to implement BGP for network HA according to various embodiments of the disclosure.

FIG. 2 is a diagram illustrating another controller cluster network 200 configured to implement BGP for network HA according to various embodiments of the disclosure. The controller cluster network 200 is similar to the controller cluster network 100 of FIG. 1, except that the cluster 106 includes more than two controllers 109A-D. Controllers 109A-D are similar to the controllers 109A-B described above with reference to FIG. 1.

Controllers 109A-D are interconnected by links 121A-E. Links 121A-E are similar to the link 121 described above with reference to FIG. 1. Link 121A interconnects controller 109A and controller 109B. Link 121B interconnects controller 109A and controller 109C. Link 121C interconnects controller 109A and controller 109D. Link 121D interconnects controller 109C and controller 109D. Link 121E interconnects controller 109B and controller 109D.

The network 103 shown in FIG. 2 is similar to the network 103 of FIG. 1, in that network 103 includes NEs 110-116 interconnected by links 119. However, in network 103, only one NE 111 establishes an enhanced BGP session 131, 133, 203, and 206 with the controllers 109A-D in the cluster 106. For example, the controllers 109A-D and/or NEs 110-116 determine that NE 111 has the highest ID amongst all the NEs 110-116, and thus, NE 111 is designated to establish the enhanced BGP session 131, 133, 203, and 206 with the controllers 109A-D in the cluster 106.

Similar to the controller cluster network 100 of FIG. 1, controller 109A establishes the enhanced BGP session 131 with NE 111, and controller 109B establishes the enhanced BGP session 133 with NE 111. Unlike the controller cluster network 100 of FIG. 1, NE 111 also establishes enhanced BGP sessions 203 and 206 with controllers 109C and 109D, respectively. In this way, each of the controllers 109A-D has established an enhanced BGP session 131, 133, 203, and 206 with NE 111.

After establishing the enhanced BGP sessions session 131, 133, 203, and 206, each of the controllers 109A-D generates a BGP message 140 including information describing a status of a respective controller 109A-D and the cluster 106. The BGP message 140 sent by controllers 109A-D may indicate whether a respective controller 109A-D is a primary controller. The BGP message 140 may also include a position of a respective controller 109A-D, an old position of the respective controller 109A-D, a priority of the respective controller 109A-D, a quantity of controllers 109A-D in the cluster 106, and a controller ID for each of the controllers 109A-D in the network 103. As should be appreciated, the BGP message 140 may include other information not described herein. Examples of the BGP message 140 will be further described below with reference to FIGS. 5-7.

In some cases, a failure 215 may occur along one or more of the links 121A-E interconnecting the controllers 109A-D. In the example shown in FIG. 2, a failure 215 occurs along links 121A, 121C, and 121D. After the failures 215 occur, controller 109A and controller 109C are interconnected via link 121B, and controller 109B and controller 109D are interconnected via link 121E. That is, controllers 109A and 109C are no longer connected to either controller 109B or controller 109D, and thus, controllers 109A and 109C assume that controller 109B and controller 109D have failed. Similarly, controllers 109B and 109D are no longer connected to either controller 109A or controller 109C, and thus, controllers 109B and 109D assume that controller 109A and controller 109C have failed. In this way, the remaining interconnected controllers 109A and 109C and controllers 109B and 109D form two separate controller groups 210A and 210B. The controller group 210A includes controller 109A and controller 109C interconnected by link 121B. The controller group 210B includes controller 109B and controller 109D interconnected by link 121E.

Each controller group 210A-B is unaware of the existence of the other controller group 210A-B. In this case, both controller groups 210A-B determine a primary controller within each of the controller groups 210A-B, which results in two primary controllers controlling the network 103. As described above, when multiple primary controllers control the network 103, the different primary controllers may program the NEs 110-116 inconsistently, which can result in a failure of the network 103 as a whole.

The embodiments disclosed herein prevent such a failure of the network 103 from occurring by communicating the BGP message 140 from each of the controllers 109A-D through the NE 111 in the network 103. In an embodiment, after detecting the failures 215 along the links 121A, 121C, and 121D, each of the controllers 109A-D wait a predetermined period of time to receive a BGP message 140 from a controller 109A-D in another controller group 210A-B before determining whether to reassign another primary controller in the cluster 106.

For example, the controller 109A may be the primary controller 109A in the controller cluster network 200. After the failures 215 occur within the cluster 106, controller 109B initially determines that the connection to the primary controller 109A has failed. Controller 109B then waits a predetermined period of time to receive a BGP message 140 from NE 111 that originated from controller 109A.

During this time, controller 109A detects the failure 215 of links 121A, 121C, and 121D. Controller 109A then generates a BGP message 140 indicating, for example, that the quantity of controllers 109A-B in the cluster 106 is now two because controller 109A is no longer connected to controllers 109B and 109D. The BGP message 140 may also include the IDs of controllers 109A and 109C. Controller 109A transmits the BGP message 140 to NE 111 via the enhanced BGP session 131.

NE 111 still maintains the enhanced BGP sessions 203, 206, and 133 with the other controllers 109C, 109B, and 109D, respectively. NE 111 then forwards the BGP message 140 to controllers 109C, 109B, and 109D via the enhanced BGP sessions 203, 206, and 133, respectively. When controller 109B receives the BGP message 140 indicating that the primary controller 109A is still active and that there are two controllers in group 210A during the predetermined time period, controller 109B does not assume the role of the primary controller. In contrast, when the controller 109B does not wait to receive the BGP message 140 during the predetermined time period, controller 109B assumes the role of the primary controller 109B in the controller cluster network 200.

Figure 3:
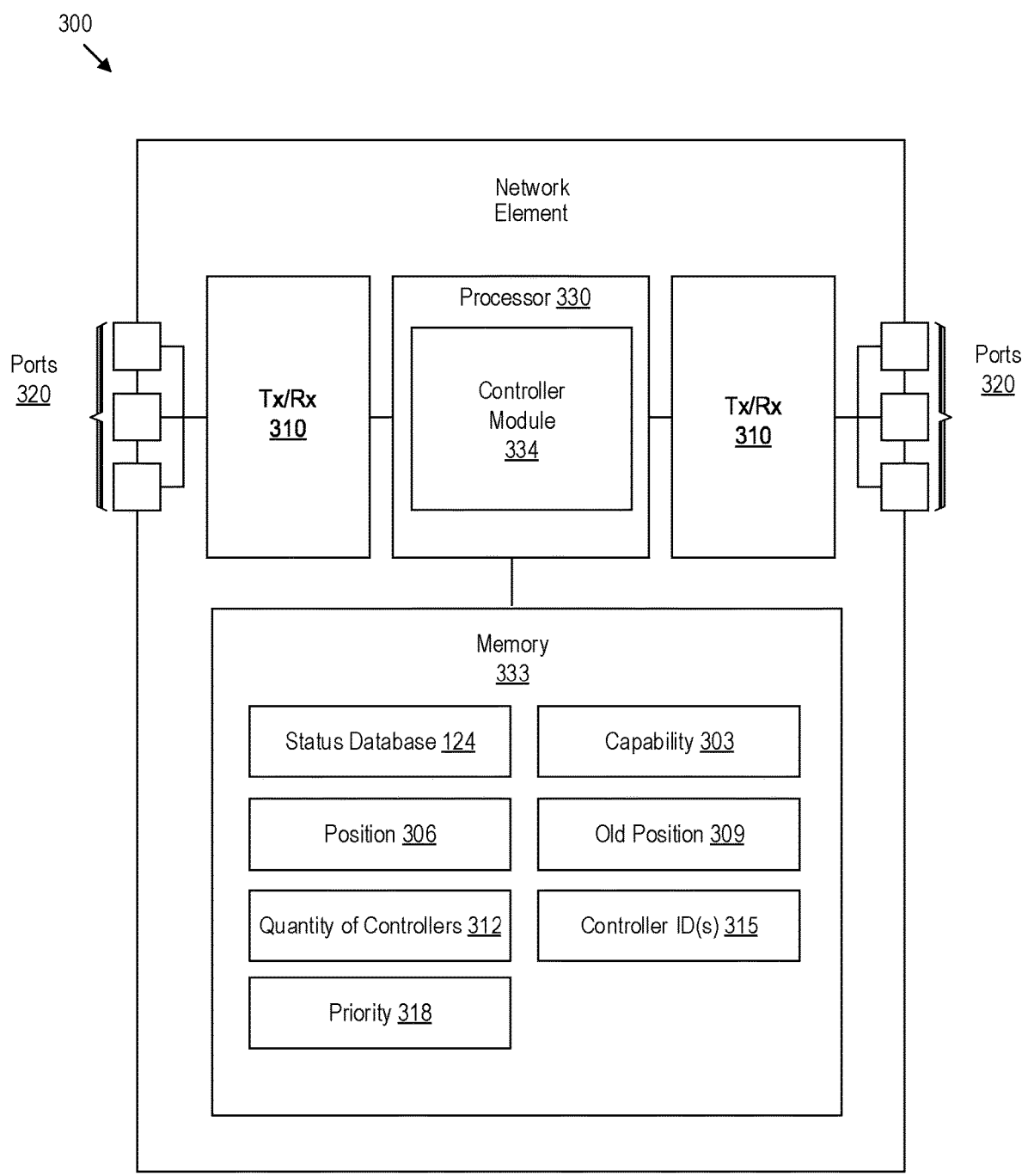
FIG. 3 is a diagram illustrating an NE configured to implement BGP for network HA according to various embodiments of the disclosure.

FIG. 3 is a diagram illustrating an NE 300 configured to implement BGP for network HA according to various embodiments of the disclosure. In an embodiment, the NE 300 may be implemented as any one of NEs 110-116 or any one of controllers 109A-D.

The NE 300 comprises ports 320, transceiver units (Tx/Rx) 310, a processor 330, and a memory 333. The processor 330 comprises a controller module 334. Ports 320 are coupled to Tx/Rx 310, which may be transmitters, receivers, or combinations thereof. The Tx/Rx 310 may transmit and receive data via the ports 320. Processor 330 is configured to process data. Memory 333 is configured to store data and instructions for implementing embodiments described herein. The NE 300 may also comprise electrical-to-optical (EO) components and optical-to-electrical (OE) components coupled to the ports 320 and Tx/Rx 310 for receiving and transmitting electrical signals and optical signals.

The processor 330 may be implemented by hardware and software. The processor 330 may be implemented as one or more central processing unit (CPU) and/or graphics processing unit (GPU) chips, logic units, cores (e.g., as a multi-core processor), field-programmable gate arrays (FPGAs), application specific integrated circuits (ASICs), and digital signal processors (DSPs). The processor 330 is in communication with the ports 320, Tx/Rx 310, and memory 333. The controller module 334 is implemented by the processor 330 to execute the instructions for implementing various embodiments discussed herein. For example, the controller module 334 is configured to establish an enhanced BGP session 130-133, 203, and 206 and communicate BGP messages 140. The inclusion of the controller module 334 provides an improvement to the functionality of the NE 300. The controller module 334 also effects a transformation of NE 300 to a different state. Alternatively, the controller module 334 is implemented as instructions stored in the memory 333.

The memory 333 comprises one or more of disks, tape drives, or solid-state drives and may be used as an over-flow data storage device, to store programs when such programs are selected for execution, and to store instructions and data that are read during program execution. The memory 333 may be volatile and non-volatile and may be read-only memory (ROM), random-access memory (RAM), ternary content-addressable memory (TCAM), and static random-access memory (SRAM).

In an embodiment, when the NE 300 is a controller 109A-D, the memory 333 stores a status database 124, a capability 303, a position 306, an old position 309, a quantity 312 of controllers 109A-D, controller IDs 315, and a priority 318. The status database 124 maintains the most recent information regarding NEs 110-116 in the network 103 and the most recent information regarding the controllers 109A-D in the cluster 106. The capability 303 may indicate whether the NE 300 is capable of implementing BGP for network HA (e.g., establishing enhanced BGP sessions 130-133, 203, and 206 and transmitting BGP messages 140 with extensions).

The position 306 refers to a current or intended position of the NE 300 within an order of priority of the controllers 109A-D within the cluster 106. The old position 309 refers to a previous position of the NE 300 within an order of priority of the controllers 109A-D within the cluster 106. A quantity 312 refers to a quantity or number of controllers 109A-D within the cluster 106.

The controller IDs 315 are IDs, or values, identifying each of the controllers 109A-D in the cluster 106. In an embodiment, the controller IDs 315 include IDs for the controllers 109A-D that are reachable in the cluster 106. In another embodiment, the controller IDs 315 include IDs for the controllers 109A-D that are unreachable, or have failed, in the cluster 106. The priority 318 is a value indicating a priority of the NE 300 relative to other controllers 109A-D in the cluster 106.

It is understood that by programming and/or loading executable instructions onto the NE 300, at least one of the processor 330 and/or memory 333 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4B:
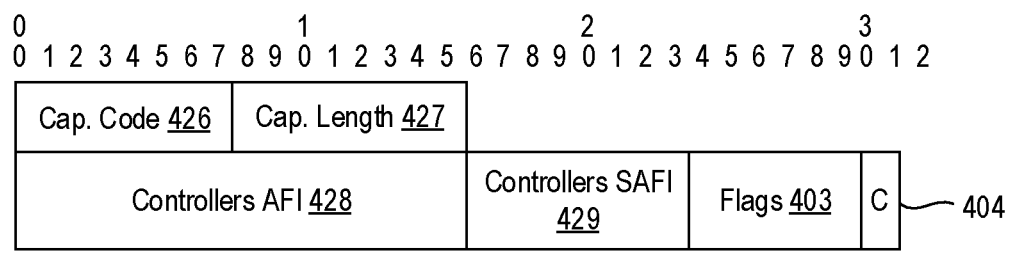

FIGS. 4A-D are diagrams illustrating Type-Length-Values (TLVs) used to encode the capability 303 of a controller 109A-D and an NE 110-116 according to various embodiments of the disclosure. Specifically, FIG. 4A shows a first embodiment of a controllers capability triple configured to indicate the capability of a controller 109A-D or NE 110-116. FIG. 4B shows a second embodiment of a controllers capability triple configured to indicate the capability of a controller 109A-D or NE 110-116. FIG. 4C shows a capability optional parameter that includes the controllers capability triple of FIG. 4A or the controllers capability triple of FIG. 4B. FIG. 4D shows an OPEN message that includes the capability optional parameter of FIG. 4C.

Referring now to FIG. 4A, shown is a first embodiment of a controllers capability triple 400 configured to indicate the capability of a controller 109A-D or NE 110-116. As described above with reference to FIGS. 1 and 2, the controllers 109A-D and/or the NEs 110-111 exchange OPEN messages to establish an enhanced BGP session 130-133, 203, and 206 with one another. In an embodiment, the controller 109A-D or the NE 110-111 include the controllers capability triple 400 in the OPEN message when the controller 109A-D or the NE 110-111 sending the OPEN message is capable of implementing BGP for network HA (e.g., establishing enhanced BGP sessions 130-133, 203, and 206 and transmitting BGP messages 140 with extensions).

As shown by FIG. 4A, the controllers capability triple 400 includes a capability code 401 of 1 octet, a capability length 402 of 1 octet, and flags 403. The capability code 401 is a value that will be assigned by the Internet Assigned Numbers Authority (IANA). The value in the capability code 401 indicates that the controllers capability triple 400 carries a capability 303 of the NE 110-116 or controller 109A-D. The capability length 402 indicates a length of the flags 403. The flags 403 include 32 bits, of which one bit is the C bit 404. The C bit 404 is set to indicate whether a controller 109A-D or an NE 110-111 is sending the controllers capability triple 400. For example, the C bit 404 may be set to 1 when the controller 109A-D sends the controllers capability triple 400, and the C bit 404 may be set to 0 when the NE 110-111 sends the controllers capability triple 400. Alternatively, the C bit 404 may be set to 0 when the controller 109A-D sends the controllers capability triple 400, and the C bit 404 may be set to 1 when the NE 110-111 sends the controllers capability triple 400.

Referring now to FIG. 4B, shown is a second embodiment of a controllers capability triple 425 configured to indicate the capability of a controller 109A-D or NE 110-116. In an embodiment, the controller 109A-D or the NE 110-111 include the controllers capability triple 425 in the OPEN message when the controller 109A-D or the NE 110-111 sending the OPEN message is capable of implementing BGP for network HA (e.g., establishing enhanced BGP sessions 130-133, 203, and 206 and transmitting BGP messages 140 with extensions).

As shown by FIG. 4B, the controllers capability triple 425 includes a capability code 426 of 1 octet, a capability length 427 of 1 octet, a controllers address family identifier (AFI) 428, a controllers sub-address family identifier (SAFI) 429, and flags 403. The capability code 426 is similar to the capability code 401 of FIG. 4A. The capability length 427 is similar to the capability length 402 of FIG. 4A.

The controllers AFI 428 is a 16 bit value that will be assigned by the Internet Assigned Numbers Authority (IANA). The controllers SAFI 429 is an 8 bit value that will be assigned by the IANA. The controllers AFI 428 and the SAFI 429 are values defined to carry information about the controllers 109A-D in the cluster 106. The flags 403 include 8 bits, of which one bit is the C bit 404. As described above, the C bit 404 is set to indicate whether a controller 109A-D or an NE 110-111 is sending the controllers capability triple 425. In some embodiments, the controllers capability triple 400 of FIG. 4A and the controllers capability triple 425 of FIG. 4B is based on the capability optional parameters defined by RFC 5492, entitled "Capabilities Advertisement with BGP-4," by J. Scudder, et. al., dated February 2009 (hereinafter referred to as "RFC 5492").

Referring now to FIG. 4C, shown is a capability optional parameter 450 that includes either the controllers capability triple 400 of FIG. 4A or the controllers capability triple 425 of FIG. 4B. The capability optional parameter 450 includes a parameter type 451, a parameters length 452, and triples for multiple capabilities, including either the controllers capability triple 400 of FIG. 4A or the controllers capability triple 425 of FIG. 4B. The parameter type 451 is an 8 bit field set to 2 to indicate that the TLV is a capability optional parameter 450. The parameter length 452 is an 8 bit field indicating a length of the triples for multiple capabilities.

Referring now to FIG. 4D, shown is an OPEN message 475 pursuant to RFC 4271 including the capability optional parameter 450 of FIG. 4C. In an embodiment, the controller 109A-D or the NE 110-111 includes the capability optional parameter 450 of FIG. 4C in the OPEN message 475 when the controller 109A-D or the NE 110-111 sending the OPEN message 475 is capable of implementing BGP for network HA (e.g., establishing enhanced BGP sessions 130-133, 203, and 206 and transmitting BGP messages 140 with extensions). The capability optional parameter 450 of FIG. 4C includes either the controllers capability triple 400 of FIG. 4A or the controllers capability triple 425 of FIG. 4B.

As shown by FIG. 4D, the OPEN message 475 includes a version 476, a my autonomous system field 477, a hold time field 478, a BGP identifier 479, an optional parameter length 480, and optional parameters including the capability optional parameter 450. The version 476 indicates a protocol version number of BGP, which may indicate that the current BGP version number is 4. The my autonomous system field 477 indicates the autonomous system number of the controller 109A-D or NE 110-11 sending the OPEN message 475. The hold time field 478 indicates a number of seconds that the controller 109A-D or NE 110-11 sending the OPEN message 475 proposes for a value of a hold timer. The BGP identifier 479 indicates a BGP identifier of the controller 109A-D or NE 110-11 sending the OPEN message 475, which may be an IP address of the controller 109A-D or NE 110-11 sending the OPEN message 475. The optional parameters length 480 indicates a total length of the optional parameters included in the OPEN message 475.

Figure 5A:
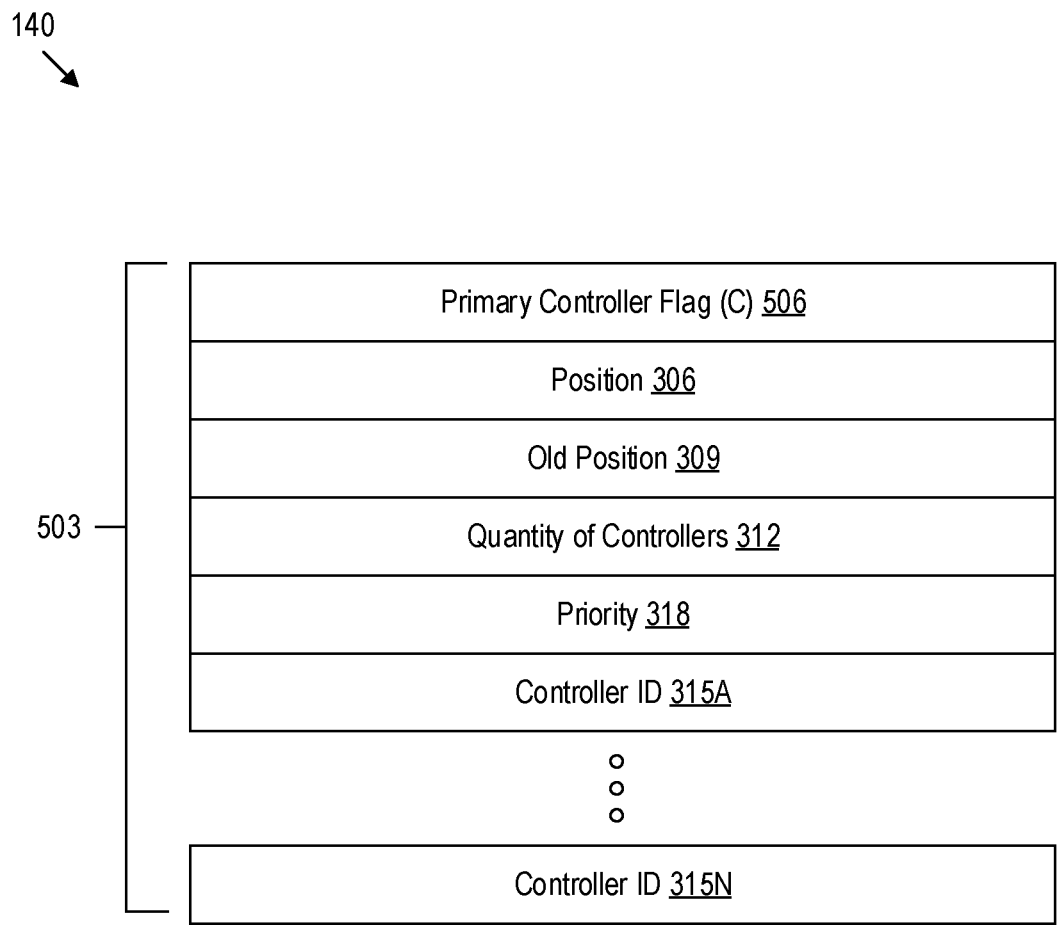
FIGS. 5A-B are diagrams illustrating a BGP message communicated through the controller cluster network according to various embodiments of the disclosure.
Figure 5B:

FIGS. 5A-B are diagrams illustrating the content of a BGP message 140 communicated through the controller cluster networks 100 and 200 according to various embodiments of the disclosure. Specifically, FIG. 5A shows the contents of the BGP message 140, and FIG. 5B shows a TLV used to encode a controllers Network Layer Reachability Information (NLRI) field carrying the contents of the BGP message 140.

Referring now to FIG. 5A, shown are the contents of a BGP message 140 communicated through the controller cluster networks 100 and 200 according to various embodiments of the disclosure. As described above with reference to FIGS. 1 and 2, the controllers 109A-D generate the BGP message 140 and forward the BGP message 140 through the enhanced BGP sessions 130-133, 203, and 206, through NEs 110-111, to reach the other controllers 109A-D in the cluster 106.

In an embodiment, the BGP message 140 includes controllers Network Layer Reachability Information (NLRI) 503. The controllers NLRI 503 describes a status of the controller 109A-D generating the BGP message 140 (also referred to herein as the "originating controller 109A-D"). The controllers NLRI 503 also describes the other controllers 109A-D in the cluster 106. As shown in FIG. 5A, the controllers NLRI 503 includes a primary controller flag (C) 506, the position 306, the old position 309, the quantity 312 of controllers, the priority 318, and controller IDs 315A-N identifying all the controllers 109A-D in the cluster 106. As should be appreciated, the BGP message 140 may contain additional information that is not otherwise shown in FIG. 5A.

In an embodiment, the primary controller flag (C) 506 is a flag or a bit that is set to indicate whether the originating controller 109A-D is the primary controller 109A. For example, the primary controller 109A generates a BGP message 140 with the primary controller flag (C) 506 set to 1.

The position 306 refers to a current or intended position of the controller 109A within an order of priority of the controllers 109A-D within the cluster 106. The order of priority indicates an order by which to elect a primary controller 109A from the cluster 106. For example, an operator of the controller cluster network 100 may set a priority of each controller 109A-D in the cluster 106, indicating the order of priority of the controllers 109A-D from the highest priority to the lowest priority. The controller 109A with the highest priority (for example, a priority of 200) is the first primary controller 109A, the second controller 109B with the next highest priority (for example, a priority of 188) is the backup controller for the first primary controller 109A, the third controller 109C with the next highest priority (for example, a priority of 180) is the backup controller for the first primary controller 109A and the second controller 109B, and the fourth controller 109D with the next highest priority (for example, a priority of 178) is the backup controller for the first primary controller 109A, the second controller 109B, and the third controller 109C. In this example, the order of priority may be {controller 109A, controller 109B, controller 109C, and controller 109D}. As such, the position 306 of the primary controller 109A is 1, the position 306 of the secondary controller 109B is 2, the position 306 of the third controller 109C is 3, and the position 306 of the fourth controller 109D is 4.

In an embodiment, the position 306 of the controller 109A-D changes as failures occur to the cluster 106 of controllers 109A-D. The old position 309 refers to an old position of the originating controller 109A-D within an order of priority of the controllers 109A-D relative to other controllers 109A-D in the cluster 106. For example, when the controller 109A fails, and controller 109B becomes the primary controller, then the old position 309 of the controller 109B is 2.

The quantity 312 of controllers 109A-D refers to a quantity, or count, of controllers 109A-D in the cluster 106. In the example shown in FIG. 2, the cluster 106 includes four controllers 109A-D, and as such, the quantity 312 is set to 4. The priority 318 refers the priority of the originating controller 109A-D, which may be assigned by an operator of the controller cluster network 100 or 200.

The controller IDs 315A-N are IDs identifying each of the controllers 109A-D in the cluster 106. The controller IDs 315A-N may be identifiers, labels, or addresses of each of the controllers 109A-D in the cluster 106. For example, the BGP message 140 may include IP addresses of the controllers 109A-D as the controller IDs 315A-D.

Referring now to FIG. 5B, shown is a TLV used to encode a controllers NLRI field 510 carrying the NLRI 503 of FIG. 5A. The controllers NLRI field 510 is encoded similar to the NLRI field defined by RFC 4271 carried in a BGP UPDATE message, except that the controllers NLRI field 510 carries the controllers NLRI 503.

As shown by FIG. 5B, the controllers NLRI field 510 includes a type field 511, a length field 512, flags 513, a position field 515, a number of controllers field 516 (shown as "NoControllers" in FIG. 5B), an old position field 517, reserved bits 518, a priority field 519, and a connected controller ID field 520A-N. As should be appreciated, the controllers NLRI field 510 may include other fields not otherwise shown in FIG. 5B.

The type field 511 is a 16 bit field that is assigned by the IANA to indicate that the controllers NLRI 503 is carried in the controllers NLRI field 510. The length field 512 is a 16 bit field indicating the length of the controllers NLRI field 510, excluding the type field 511 and the length field 512, in octets. The flags 513 include 8 bits, in which one flag is defined as the C bit 514. The C bit 514 indicates the primary controller flag (C) 506. The position field 515 is an 8 bit field indicating the position 306 of the originating controller 109A-D. The number of controllers field 516 is an 8 bit field indicating the quantity 312 of controllers 109A-D in the cluster 106. The old position field 517 is an 8 bit field indicating the old position 309 of the originating controller 109A-D. The reserved bits 518 include 24 bits set to zero and ignored upon reception. The priority field 519 is an 8 bit field indicating the priority 318 of the originating controller 109A-D. The connected controller ID field 520A-N is a 32 bit field indicating the controller IDs 315A-N of the controllers 109A-D in the cluster 106.

In an embodiment, the ontrollers NLRI 503 is carried in an existing BGP NLRI, such as the Multiprotocol Reachable NLRI (MP_REACH_NLRI) or the Multiprotocol Unreachable NLRI (MP_UNREACH_NLRI). The MP_REACH_NLRI and the MP_UNREACH_NLRI are both defined in RFC 4760, entitled "Multiprotocol Extensions for BGP-4," by T. Bates, et. al., dated January 2007 (hereinafter referred to as "RFC 4760").

Figure 6A:
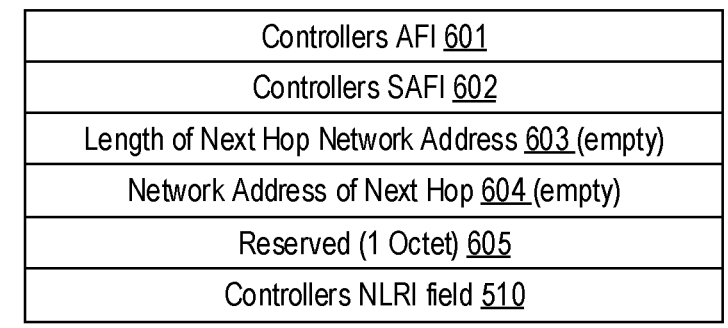
FIGS. 6A-C are diagrams illustrating TLVs used to encode the BGP message as an existing BGP NLRI according to various embodiments of the disclosure.
Figure 6B:
Figure 6C:
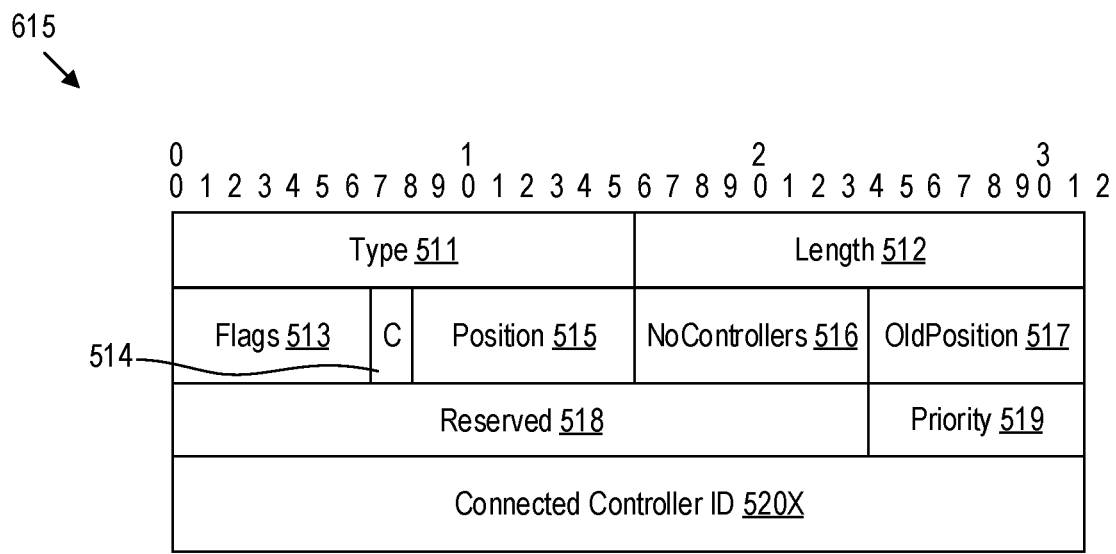

FIGS. 6A-C are diagrams illustrating TLVs used to encode the BGP message 140 as an existing BGP NLRI according to various embodiments of the disclosure. FIG. 6A is a diagram illustrating an MP_REACH_NLRI, FIG. 6B is a diagram illustrating an MP_UNREACH_NLRI, and FIG. 6C is a diagram illustrating a TLV used to encode an unreach controllers NLRI field carried in the MP_UN-REACH_NLRI of FIG. 6B.

Referring now to FIG. 6A, shown is a BGP MP_REACH_NLRI 600, similar to the MP_REACH_NLRI defined by RFC 4760, except that the MP_REACH_NLRI 600 carries the controllers NLRI field 510 of FIG. 5B. As shown by FIG. 6A, the MP_REACH_NLRI 600 also includes a controllers AFI field 601, a controllers SAFI field 602, a length of a next hop network address field 603, a network address of a next hop field 604, a reserved field 605, and the controllers NLRI field 510.

The controllers AFI field 601 is a 2 octet field carrying a controllers AFI, which is value that is to be assigned by the IANA. The controllers AFI, when carried in the MP_REACH_NLRI 600, indicates that the MP_REACH_NLRI 600 includes the controllers NLRI field 510, which carries the controllers NLRI 503. The controllers SAFI field 602 is a 1 octet field carrying a controllers SAFI, which is also value that is to be assigned by the IANA. The controllers SAFI, when carried in the MP_REACH_NLRI 600, also indicates that the MP_REACH_NLRI 600 includes the controllers NLRI field 510, which carries the controllers NLRI 503. The length of the next hop network address field 603, the network address of a next hop field 604, and the reserved field 6-5 are left blank because they are not relevant to the controllers NLRI 503 carried in the controllers NLRI field 510.

In an embodiment, the controllers NLRI 503 carried in the controllers NLRI field 510 of the MP_REACH_NLRI 600 indicates information about controllers 109A-D in the cluster 106 that are reachable, or available, at the time of sending the MP_REACH_NLRI 600. In contrast, a controller 109A-D or an NE 110-111 sends an MP_UNREACH_NLRI to indicate information about controllers 109A-D in the cluster 106 that are unreachable, unavailable, or have failed.

Referring now to FIG. 6B, shown is a BGP MP_UN-REACH_NLRI 610 that indicates the information about controllers 109A-D in the cluster 106 that are unreachable, unavailable, or have failed. The BGP MP_UNREACH_NLRI 610 is similar to the MP_UNREACH_NLRI defined by RFC 4760, except that the MP_UNREACH_NLRI 610 carries the unreach controllers NLRI field 615.

As shown by FIG. 6B, the MP_UNREACH_NLRI 610 includes the controllers AFI field 601, the controllers SAFI field 602, and an unreach controllers NLRI field 615. The unreach controllers NLRI field 615 is similar to the controllers NLRI field 510, except that the unreach controllers NLRI field 615 only carries information about controllers 109A-D in the cluster 106 that are unreachable, unavailable, or have failed. FIG. 6C shows an example of an unreach controllers NLRI field 615 included in the MP_UNREACH_NLRI 610.

Referring now to FIG. 6C, shown is a TLV used to an encode an unreach controllers NLRI field 615 included in the MP_UNREACH_NLRI 610. The unreach controllers NLRI field 615 is similar to the controllers NLRI field 510 of FIG. 5B, except that only the controller ID 315X of a controller 109A-D that has become unreachable, unavailable, or failed is included in the connected controller ID field 520X.

For example, NE 111 may detect that the session to controller 109A failed, and NE 111 may generate a BGP message 150 including the MP_UNREACH_NLRI 610 including an unreach controllers NLRI field 615 based on the BGP message 140 originated from controller 109A. NE 111 may then send BGP message 150 to the other controllers B-D. After receiving the message, the other controllers 109B-D remove the information about controllers originated from controller 109A. The unreach controllers NLRI field 615 includes the C bit 514 indicating that the controller 109A is the primary controller, the position field 515 indicating a position 306 of 1, number of controllers field 516 indicating that the quantity 312 of controllers 109A-D is four, an old position field 517 indicating an old position 309 of the controller 109A, a priority field 519 indicating that the controller 109A has the highest priority 318, and a connected controller ID field 520X indicating the controller ID 315 of the controllers 109A-D.

Figure 7A:
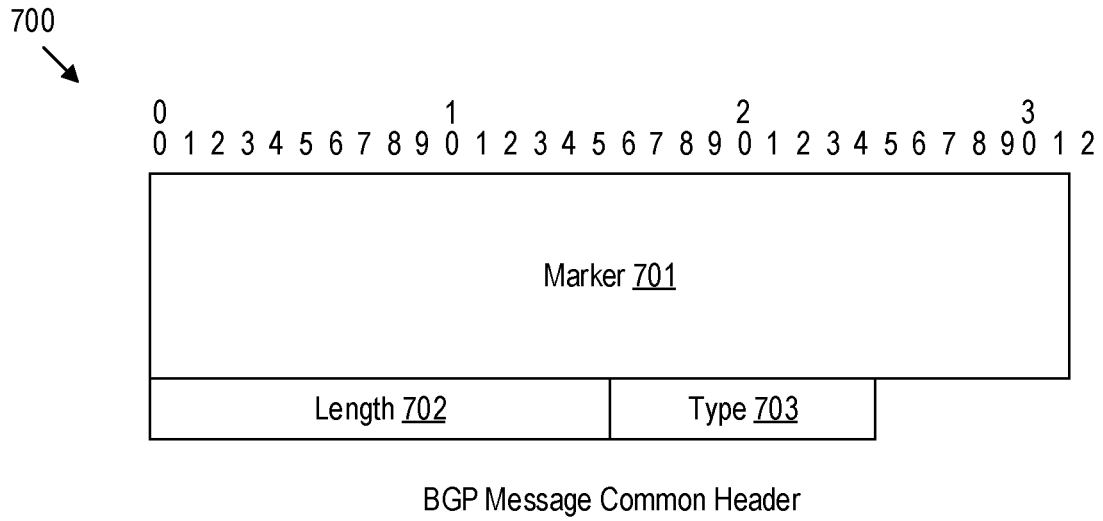
FIGS. 7A-C are diagrams illustrating a BGP common header included in a new BGP message or an existing BGP message according to various embodiments of the disclosure.
Figure 7B:
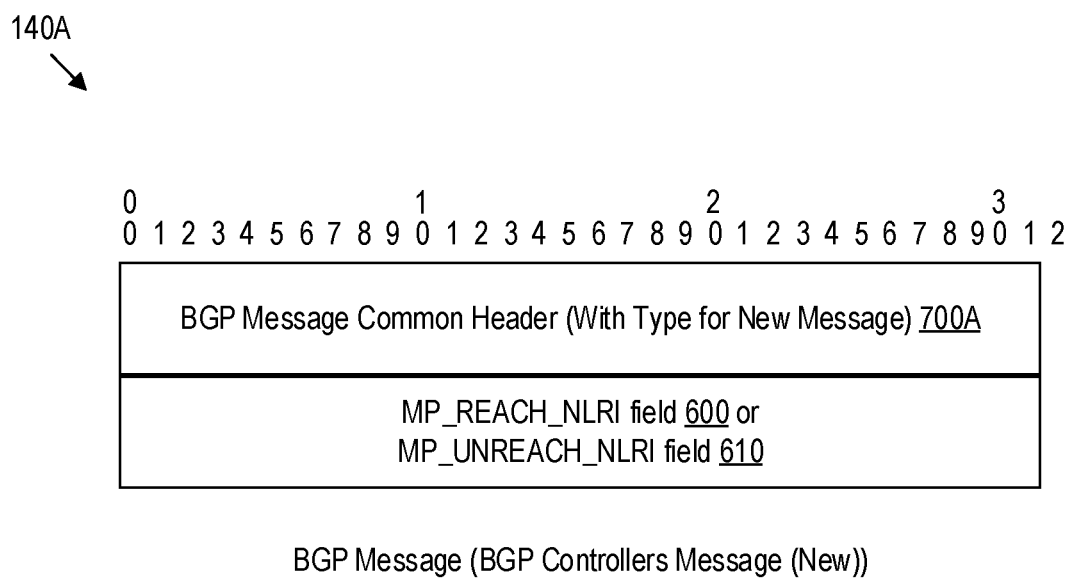
Figure 7C:

FIGS. 7A-C are diagrams illustrating a BGP common header into a new BGP message 140 or an existing BGP message 140 according to various embodiments of the disclosure. In particular, FIG. 7A shows a BGP message common header included in a BGP message 140. FIG. 7B shows a BGP message common header included in a BGP message 140 encoded as a new type of BGP message 140. FIG. 7C shows a BGP message common header included in a BGP message 140 encoded as a BGP UPDATE message pursuant to RFC 4271.

Referring now to FIG. 7A, shown is a BGP message common header 700. The BGP message common header 700 can be used as a header to a new type of BGP message 140, which is defined to carry to controllers NLRI 503, and can be used as a header for existing BGP messages 140, such as the BGP UPDATE message. As shown by FIG. 7A, the BGP message common header 700 includes a marker field 701, a length field 702, and a type field 703. The marker field 701 is a 16 octet field set to one. The length field 702 is a 2 octet field that indicates a total length of the BGP message 140, including the BGP message common header 700. The type field 703 is a 1 octet field carrying a value defined by the IANA. The value indicates a type of the BGP message 140. For example, a first value indicates that the BGP message 140 is a new type of BGP message 140, and a second value indicates that BGP message 140 is an existing type of BGP message 140, such as a BGP UPDATE message.

Referring now to FIG. 7B, shown is a new BGP message 140A, which is encoded as a new type of BGP message 140A. The new BGP message 140A includes a BGP message common header 700A, which includes a value in the type field 703 indicating that the message is encoded as a new type of BGP message 140A. The new BGP message 140A also includes either the MP_REACH_NLRI 600 or the MP_UNREACH_NLRI 610, depending on whether the new BGP message 140A indicates information about reachable or unreachable controllers 109A-D. As described above, the MP_REACH_NLRI 600 contains the controllers NLRI field 510, and the MP_UNREACH_NLRI 610 contains the unreach controllers NLRI field 615.

Referring now to FIG. 7C, shown is an existing BGP UPDATE message 140B, which is encoded pursuant to RFC 4271. The existing BGP UPDATE message 140B includes BGP message common header 700B, which includes a value in the type field 703 indicating that the message is encoded as an existing type of BGP message 140B. The existing BGP UPDATE message 140B includes a withdrawn routes length field 753, a withdrawn routes field 756, a path attributes length field 759, and a path attributes field 762. The withdrawn routes length field 753 indicates a total length of the withdrawn routes, which may be set to 0 in this BGP UPDATE message 140B, since routes are not being withdrawn. The withdrawn routes field 756 is left empty since there are no route to be withdrawn by this BGP UPDATE message 140B. The path attributes length field 759 is a 2 octet field indicating a total length of the path attributes field 762. The path attributes field 762 includes either the MP_REACH_NLRI 600 or the MP_UNREACH_NLRI 610, depending on whether the existing BGP UPDATE message 140B indicates information about reachable or unreachable controllers 109A-D. As described above, the MP_REACH_NLRI 600 contains the controllers NLRI field 510, and the MP_UNREACH_NLRI 610 contains the unreach controllers NLRI field 615.

Figure 8A:
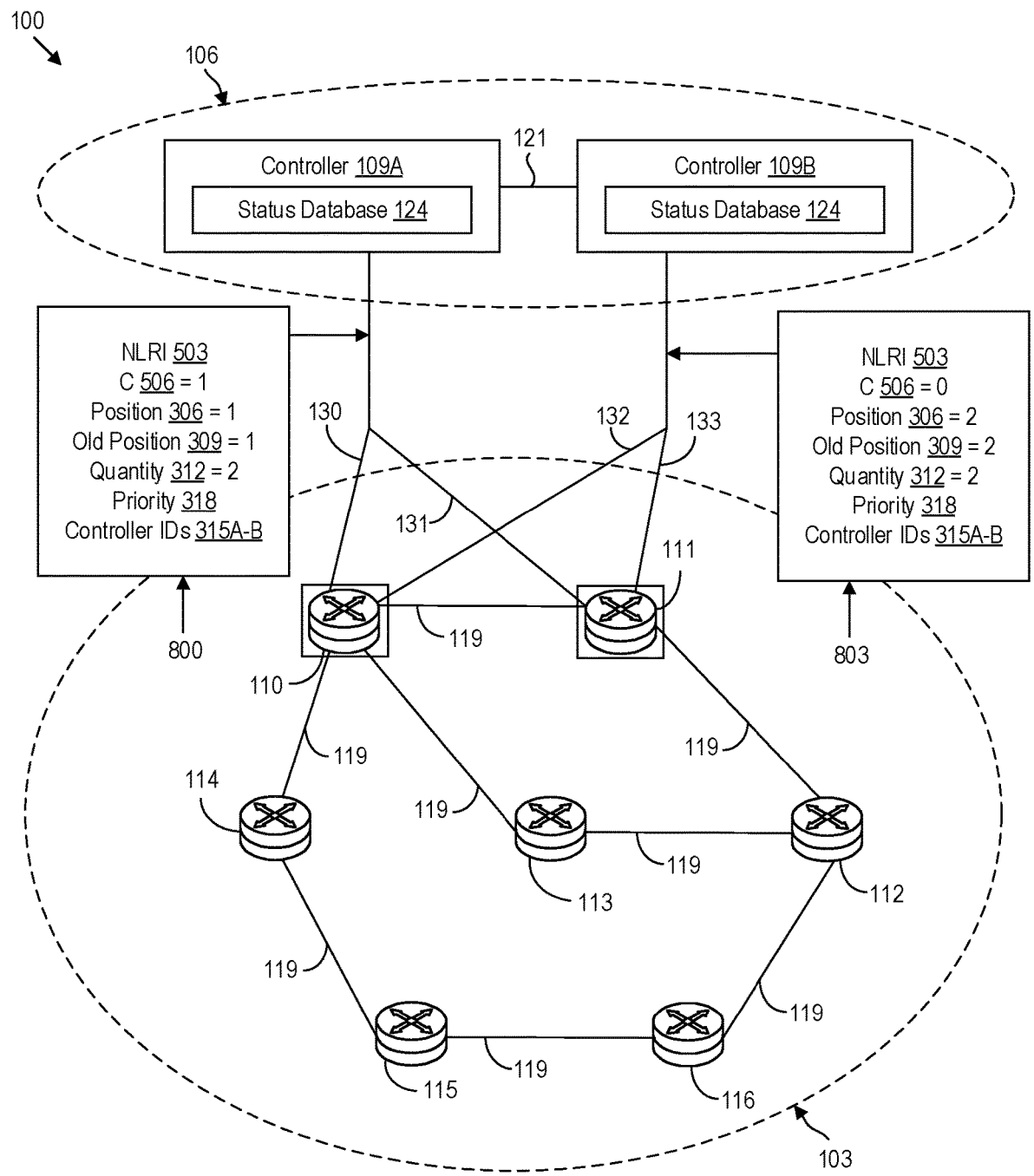

FIGS. 8A-C are diagrams showing BGP messages 140 communicated through the controller cluster network 100 of FIG. 1 before any failures occur to the cluster 106 in the controller cluster network 100 according to various embodiments of the disclosure. In particular, FIG. 8A shows the transmission of BGP messages 140 communicated through the controller cluster network 100 of FIG. 1. FIGS. 8B-C shows TLVs used to encode the BGP messages 140 communicated through the controller cluster network 100 of FIG. 8A.

Referring now to FIG. 8A, shown is a diagram illustrating the transmission of BGP messages 800 and 803 through the controller cluster network 100 of FIG. 1 according to various embodiments of the disclosure. In FIG. 8A, the BGP messages 800 and 803 are sent before any failures occur to the cluster 106 in the controller cluster network 100.

As shown in FIG. 8A, controller 109A generates a BGP message 800, which may be encoded as a new BGP message 140A or an existing BGP UPDATE message 140B. The BGP message 800 includes the controllers NLRI 503 of FIG. 5A. The controllers NLRI 503 of the BGP message 800 includes the primary controller flag (C) 506 (shown as "C" in FIG. 8A), the position 306, the old position 309, the quantity 312, the priority 318, and the controller IDs 315A-B. The primary controller flag (C) 506 is set to 1, indicating that the controller 109A sending the BGP message 800 (also referred to herein as the "originating controller 109A") is the primary controller 109A of the controller cluster network 100. The position 306 is 1, which indicates a first position in the order of priority of the controllers 109A-D that are reachable in the cluster 106. The old position 309 also indicates a value of 1, for example, because the controller 109A has been the primary controller 109A since initialization of the cluster 106 with controllers 109A-B. The quantity 312 of controllers 109A-B indicates that there are two controllers 109A-B in the cluster 106. The priority 318 indicates that controller 109A has the highest priority 318 in the cluster 106. The controller IDs 315A-B include a controller ID 315A identifying controller 109A and a controller ID 315B identifying controller 109B.

Controller 109A transmits the BGP message 800 to NE 110 through the enhanced BGP session 130. NE 110 forwards the BGP message 800 to controller 109B through the enhanced BGP session 132. Controller 109B determines that controller 109A is still reachable and available upon receiving the BGP message 800 and updates the status database 124 to include data from the BGP message 800.

Controller 109A transmits the BGP message 800 to NE 111 through the enhanced BGP session 131. NE 111 forwards the BGP message 800 to controller 109B through the enhanced BGP session 133. Controller 109B determines that controller 109A is still reachable and available upon receiving the BGP message 800 and updates the status database 124 to include data from the BGP message 800.

Similarly, controller 109B generates a BGP message 803, which may be encoded as a new BGP message 140A or an existing BGP UPDATE message 140B. The BGP message 803 includes the controllers NLRI 503, which includes the primary controller flag (C) 506 (shown as "C" in FIG. 8A), the position 306, the old position 309, the quantity 312, the priority 318, and the controller IDs 315A-B. The primary controller flag (C) 506 is set to 0, indicating that the controller 109B sending the BGP message 803 (also referred to herein as the "originating controller 109B") is not the primary controller 109A of the controller cluster network 100. The position 306 is a value of 2, which indicates a secondary position in the order of priority of the controllers 109A-D that are reachable in the cluster 106. The position 306 value of 2 also indicates that the controller 109B is a backup to the primary controller 109A. The old position 309 also indicates a value of 2, for example, because the controller 109B has been the secondary controller 109B since initialization of the cluster 106 with controllers 109A-B. The quantity 312 of controllers 109A-B indicates that there are 2 controllers 109A-B in the cluster 106. The priority 318 indicates that controller 109B has the second highest priority 318 in the cluster 106. The controller IDs 315A-B include a controller ID 315A identifying controller 109A and a controller ID 315B identifying controller 109B.

Controller 109B transmits the BGP message 803 to NE 110 through the enhanced BGP session 132. NE 110 forwards the BGP message 803 to controller 109A through the enhanced BGP session 130. Controller 109A determines that controller 109B is still reachable and available upon receiving the BGP message 803 and updates the status database 124 to include data from the BGP message 803.

Controller 109B transmits the BGP message 803 to NE 111 through the enhanced BGP session 133. NE 111 forwards the BGP message 803 to controller 109A through the enhanced BGP session 131. Controller 109A again determines that controller 109B is still reachable and available upon receiving the BGP message 803 and updates the status database 124 to include data from the BGP message 803.

Referring now to FIG. 8B, shown is a TLV of the BGP message 800 generated by the controller 109A encoded in a format similar to the controllers NLRI field 510 of FIG. 5B. The TLV of the BGP message 800 includes the type field 511, the length field 512, the flags 513, the position field 515, the number of controllers field 516, the old position field 517, the reserved bits 518, the priority field 519, and the connected controller IDs field 520A-N. In the TLV of the BGP message 800, the flags 513 include the C bit 514, which is set to 1 to indicate that the controller 109A is the primary controller 109A. The position field 515 includes the position 306 of the controller 109A, indicating a value of 1. The number of controllers field 516 includes the quantity 312 of controllers 109A-B, indicating a value of 2. The old position field 517 includes the old position 309 of the controller 109A, indicating a value of 1. The priority field 519 includes a value indicating that the controller 109A has the highest priority 318. The connected controller IDs field 520A-N includes the controller IDs 315A-B of the controllers 109A-B, respectively.

Referring now to FIG. 8C, shown is a TLV of the BGP message 803 generated by the controller 109B encoded in a format similar to the controllers NLRI field 510. The TLV of the BGP message 803 includes the type field 511, the length field 512, the flags 513, the position field 515, the number of controllers field 516, the old position field 517, the reserved bits 518, the priority field 519, and the connected controller IDs field 520A-N. In the TLV of the BGP message 803, the flags 513 include the C bit 514, which is set to 0 to indicate that the controller 109B is not a primary controller. The position field 515 includes the position 306 of the controller 109B, indicating a value of 2. The number of controllers field 516 includes the quantity 312 of controllers 109A-B, indicating a value of 2. The old position field 517 includes the old position 309 of the controller 109B, indicating a value of 2. The priority field 519 includes a value indicating that the controller 109B has the second highest priority 318. The connected controller IDs field 520A-N includes the controller IDs 315A-B of the controllers 109A-B, respectively.

Figure 9A:
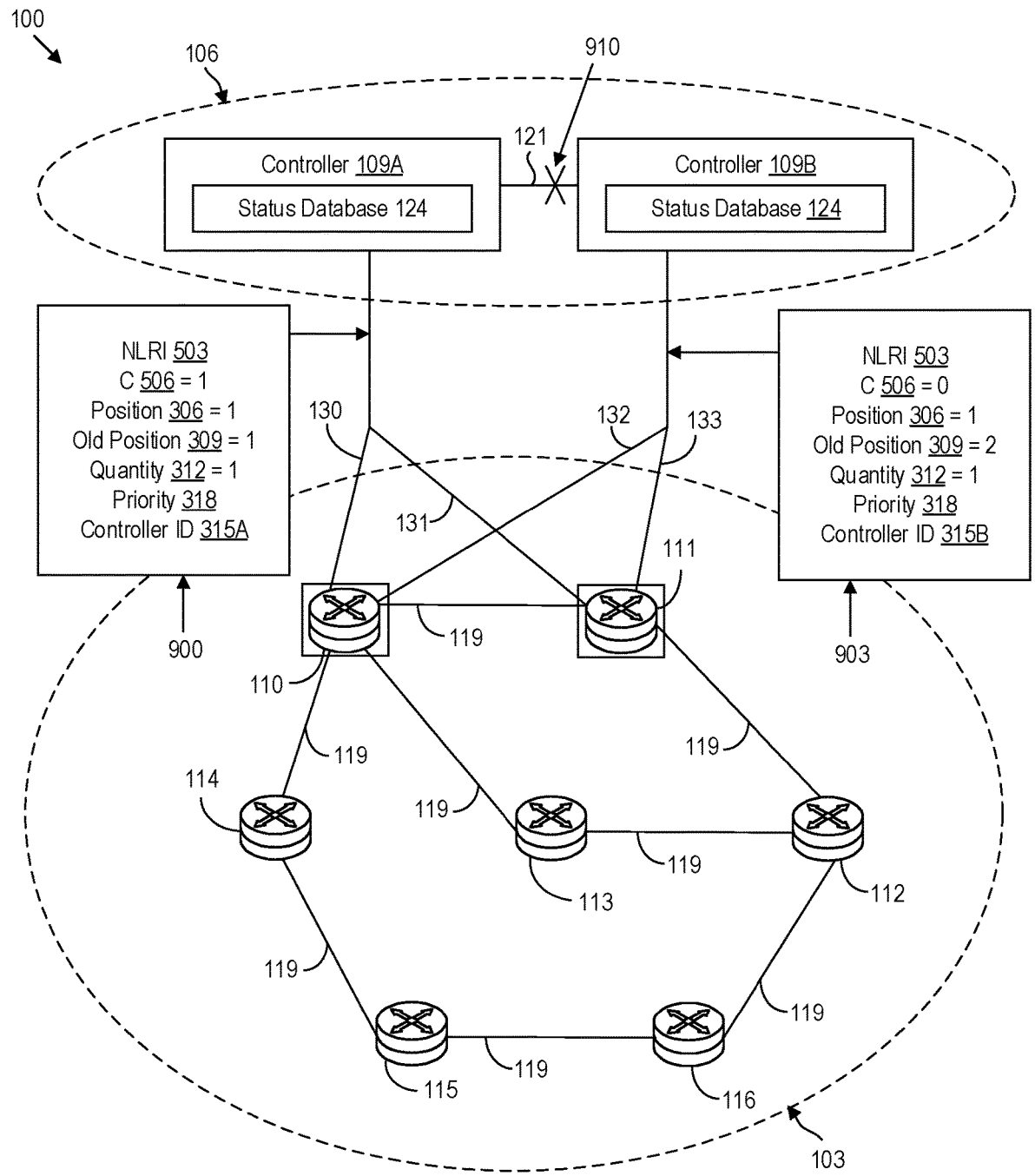
FIGS. 9A-C are diagrams showing BGP messages communicated through the controller cluster network after a failure occurs to the cluster in the controller cluster network according to various embodiments of the disclosure.
Figure 9B:
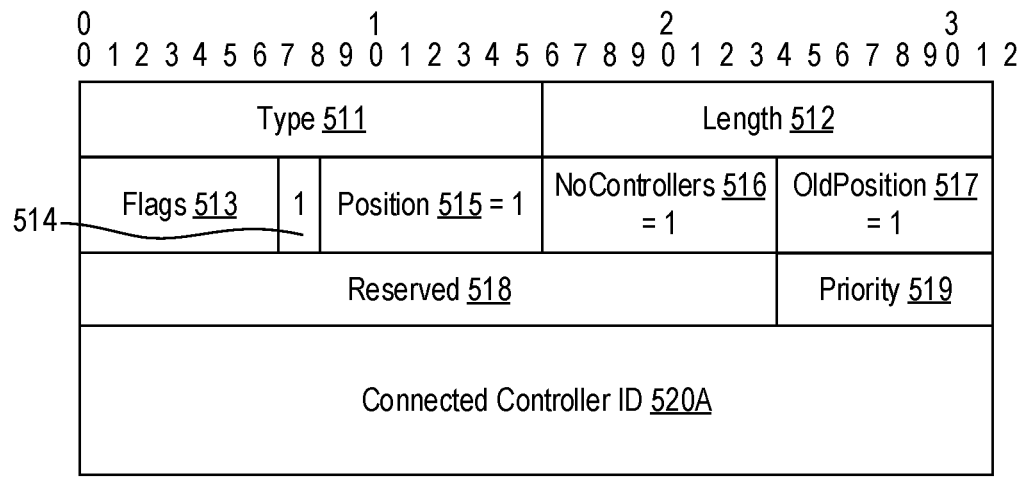
Figure 9C:
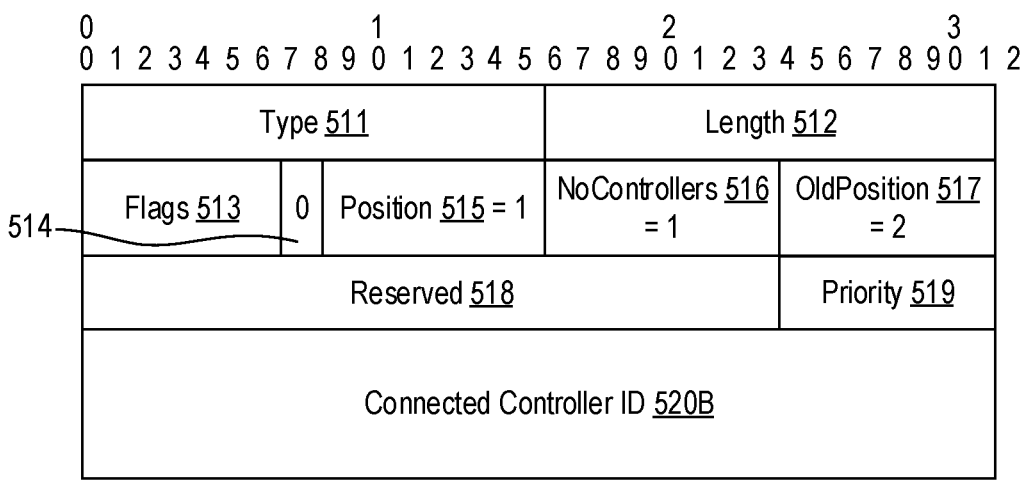

FIGS. 9A-C are diagrams showing BGP messages 140 communicated through the controller cluster network 100 after a failure occurs to the cluster 106 in the controller cluster network 100 according to various embodiments of the disclosure. In particular, FIG. 9A shows the transmission of BGP messages 140 communicated through the controller cluster network 100 after a failure occurs to the cluster 106. FIGS. 9B-C show TLVs used to encode the BGP messages 140 communicated through the controller cluster network 100.

Referring now to FIG. 9A, shown is a diagram illustrating the transmission of BGP messages 900 and 903 through the controller cluster network 100 of FIG. 1 according to various embodiments of the disclosure. In FIG. 9A, the BGP messages 900 and 903 are sent after controllers 109A and 109B detect the failure 910 occurring at link 121 interconnecting controllers 109A and 109B.

In FIG. 9A, controller 109A generates a BGP message 900 after detecting that the failure 910 occurs at link 121 interconnecting controllers 109A and 109B. When the failure 910 occurs at link 121 interconnecting controllers 109A and 109B, the controller 109A is no longer connected to controller 109B, and thus, the controller 109A assumes that controller 109B has failed and become unreachable. This detection triggers controller 109A to generate a BGP message 900 containing updated information regarding the cluster 106, and the BGP message 900 may be encoded as a new BGP message 140A or an existing BGP UPDATE message 140B.

The contents of the BGP message 900 are similar to the contents of the BGP message 800 sent before the failure 910 occurs in the controller cluster network 100, and the fields of the BGP message 900 are similar to the fields of the BGP message 800 sent before the failure 910 occurs in the controller cluster network 100. However, in the BGP message 900, the quantity 312 of controllers 109A in the cluster 106 indicates that there is only one controller in the cluster 106, since controller 109A can no longer detect the presence of controller 109B. Similarly, the controller IDs 315A-B only indicate a controller ID 315A identifying controller 109A, since controller 109A can no longer detect the presence of controller 109B.

Similarly, controller 109B generates a BGP message 903 after detecting that the failure 910 occurs at link 121 interconnecting controllers 109A and 109B. When the failure 910 occurs at link 121 interconnecting controllers 109A and 109B, the controller 109B is no longer connected to controller 109A, and thus, the controller 109B assumes that the primary controller 109A has failed and become unreachable. This detection triggers controller 109B to generate a BGP message 903 containing updated information regarding the cluster 106, and the BGP message 903 may be encoded as a new BGP message 140A or an existing BGP UPDATE message 140B. This detection also triggers controller 109B to wait a predetermined period of time to determine whether a message has been received that originated from the primary controller 109A, indicating that the primary controller 109A is still reachable and active.

The contents of the BGP message 903 are similar to the contents of the BGP message 803 sent before the failure 910 occurs in the controller cluster network 100, and the fields of the BGP message 903 are similar to the fields of the BGP message 800 sent before the failure 910 occurs in the controller cluster network 100. However, in the BGP message 903, the position 306 of the controller 109B is updated to be 1, indicating that the intended position of the controller 109B after detecting the failure 910 is 1. The position 306 of 1 indicates that controller 109B is to become the primary controller of the controller cluster network 100. In addition, the quantity 312 of controllers 109B in the cluster 106 indicates that there is only one controller 109B in the cluster 106, since controller 109B can no longer detect the presence of controller 109A. Similarly, the controller IDs 315A-B only indicate a controller ID 315B identifying controller 109B, since controller 109B can no longer detect the presence of controller 109A.

After generating the BGP message 900, controller 109A transmits the BGP message 900 to NE 110 through the enhanced BGP session 130. NE 110 forwards the BGP message 900 to controller 109B through the enhanced BGP session 132. Similarly, controller 109A transmits the BGP message 900 to NE 111 through the enhanced BGP session 131. NE 111 forwards the BGP message 900 to controller 109B through the enhanced BGP session 133. Controller 109B determines that controller 109A is still reachable and available upon receiving the BGP message 900, and determines that the controller 109A is still the primary controller 109A of the controller cluster network 100. In this way, the controller 109B does not mistakenly promote itself to become the primary controller of the control cluster network 100.

Referring now to FIG. 9B, shown is a TLV of the BGP message 900 generated by the controller 109A encoded in a format similar to the controllers NLRI field 510 of FIG. 5B. The controller 109A generates and sends the BGP message 900 after detecting the failure 910 of the link 121.

The TLV of the BGP message 900 includes the type field 511, the length field 512, the flags 513, the position field 515, the number of controllers field 516, the old position field 517, the reserved bits 518, the priority field 519, and the connected controller ID field 520A. In the TLV of the BGP message 900, the flags 513 include the C bit 514, which is set to 1 to indicate that the controller 109A is the primary controller 109A. The position field 515 includes the position 306 of the controller 109A, indicating a value of 1. The number of controllers field 516 includes the quantity 312 of controllers 109A in the cluster 106, indicating a value of 1, since controller 109A is no longer connected to controller 109B and can no longer detect the presence of controller 109B. The old position field 517 includes the old position 309 of the controller 109A, indicating a value of 1. The priority field 519 includes a value indicating that the controller 109A has the highest priority 318. The connected controller ID field 520A only includes the controller ID 315A of controller 109A, since controller 109A is no longer connected to controller 109B and can no longer detect the presence of controller 109B.

Referring now to FIG. 9C, shown is a TLV of the BGP message 903 generated by the controller 109B encoded in a format similar to the controllers NLRI field 510. The controller 109B generates and sends the BGP message 903 after detecting the failure 910 of the link 121.

The TLV of the BGP message 903 includes the type field 511, the length field 512, the flags 513, the position field 515, the number of controllers field 516, the old position field 517, the reserved bits 518, the priority field 519, and the connected controller IDs field 520A-N. In the TLV of the BGP message 903, the flags 513 include the C bit 514, which is set to 0 to indicate that the controller 109B is not the primary controller 109A. The position field 515 includes the position 306 of the controller 109B, indicating a value of 1. The number of controllers field 516 includes the quantity 312 of controllers 109A-B, indicating a value of 1, since controller 109B is no longer connected to controller 109A and can no longer detect the presence of controller 109A. The old position field 517 includes the old position 309 of the controller 109B, indicating a value of 2. The priority field 519 includes a value indicating that the controller 109B has the second highest priority 318. The connected controller ID field 520B only includes the controller ID 315B of controller 109B, since controller 109A is no longer connected to controller 109B and can no longer detect the presence of controller 109A.

Figure 10A:
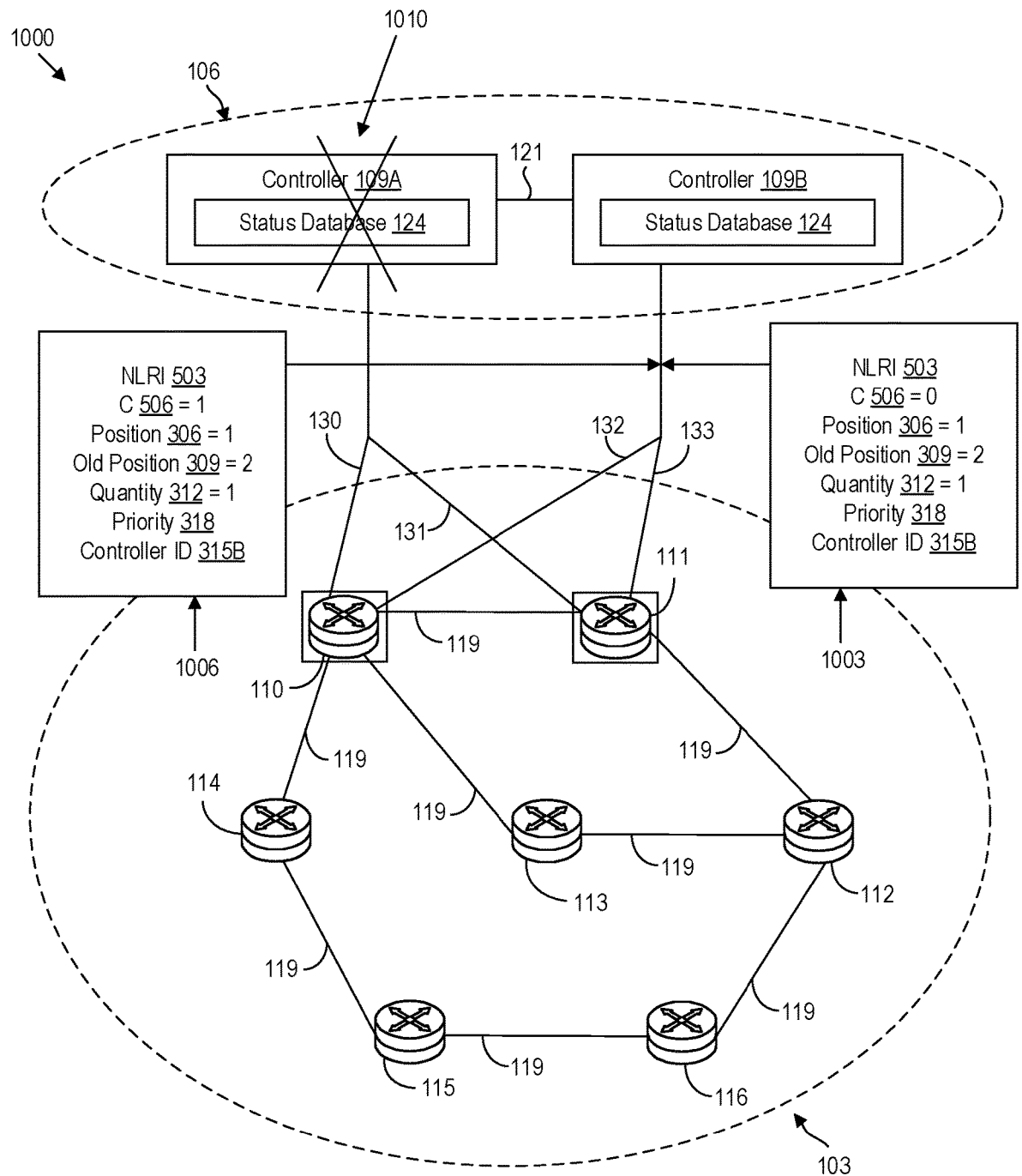
FIGS. 10A-C are diagrams showing BGP messages communicated through the controller cluster network after a failure occurs to the primary controller in the cluster of the controller cluster network according to various embodiments of the disclosure.
Figure 10B:
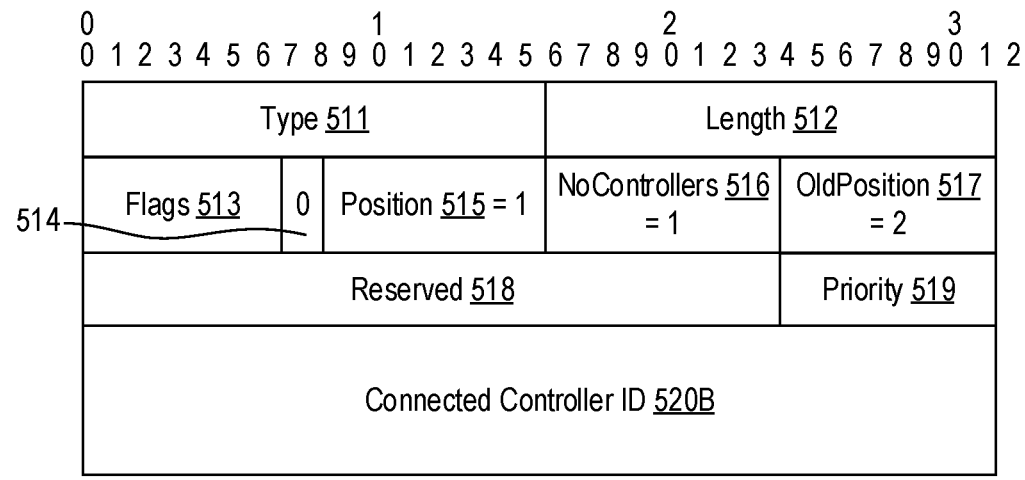
Figure 10C:
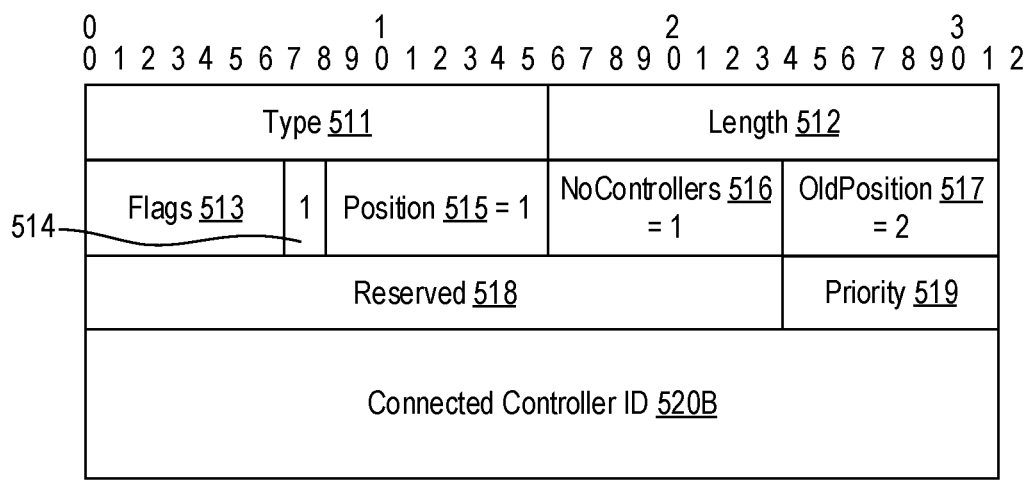

FIGS. 10A-C are diagrams showing BGP messages 140 communicated through the controller cluster network 100 after a failure occurs to the primary controller 109A in the cluster 106 of the controller cluster network 100 according to various embodiments of the disclosure. In particular, FIG. 10A shows the transmission of BGP messages 140 communicated through the controller cluster network 100 after a failure occurs to the primary controller 109A. FIGS. 10B-C show TLVs used to encode the BGP messages 140 communicated through the controller cluster network 100.

Referring now to FIG. 10A, shown is a diagram illustrating the transmission of BGP message 1003 through the controller cluster network 100 of FIG. 1 according to various embodiments of the disclosure. In FIG. 10A, controller 109A has failed, so controller 109A does not generate any message. Controller 109B detects that the failure 1010 occurs at controller 109A when a message or heartbeat message is not received from controller 109A within a predetermined period of time. At this state, controller 109B determines that controller 109A has failed and become unreachable. This detection triggers controller 109B to generate a BGP message 1003 containing updated information regarding the cluster 106, and the BGP message 1003 may be encoded as a new BGP message 140A or an existing BGP UPDATE message 140B.

The contents of the BGP message 1003 are similar to the contents of the BGP message 903 of FIG. 9A. In the BGP message 1003, the position 306 of the controller 109B is updated to be 1, indicating that the intended position of the controller 109B after detecting the failure 1010 is 1. The position of 1 indicates that the controller 109B should become the primary controller of the controller cluster network 100. In addition, the quantity 312 of controllers 109B in the cluster 106 indicates that there is only 1 controller in the cluster 106. Further, the controller IDs 315A-B only indicates a controller ID 315B identifying controller 109B.

After generating the BGP message 1003, controller 109B transmits the BGP message 1003 to NE 110 through the enhanced BGP session 132. Similarly, controller 109B transmits the BGP message 1003 to NE 111 through the enhanced BGP session 133.

At this point, controller 109B waits a predetermined period of time to determine whether a heartbeat or any other message is received that originated from the original primary controller 109A. When a heartbeat or message that originated from the primary controller 109A is not received within the predetermined time period, controller 109B determines that controller 109B is now the primary controller 109B of the controller cluster network 100. To this end, controller 109B generates and sends another BGP message 1006, which is substantially the same as the BGP message 1003. However, in BGP message 1006, the primary controller flag (C) 506 set to indicate that controller 109B is the primary controller 109B of the controller cluster network 100.

Referring now to FIG. 10B, shown is a TLV of the BGP message 1003 generated by the controller 109B encoded in a format similar to the controllers NLRI field 510 of FIG. 5A. The controller 109B generates and sends the BGP message 1003 after detecting the failure 1010 of the primary controller of the controller cluster network 100, but before the controller 109B becomes the primary controller of the controller cluster network 100.

The TLV of the BGP message 1003 includes the type field 511, the length field 512, the flags 513, the position field 515, the number of controllers field 516, the old position field 517, the reserved bits 518, the priority field 519, and the connected controller ID field 520B. In the TLV of the BGP message 1003, the flags 513 include the C bit 514, which is set to 0 to indicate that the controller 109B is not yet the primary controller of the controller cluster network 100. The position field 515 includes the position 306 of the controller 109B, indicating a value of 1, since the controller 109B should be the primary controller of the controller cluster network 100. The number of controllers field 516 includes the quantity 312 of controllers 109B in the cluster 106, indicating a value of 1, since controller 109A has failed. The old position field 517 includes the old position 309 of the controller 109B, indicating a value of 2. The priority field 519 includes a value indicating that the controller 109B has the second highest priority 318. The connected controller ID field 520B includes the controller ID 315B of controller 109B, since controller 109A has failed.

Referring now to FIG. 10C, shown is a TLV of the BGP message 1006 generated by the controller 109B encoded in a format similar to the controllers NLRI field 510. The controller 109B generates and sends the BGP message 1006 after detecting the failure 1010 of the primary controller of the controller cluster network 100, and after becoming the primary controller of the controller cluster network 100.

The TLV of the BGP message 1006 includes the type field 511, the length field 512, the flags 513, the position field 515, the number of controllers field 516, the old position field 517, the reserved bits 518, the priority field 519, and the connected controller ID field 520B. In the TLV of the BGP message 1006, the flags 513 include the C bit 514, which is set to 1 to indicate that the controller 109B is now the primary controller of the controller cluster network 100. The position field 515 includes the position 306 of the controller 109B, indicating a value of 1. The number of controllers field 516 includes the quantity 312 of controllers 109B in the controller cluster network 100, indicating a value of 1. The old position field 517 includes the old position 309 of the controller 109B, indicating a value of 2. The priority field 519 includes a value indicating that the controller 109B has the second highest priority 318. The connected controller ID field 520B includes the controller ID 315B of controller 109B.

Figure 11A:
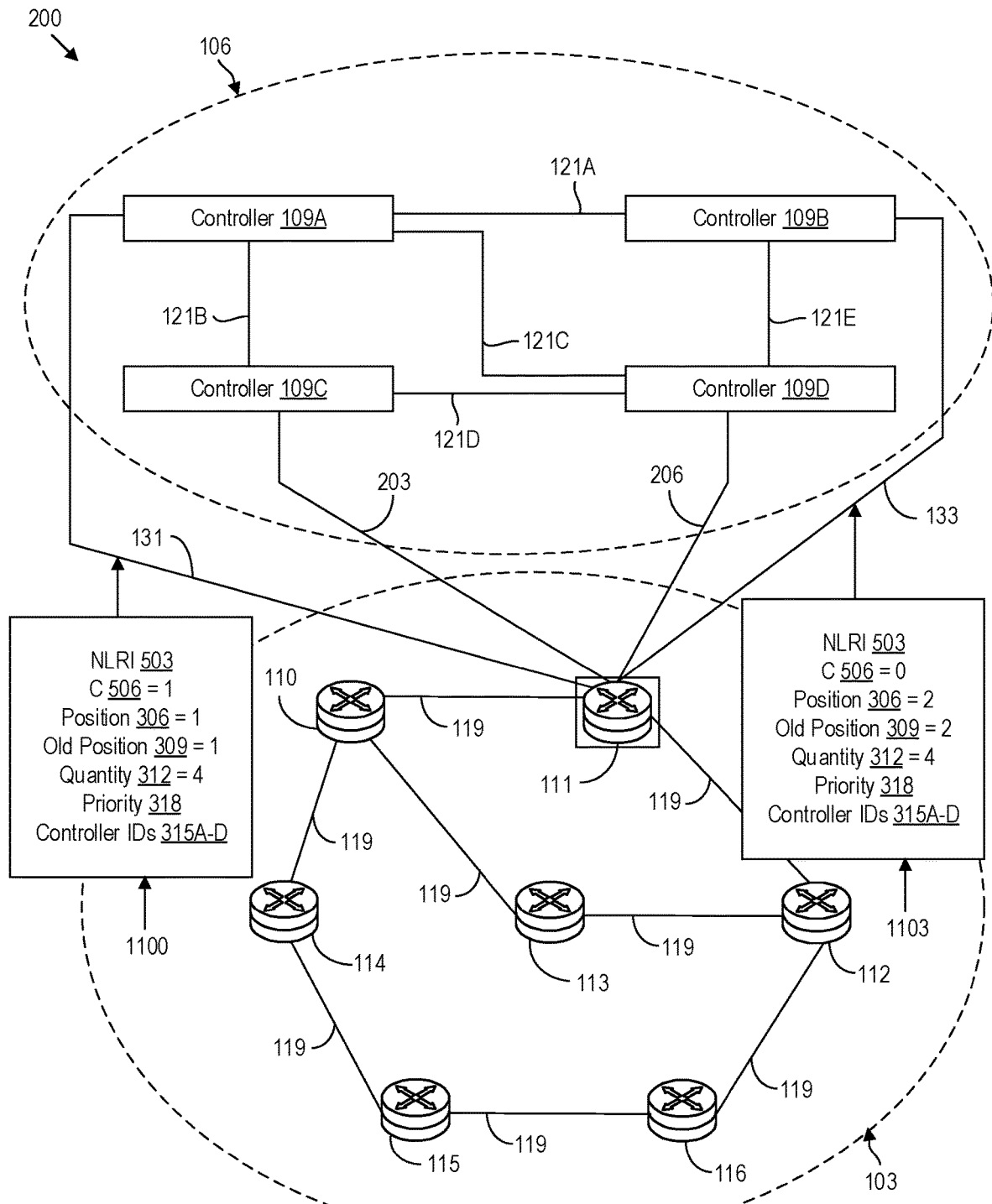
FIGS. 11A-C are diagrams showing BGP messages communicated through the controller cluster network before any failures occur to the cluster in the controller cluster network according to various embodiments of the disclosure.
Figure 11B:
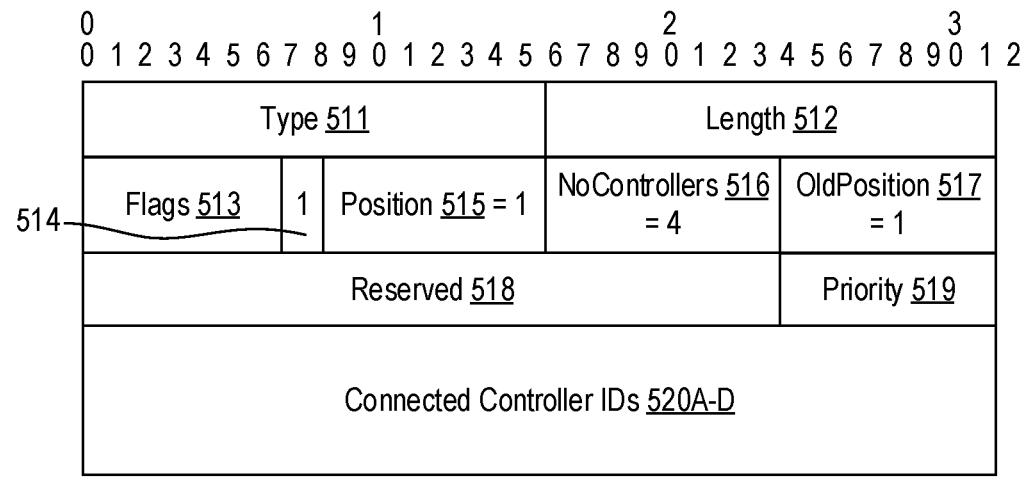
Figure 11C:
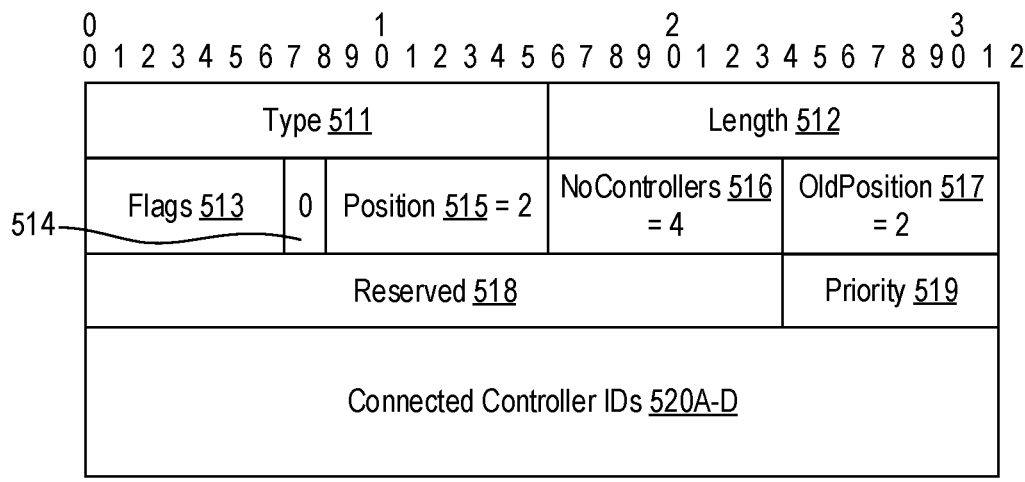

FIGS. 11A-C are diagrams showing BGP messages 140 communicated through the controller cluster network 200 before any failures occur to the cluster 106 in the controller cluster network 200 according to various embodiments of the disclosure. In particular, FIG. 11A shows the transmission of BGP messages 140 communicated through the controller cluster network 200 of FIG. 2. FIGS. 11B-C show TLVs used to encode the BGP messages 140 communicated through the controller cluster network 200 of FIG. 2

Referring now to FIG. 11A, shown is a diagram illustrating the transmission of BGP messages 1100 and 1103 through the controller cluster network 200 of FIG. 2 according to various embodiments of the disclosure. In FIG. 11A, the BGP messages 1100 and 1103 are sent before any failures occur to the cluster 106 in the controller cluster network 200.

As shown in FIG. 11A, controller 109A generates a BGP message 1100, which may be encoded as a new BGP message 140A or an existing BGP UPDATE message 140B. The BGP message 1100 includes the controllers NLRI 503 of FIG. 5A. The controllers NLRI 503 of the BGP message 1100 includes the primary controller flag (C) 506 (shown as "C" in FIG. 11A), the position 306, the old position 309, the quantity 312, the priority 318, and the controller IDs 315A-D. The primary controller flag (C) 506 is set to 1, indicating that the controller 109A sending the BGP message 1100 (also referred to herein as the "originating controller 109A") is the primary controller 109A of the controller cluster network 200. The position 306 is a value of 1, which indicates a first position in the order of priority of the controllers 109A-D that are reachable in the cluster 106. The old position 309 also indicates a value of 1, for example, because the controller 109A has been the primary controller 109A since initialization of the cluster 106 with controllers 109A-D. The quantity 312 of controllers 109A-D indicates that there are four controllers 109A-D in the cluster 106. The priority 318 indicates that controller 109A has the highest priority 318 in the cluster 106. The controller IDs 315A-D include a controller ID 315A identifying controller 109A, controller ID 315B identifying controller 109B, controller ID 315C identifying controller 109C, and controller ID 315D identifying controller 109D.

Controller 109A transmits the BGP message 1100 to NE 111 through the enhanced BGP session 131. NE 111 forwards the BGP message 1100 to all the other controllers 109B-D in the cluster 106. Controllers 109B-D each determines that controller 109A is still reachable and available upon receiving the BGP message 1100 and updates the status database 124 to include data from the BGP message 1100.

Similarly, controller 109B generates a BGP message 1103, which may be encoded as a new BGP message 140A or an existing BGP UPDATE message 140B. The BGP message 1103 includes the controllers NLRI 503, which includes the primary controller flag (C) 506 (shown as "C"

in FIG. 11A), the position 306, the old position 309, the quantity 312, the priority 318, and the controller IDs 315A-D. The primary controller flag (C) 506 is set to 0, indicating that the controller 109B sending the BGP message 1103 is not the primary controller of the controller cluster network 200. The position 306 is a value of 2, which indicates a secondary position in the order of priority of the controllers 109A-D that are reachable in the cluster 106. The position 306 value of 2 also indicates that the controller 109B a backup to the primary controller 109A. The old position 309 also indicates a value of 2, for example, because the controller 109B has been the secondary controller 109B since initialization of the cluster 106 with controllers 109A-D. The quantity 312 of controllers 109A-D indicates that there are four controllers 109A-D in the cluster 106. The priority 318 indicates that controller 109B has the second highest priority 318 in the cluster 106. The controller IDs 315A-D include a controller ID 315A identifying controller 109A, controller ID 315B identifying controller 109B, controller ID 315C identifying controller 109C, and controller ID 315D identifying controller 109D.

Controller 109B transmits the BGP message 1103 to NE 111 through the enhanced BGP session 133. NE 111 forwards the BGP message 1103 to all the other controllers 109A and C-D in the cluster 106. Controllers 109A and C-D each determines that controller 109B is still reachable and available upon receiving the BGP message 1103 and updates the status database 124 to include data from the BGP message 1103.

Controllers 109C and 109D similarly generate and send BGP messages 1100 and 1103 to the NE 111. NE 111 forwards the BGP messages 1100 and 1103 to the other controllers 109A-D in the cluster 106. In this way, each of the controllers 109A-D maintains information regarding a most recent status of each of the other controllers 109A-D in the controller cluster network 200, by transmitting the BGP messages 1100 and 1103 through NE 111.

Referring now to FIG. 11B, shown is a TLV of the BGP message 1100 generated by controller 109A encoded in a format similar to the controllers NLRI field 510 of FIG. 5B. The TLV of the BGP message 1100 includes the type field 511, the length field 512, the flags 513, the position field 515, the number of controllers field 516, the old position field 517, the reserved bits 518, the priority field 519, and the connected controller IDs field 520A-D. In the TLV of the BGP message 1100, the flags 513 include the C bit 514, which is set to 1 to indicate that the controller 109A is the primary controller 109A. The position field 515 includes the position 306 of the controller 109A, indicating a value of 1. The number of controllers field 516 includes the quantity 312 of controllers 109A-D, indicating a value of 4. The old position field 517 includes the old position 309 of the controller 109A, indicating a value of 1. The priority field 519 includes a value indicating that the controller 109A has the highest priority 318. The connected controller IDs field 520A-D includes the controller IDs 315A-D of the controllers 109A-D, respectively.

Referring now to FIG. 11C, shown is a TLV of the BGP message 1103 generated by the controller 109B encoded in a format similar to the controllers NLRI field 510. The TLV of the BGP message 1103 includes the type field 511, the length field 512, the flags 513, the position field 515, the number of controllers field 516, the old position field 517, the reserved bits 518, the priority field 519, and the connected controller IDs field 520A-D. In the TLV of the BGP message 1103, the flags 513 include the C bit 514, which is set to 0 to indicate that the controller 109B is not a primary controller. The position field 515 includes the position 306 of the controller 109B, ndicating a value of 2. The number of controllers field 516 includes the quantity 312 of controllers 109A-D, indicating a value of 4. The old position field 517 includes the old position 309 of the controller 109B, indicating a value of 2. The priority field 519 includes a value indicating that the controller 109B has the second highest priority 318. The connected controller IDs field 520A-D includes the controller IDs 315A-D of the controllers 109A-D, respectively.

Figure 12A:
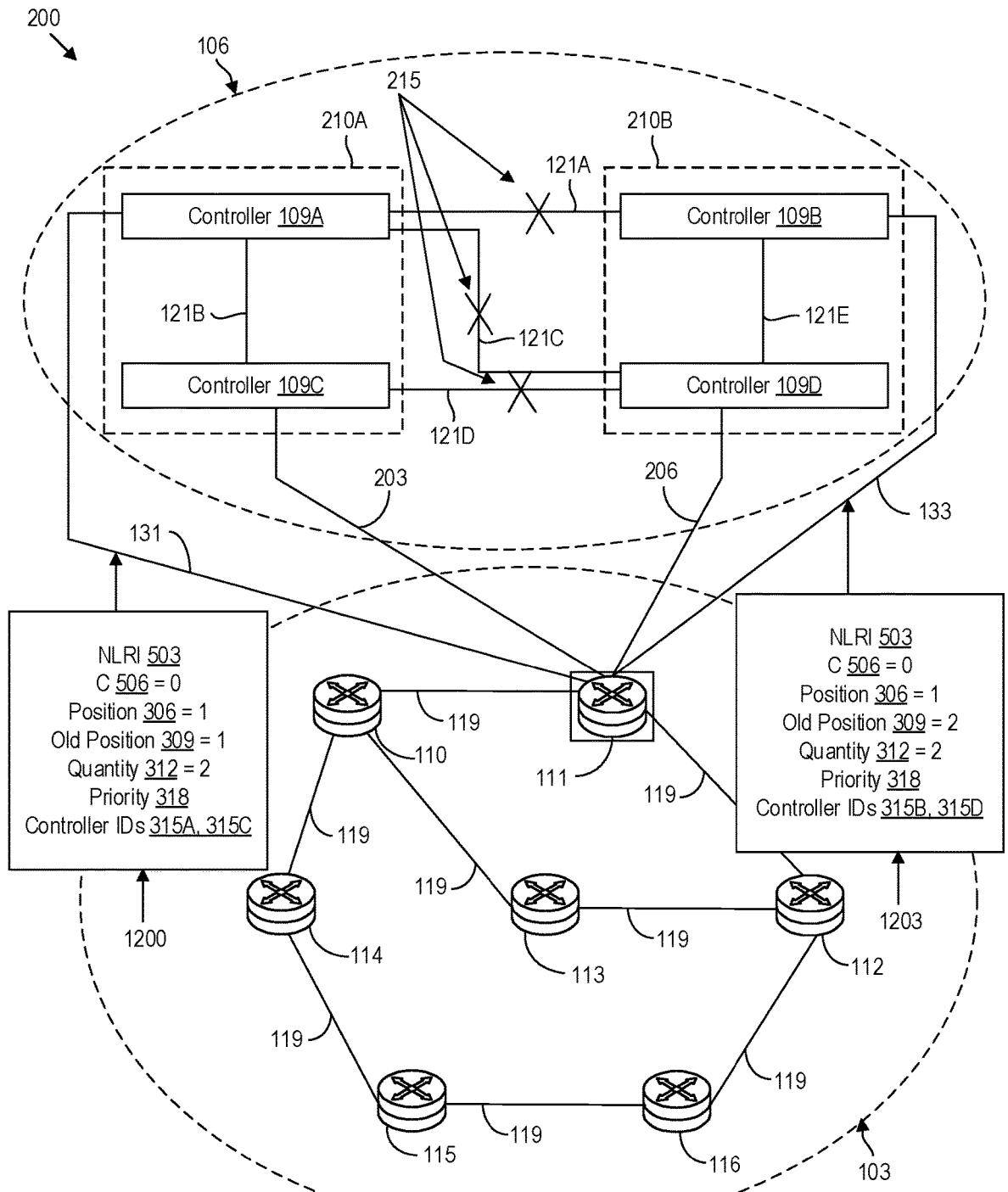
FIGS. 12A-E are diagrams showing BGP messages communicated through the controller cluster network after a failure occurs to a link in the cluster of the controller cluster network according to various embodiments of the disclosure.
Figure 12B:
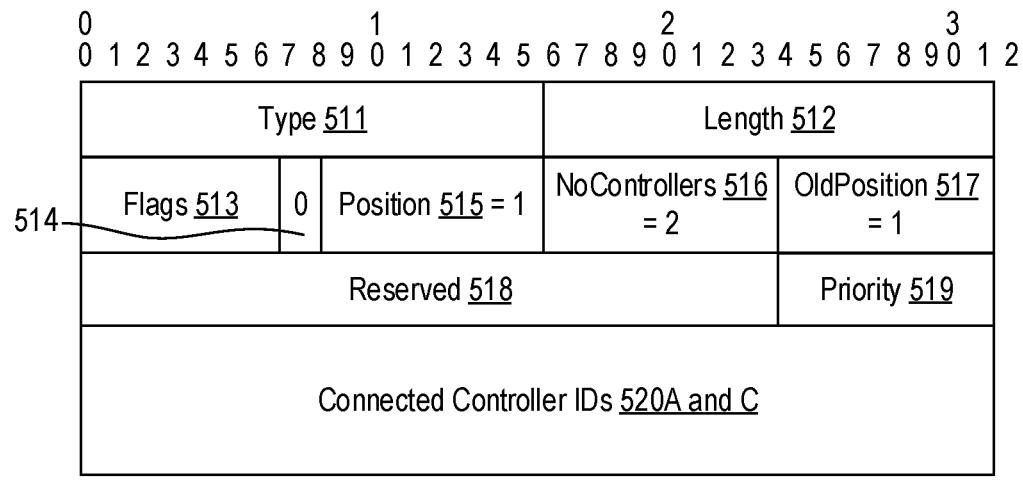
Figure 12C:
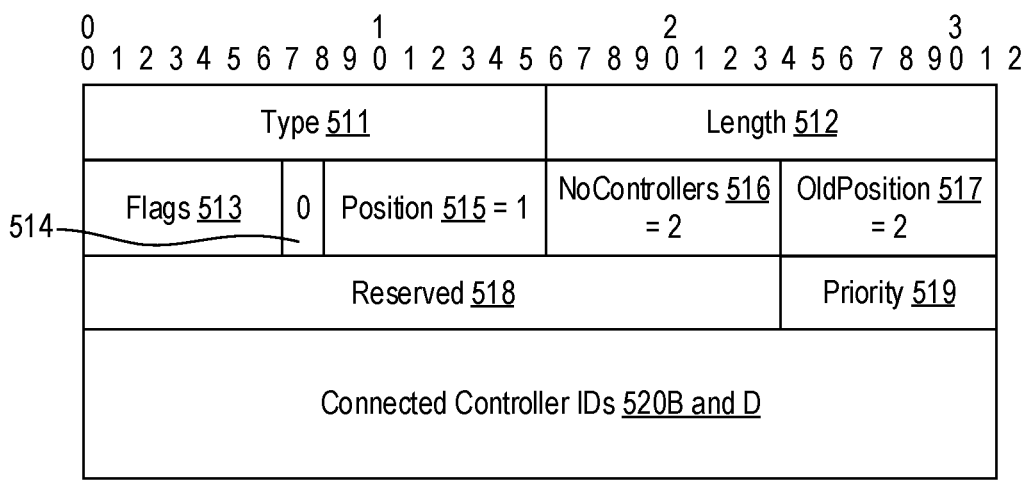
Figure 12D:
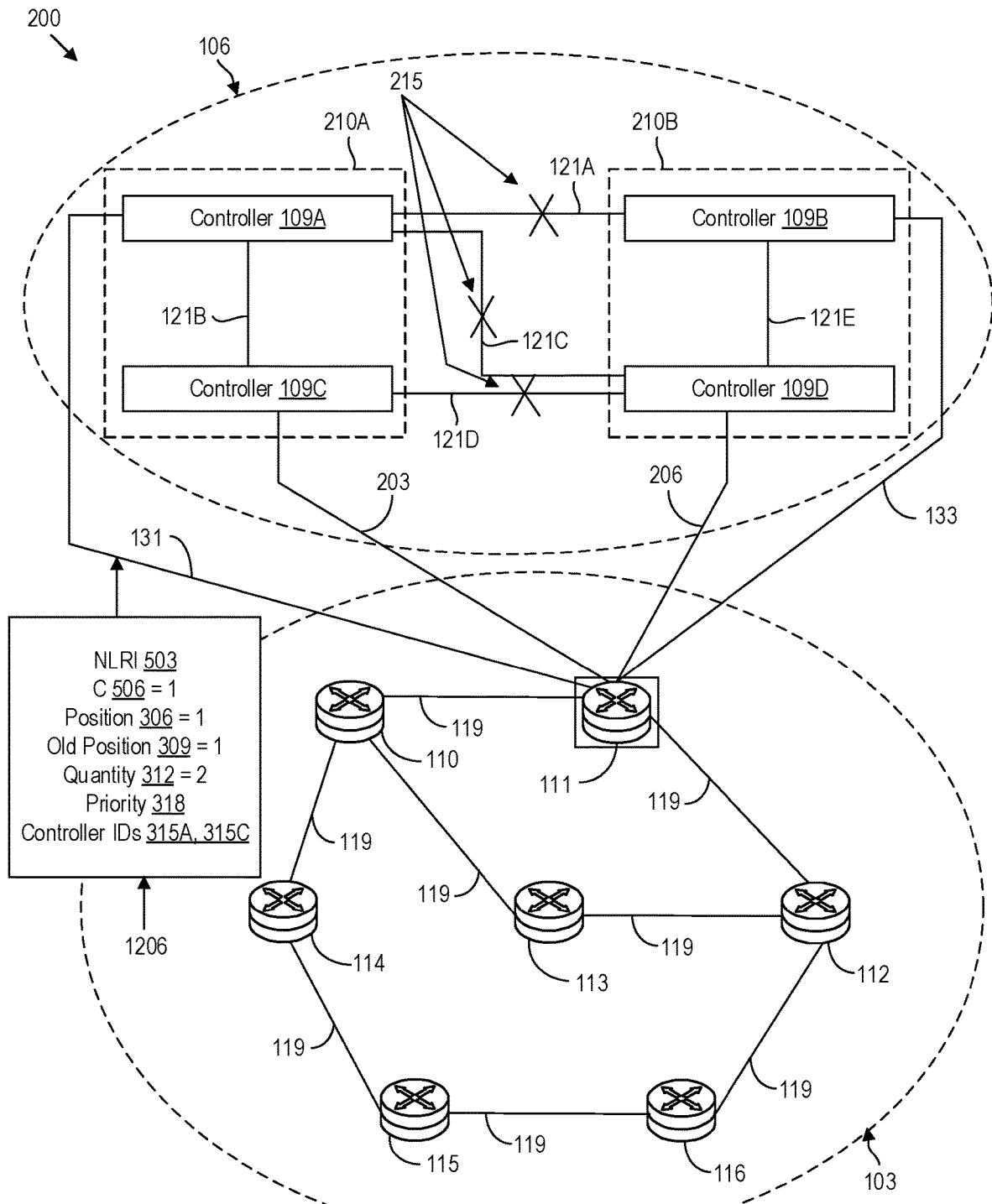
Figure 12E:
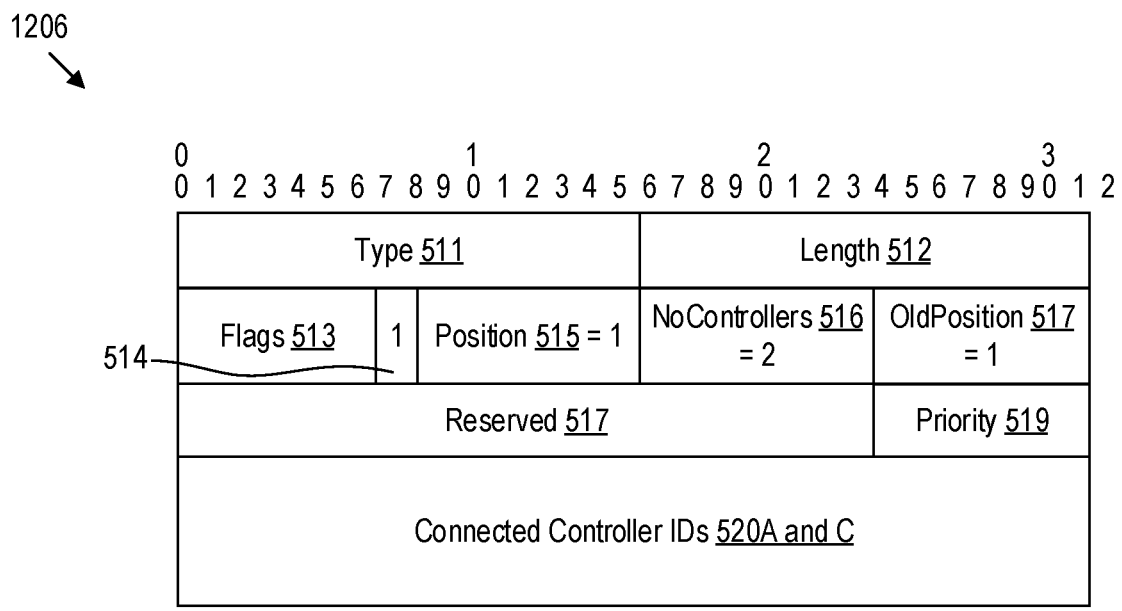

FIGS. 12A-E are diagrams showing BGP messages 140 communicated through the controller cluster network 200 after a failure occurs to each of the links 121A, 121C and 121D in the cluster 106 of the controller cluster network 200 according to various embodiments of the disclosure. In particular, FIG. 12A shows the transmission of BGP messages 140 communicated through the controller cluster network 200 after the failure occurs to the cluster 106. FIGS. 12B-C show TLVs used to encode the BGP messages 140 communicated through the controller cluster network 200 after the failure occurs to the cluster 106. FIG. 12D shows the transmission of a BGP message 140 communicated through the controller cluster network 200 after electing a primary controller of the controller cluster network 200. FIG. 12E shows a TLV used to encode another BGP message 140 communicated through the controller cluster network 200 after electing the primary controller of the controller cluster network 200.

Referring now to FIG. 12A, shown is a diagram illustrating the transmission of BGP messages 1200 and 1203 through the controller cluster network 200 of FIG. 2 according to various embodiments of the disclosure. In FIG. 12A, the BGP messages 1200 and 1203 are sent after controllers 109A and 109B detect the failures 215 occurring at links 121A, 121C, and 121D. After the failures 215 occur, controller 109A and controller 109C are interconnected via link 121B, and controller 109B and controller 109D are interconnected via link 121E. That is, controllers 109A and 109C are no longer connected to either controller 109B or controller 109D, and thus, controllers 109A and 109C cannot detect the presence of controller 109B and controller 109D. Similarly, controllers 109B and 109D are no longer connected to either controller 109A or controller 109C, and thus, controllers 109B and 109D cannot detect the presence of controller 109A and controller 109C. In this way, the remaining interconnected controllers 109A and C and controllers 109B and D form two separate controller groups 210A and 210B, respectively. The controller group 210A includes controller 109A and controller 109C interconnected by link 121B. The controller group 210B includes controller 109B and controller 109D interconnected by link 121E.

In this case, both controller groups 210A-B determine a primary controller within each of the controller groups 210A-B because each controller group 210A-B is unaware of the existence of the other controller group 210A-B. The primary controller in each of the controller groups 210A-B is determined based on the priority 318 of each of the controllers 109A-D in the controller groups 210A-B. The controller 109A-D with the highest priority 318 becomes the primary controller of the controller group 210A-B.

For example, in controller group 210A, controllers 109A has a higher priority than controller 109C. As such, controllers 109A and 109C determine that controller 109A is the primary controller of the group 210A. Similarly, in controller group 210B, controllers 109B has a higher priority than controller 109D. As such, controllers 109B and 109D determine that controller 109B is the primary controller of the group 210B.

In an embodiment, the primary controller 109A of the group 210A is only the controller of the group 210A that generates and sends a BGP message 1200 describing the controllers 109A and 109C in the group 210A. Similarly, the primary controller 109B of the group 210B is only the controller of the group 210B that generates and sends a BGP message 1203 describing the controllers 109B and 109D in the group 210B. In another embodiment, all the controllers 109A-D in each of the groups 210A-B sends a BGP message describing the respective controller 109A-D, the groups 210A-B, and/or the cluster 106. In the example shown in FIG. 12A, only the primary controller 109A and 109B of each group 210A and 210B, respectively, generates and sends the BGP messages 1200 and 1203.

The controller 109A generates the BGP message 1200 after detecting the failures 215 and determining that the controller 109A is the primary controller of the group 210A. The BGP message 1200 may be encoded as a new BGP message 140A or an existing BGP UPDATE message 140B.

The contents of the BGP message 1200 are similar to the contents of the BGP message 1100 sent before the failures 215 occur in the controller cluster network 200, and the fields of the BGP message 1200 are similar to the fields of the BGP message 1100 sent before the failures 215 occur in the controller cluster network 200. However, in the BGP message 1200, the primary controller flag (C) 506 is reset to 0, since a new primary controller of the entire cluster 106 needs to be determined from the controllers 109A-D in the different groups 210A-B of the cluster 106. Further, in the BGP message 1200, the quantity 312 of controllers 109A and 109C in the cluster 106 indicates that there are now two controllers 109A and 109C in the cluster 106, since controller 109A can no longer detect the presence of controllers 109B and 109D. Similarly, the controller IDs 315A-D only indicate a controller ID 315A identifying controller 109A and a controller ID 315C of controller 109C.

The controller 109B generates the BGP message 1203 after detecting the failures 215 and determining that the controller 109B is the primary controller of the group 210B. The BGP message 1203 may be encoded as a new BGP message 140A or an existing BGP UPDATE message 140B.

The contents of the BGP message 1203 are similar to the contents of the BGP message 1200 sent before the failures 215 occur in the controller cluster network 200, and the fields of the BGP message 1203 are similar to the fields of the BGP message 1100 sent before the failures 215 occur in the controller cluster network 200. However, in the BGP message 1203, the quantity 312 of controllers 109B and 109D in the cluster 106 indicates that there are now two controllers 109B and 109D in the cluster 106, since controller 109B can no longer detect the presence of controllers 109A and 109C. Similarly, the controller IDs 315A-D only indicate a controller ID 315B identifying controller 109B and a controller ID 315D of controller 109D.

After generating the BGP message 1200, controller 109A transmits the BGP message 1200 to NE 111 through the enhanced BGP session 131. NE 111 forwards the BGP message 1200 describing the group 210A to the group 210B. NE 111 may forward the BGP message 1200 to only the primary controller 109B of the group 210B through the enhanced BGP session 133. Alternatively, NE 111 may forward the BGP message 1200 to all the controllers 109B and 109D in the group 210B through the enhanced BGP sessions 206 and 133.

Similarly, controller 109B transmits the BGP message 1203 to NE 111 through the enhanced BGP session 133. NE 111 forwards the BGP message 1203 describing the group 210B to the group 210A. NE 111 may forward the BGP message 1203 to only the primary controller 109A of the group 210A through the enhanced BGP session 131. Alternatively, NE 111 may forward the BGP message 1203 to all the controllers 109A and 109C in the group 210A through the enhanced BGP sessions 131 and 203.

In one embodiment, the controller 109B waits a predetermined period of time after sending the BGP message 1203 to determine whether a message is received from the original primary controller 109A. In FIG. 12A, the controller 109B determines that controller 109A is still reachable and available upon receiving the BGP message 1200, and determines that the controller 109A is still the primary controller 109A of the entire controller cluster network 200. In this way, the controller 109B does not mistakenly promote itself to become the primary controller of all the groups 210A-B and the entire controller cluster network 200.

In an embodiment in which a message is not received from the original primary controller 109A in the predetermined period of time, controllers 109B-D determine a new primary controller of all the groups 210A-B and the entire controller cluster network 200 based on the information in BGP messages 1200 and 1203. In one embodiment, controllers 109A-D elect or promote a controller 109A-D as the primary controller of all the groups 210A-B and the entire controller cluster network 200 based on the quantity 312 of controllers 109A-D in each of the groups 210A-B. For example, when group 210A had three controllers while group 210B only had two controllers, controllers 109A-D determine that group 210A is the primary group of the cluster 106. Controllers 109A-D also determine that the primary controller 109A of the primary group 210A is the new primary controller of all the groups 210A-B and the entire controller cluster network 200.

In an embodiment in which the groups 210A-B have the same quantity 312 of controllers 109A-D, the primary controller of all the groups 210A-B and the entire controller cluster network 200 may be selected based on a highest old position 309 among the primary controllers 109A-D of the groups 210A-B. In the example shown in FIG. 12A, the controller 109A has an old position 309 of 1, while the controller 109B has an old position 309 of 2. In this case, the old position 309 of 1 is higher than the old position 309 of 2, and thus, the controllers 109A-D determine that group 210A is the primary group of the cluster 106. Controllers 109A-D also determine that the primary controller 109A of the primary group 210A is the new primary controller of all the groups 210A-B and the entire controller cluster network 200.

In another embodiment in which the groups 210A-B have the same quantity 312 of controllers 109A-D, the primary controller of all the groups 210A-B and the entire controller cluster network 200 may be selected based on a highest priority 318 among the primary controllers 109A-D of the groups 210A-B. In the example shown in FIG. 12A, the controller 109A has the highest priority 318 of the controllers 109A-D in the cluster 106, while the controller 109B has the second highest priority 318 of the controllers 109A-D in the cluster 106. In this case, the controllers 109A-D determine that group 210A is the primary group of the cluster 106. Controllers 109A-D also determine that the primary controller 109A of the primary group 210A is the new primary controller of all the groups 210A-B and the entire controller cluster network 200.

Referring now to FIG. 12B, shown is a TLV of the BGP message 1200 generated by the controller 109A encoded in a format similar to the controllers NLRI field 510 of FIG. 5B. The controller 109A generates and sends the BGP message 1200 after detecting the failures 215 that occurred in the controller cluster network 200.

The TLV of the BGP message 1200 includes the type field 511, the length field 512, the flags 513, the position field 515, the number of controllers field 516, the old position field 517, the reserved bits 518, the priority field 519, and the connected controller IDs field 520A and C. In the TLV of the BGP message 1200, the flags 513 include the C bit 514, which is set to 0 to indicate that the controller 109A is not yet determined as the primary controller of the entire controller cluster network 200. The position field 515 includes the position 306 of the controller 109A, indicating a value of 1. The number of controllers field 516 includes the quantity 312 of controllers 109A and 109B in the group 210A, indicating a value of 2, since controller 109A is no longer connected to controllers 109B and 109D. The old position field 517 includes the old position 309 of the controller 109A, indicating a value of 1. The priority field 519 includes a value indicating that the controller 109A has the highest priority 318 of all the controllers 109A-D in the cluster 106. The connected controller IDs field 520A and C includes the controller ID 315A of controller 109A and the controller ID 315C of controller 109C.

Referring now to FIG. 12C, shown is a TLV of the BGP message 1203 generated by the controller 109B encoded in a format similar to the controllers NLRI field 510. The controller 109B generates and sends the BGP message 1203 after detecting the failures 215 that occurred in the controller cluster network 200.

The TLV of the BGP message 1203 includes the type field 511, the length field 512, the flags 513, the position field 515, the number of controllers field 516, the old position field 517, the reserved bits 518, the priority field 519, and the connected controller IDs field 520B and D. In the TLV of the BGP message 1203, the flags 513 include the C bit 514, which is set to 0 to indicate that the controller 109B is not the primary controller of the entire controller cluster network 200. The position field 515 includes the position 306 of the controller 109B, indicating a value of 1. The number of controllers field 516 includes the quantity 312 of controllers 109B and 109D in group 210B, indicating a value of 2, since controller 109B is no longer connected to controllers 109A and 109C. The old position field 517 includes the old position 309 of the controller 109B, indicating a value of 2. The priority field 519 includes a value indicating that the controller 109B has the second highest priority 318 of all the controller 109A-D in the cluster 106. The connected controller IDs field 520B and D includes the controller IDs 315B of controller 109B, and the controller ID 315D of controller 109D.

Referring now to FIG. 12D, shown is a diagram illustrating the transmission of BGP message 1206 through the controller cluster network 200 of FIG. 2 after controller 109A is elected as the primary controller of the controller cluster network 200. In FIG. 12D, the controllers 109A-D have already exchanged the BGP messages 1203 and 1206, and used the BGP messages 1203 and 1206 to determine that the primary controller 109A is the new primary controller of all the groups 210A-B and the entire controller cluster network 200.

The primary controller 109A generates a BGP message 1206 indicating that the controller 109A is the primary controller of all the groups 210A-B and the entire controller cluster network 200. The BGP message 1206 is substantially similar to BGP message 1203 of FIG. 12A, except that the primary controller flag (C) 506 is set to 1, indicating that the controller 109A is now the primary controller of all the groups 210A-B and the entire controller cluster network 200.

The primary controller 109A transmits the BGP message 1206 to NE 111 through the enhanced BGP session 131. In one embodiment, NE 111 forwards the BGP message 1206 to all the other controllers 109B-D in the cluster 106. In another embodiment, NE 111 only forwards the BGP message 1206 to the primary controller 109B of the other group 210B of the cluster 106. Either way, upon receiving the BGP message 1206 from NE 111, all the controllers 109A-D maintain data indicating that controller 109A is the primary controller of all the groups 210A-B and the entire controller cluster network 200, and that controller 109A is active and reachable.

Referring now to FIG. 12E, shown is a TLV of the BGP message 1206 generated by the controller 109A encoded in a format similar to the controllers NLRI field 510 of FIG. 5B. The controller 109A generates and sends the BGP message 1206 after detecting the failures 215 that occurred in the controller cluster network 200 and the primary controller is determined.

The TLV of the BGP message 1206 includes the type field 511, the length field 512, the flags 513, the position field 515, the number of controllers field 516, the old position field 517, the reserved bits 518, the priority field 519, and the connected controller IDs field 520A and C. In the BGP message 1206, the flags 513 include the C bit 514, which is set to 1 to indicate that the controller 109A has been elected or promoted to be the primary controller of the entire controller cluster network 200. The position field 515 includes the position 306 of the controller 109A, indicating a value of 1. The number of controllers field 516 includes the quantity 312 of controllers 109A and 109B in the cluster group 210B, indicating a value of 2. The old position field 517 includes the old position 309 of the controller 109A, indicating a value of 1. The priority field 519 includes a value indicating that the controller 109A has the highest priority 318 of all the controllers 109A-D in the cluster 106. The connected controller IDs field 520A and C still only includes the controller ID 315A of controller 109A and the controller ID 315C of controller 109C.

Figure 13A:
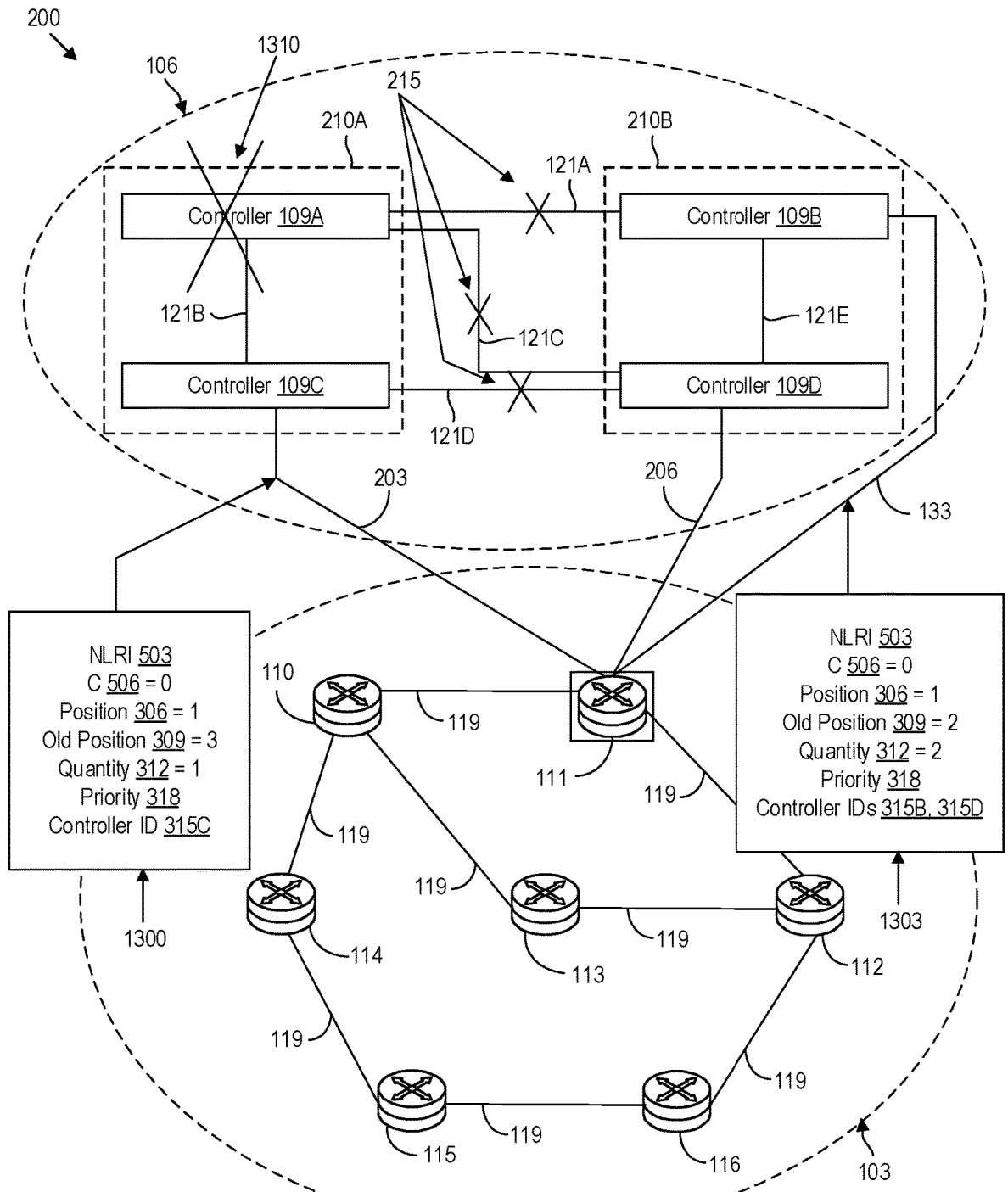
FIGS. 13A-E are diagrams showing BGP messages communicated through the controller cluster network after a failure occurs to a controller in the cluster of the controller cluster network according to various embodiments of the disclosure.
Figure 13B:
Figure 13C:
Figure 13D:
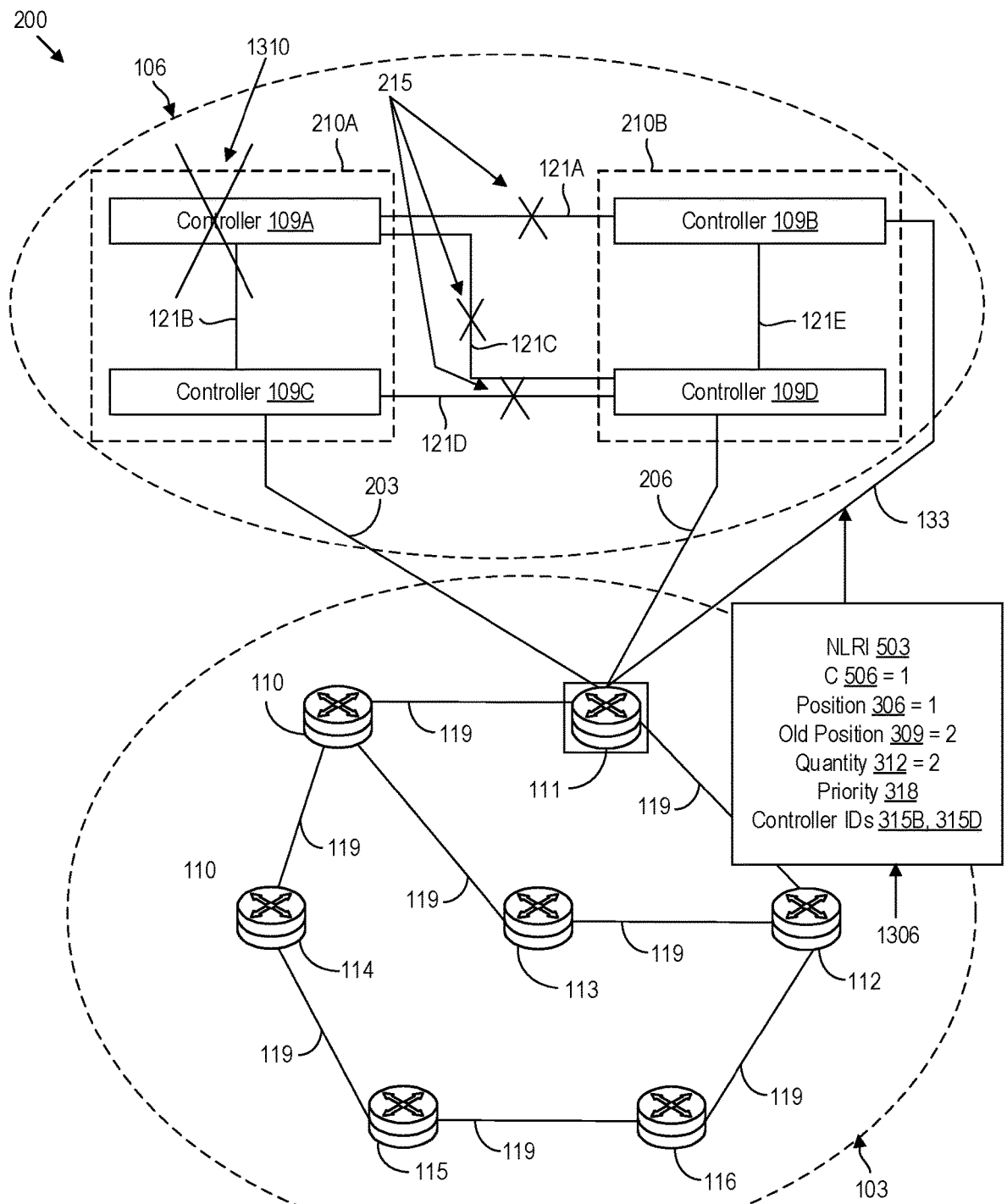

FIGS. 13A-E are diagrams showing BGP messages 140 communicated through the controller cluster network 200 after a failure occurs to the primary controller 109A in the cluster 106 of the controller cluster network 200 according to various embodiments of the disclosure. In particular, FIG. 13A shows the transmission of BGP messages 140 communicated through the controller cluster network 200 after the failure occurs to the primary controller 109A. FIGS. 13B-C show TLVs used to encode the BGP messages 140 communicated through the controller cluster network 200 after the failure occurs to the primary controller 109A. FIG. 13D shows the transmission of a BGP message 140 communicated through the controller cluster network 200 after electing a primary controller of the controller cluster network 200. FIG. 12E shows a TLV used to encode another BGP message 140 communicated through the controller cluster network 200 after electing the primary controller of the controller cluster network 200.

Referring now to FIG. 13A, shown is a diagram illustrating the transmission of BGP messages 1300 and 1303 through the controller cluster network 200 of FIG. 2 according to various embodiments of the disclosure. In FIG. 13A, the BGP messages 1300 and 1303 are sent after controllers 109B, 109C and 109D detect the failures 215 occurring at links 121A, 121C, and 121D and failure 1310 occurring at controller 109A. As described above with reference to FIG. 12A, the failures 215 occurring at links 121A, 121C, and 121D results in the creation of two groups 210A-B of controllers 109A-D. The first group 210A includes controllers 109C. The second group 210B includes controllers 109B and 109D. However, the failure 1310 results in controller 109A no longer being reachable or available to the rest of the controller cluster network 200.

Upon detecting the failures 215 and 1310, controllers 109B and 109D determine a primary controller 109B of the group 210B, in a manner similar to the described above with reference to FIG. 12A. Controller 109C becomes the primary controller of group 210A since controller 109A is no longer available. In an embodiment, controller 109C and 109B generate and transmit BGP messages 1300 and 1303 describing the groups 210A-B and the cluster 106. In another embodiment, all of controllers 109B-D generate and transmit BGP messages describing the groups 210A-B and the cluster 106. In the example shown in FIG. 13A, only controllers 109C and 109B generate and transmit BGP messages 1300 and 1303 describing the groups 210A-B and the cluster 106.

The controller 109C generates the BGP message 1300, which may be encoded as a new BGP message 140A or an existing BGP UPDATE message 140B. The BGP message 1300 includes the controllers NLRI 503 of FIG. 5A. The controllers NLRI 503 of the BGP message 1300 includes the primary controller flag (C) 506 (shown as "C" in FIG. 13A), the position 306, the old position 309, the quantity 312, the priority 318, and the controller ID 315C. The primary controller flag (C) 506 is set to 0, indicating that the controller 109C sending the BGP message 1300 (also referred to herein as the "originating controller 109C") is the not primary controller of the controller cluster network 200. The position 306 is a value of 1, which indicates a first position in the order of priority of the controllers 109A-D that are reachable in the group 210A. That is, since there is only controller 109A in the group 210A, controller 109C moves up to the first position in the order of priority of the controllers 109A-D that are reachable in the group 210A. The old position 309 indicates a value of 3, for example, because the controller 109C had the third position in the order of priority of the controllers 109A-D prior to the failures 215 and 1310 occurring in the controller cluster network 200. The quantity 312 of controllers 109C indicates that there is now only one controller in this group 210A. The priority 318 indicates that controller 109C has the third highest priority 318 in the cluster 106. The controller ID 315C identifies controller 109C.

Controller 109C transmits the BGP message 1300 to NE 111 through the enhanced BGP session 203. NE 111 forwards the BGP message 1300 to the primary controller 109B in the other group 210B, or to all the other controllers 109B and 109D in the cluster 106. Controllers 109B and 109D each determines that controller 109C is still reachable and available upon receiving the BGP message 1300 and updates the status database 124 to include data from the BGP message 1300.

Similarly, controller 109B generates a BGP message 1303, which may be encoded as a new BGP message 140A or an existing BGP UPDATE message 140B. The BGP message 1303 includes the controllers NLRI 503, which includes the primary controller flag (C) 506 (shown as "C" in FIG. 11A), the position 306, the old position 309, the quantity 312, the priority 318, and the controller IDs 315A-D. The primary controller flag (C) 506 is set to 0, indicating that the controller 109B sending the BGP message 1103 is not the primary controller of the controller cluster network 200. The position 306 is a value of 1, which indicates a first position in the order of priority of the controllers group 210B that are reachable in the cluster 106. The old position 309 also indicates a value of 2, for example, because the controller 109B has been the secondary controller 109B since initialization of the cluster 106 with controllers 109A-D. The quantity 312 of controllers 109A-D indicates that there are two controllers 109B and D in the group 210B. The priority 318 indicates that controller 109B has the second highest priority 318 in the cluster 106. The controller IDs 315A-D includes a controller ID 315B identifying controller 109B and a controller ID 315D identifying controller 109D.

Controller 109B transmits the BGP message 1303 to NE 111 through the enhanced BGP session 133. NE 111 forwards the BGP message 1303 to controller 109C in the other group 210A, or to all the other controllers 109C-D in the cluster 106. Controllers 109C-D each determines that controller 109B is still reachable and available upon receiving the BGP message 1303 and updates the status database 124 to include data from the BGP message 1303.

Upon receiving the BGP messages 1300 and 1303, controllers 109B-D determine that the original primary controller 109A is no longer reachable or available. As such, controllers 109B-D determine that a new primary controller needs to be determined from the remaining controllers 109B-D based on the information carried in the BGP messages 1300 and 1303. In one embodiment, controllers 109B-D determine the new primary controller based on the quantity 312 of controllers B-D in each of the groups 210A-B. In the example shown in FIG. 13A, the group 210B has more active controllers 109B and D, than group 210A, which only has one active controller 109C. In this case, controllers 109B-D determine that group 210B is the primary group of the cluster 106. Controllers 109B-D also determine that the primary controller 109B of the primary group 210B is the new primary controller of all the groups 210A-B and the entire controller cluster network 200 based on the information in BGP messages 1300 and 1303. As described above, the primary controller of all the groups 210A-B and the entire controller cluster network 200 may otherwise be determined based on the old position 309 or priority 318 carried in the BGP messages 1300 and 1303.

Referring now to FIG. 13B, shown is a TLV of the BGP message 1300 generated by the controller 109C encoded in a format similar to the controllers NLRI field 510 of FIG. 5B. The controller 109C generates and sends the BGP message 1300 after detecting the failures 215 and 1310 that occurred in the controller cluster network 200.

The TLV of the BGP message 1300 includes the type field 511, the length field 512, the flags 513, the position field 515, the number of controllers field 516, the old position field 517, the reserved bits 518, the priority field 519, and the connected controller ID field 520C. In the TLV of the BGP message 1200, the flags 513 include the C bit 514, which is set to 0 to indicate that the controller 109C is not the primary controller of the entire controller cluster network 200. The position field 515 includes the position 306 of the controller 109C, indicating a value of 1. The number of controllers field 516 includes the quantity 312 of controllers in the group 210A, indicating a value of 1. The old position field 517 includes the old position 309 of the controller 109C, indicating a value of 3. The priority field 519 includes a value indicating that the controller 109C has the third highest priority 318 of all the controllers 109A-D in the cluster 106. The connected controller ID field 520C includes only the controller ID 315C of controller 109C.

Referring now to FIG. 13C, shown is a TLV of the BGP message 1303 generated by the controller 109B encoded in a format similar to the controllers NLRI field 510. The controller 109B generates and sends the BGP message 1303 after detecting the failures 215 and failure 1310 that occurred in the controller cluster network 200.

The TLV of the BGP message 1303 includes the type field 511, the length field 512, the flags 513, the position field 515, the number of controllers field 516, the old position field 517, the reserved bits 518, the priority field 519, and the connected controller IDs field 520B and D. In the TLV of the BGP message 1303, the flags 513 include the C bit 514, which is set to 0 to indicate that the controller 109B is not the primary controller of the entire controller cluster network 200. The position field 515 includes the position 306 of the controller 109B, indicating a value of 1. The number of controllers field 516 includes the quantity 312 of controllers 109B and 109D in group 210B, indicating a value of 2. The old position field 517 includes the old position 309 of the controller 109B, indicating a value of 2. The priority field 519 includes a value indicating that the controller 109B has the second highest priority 318 of all the controller 109A-D in the cluster 106. The connected controller ID field 520B and D includes the controller IDs 315B of controller 109B, and the controller ID 315D of controller 109D.

Referring now to FIG. 13D, shown is a diagram illustrating the transmission of BGP message 1306 through the controller cluster network 200 of FIG. 2. In FIG. 13D, the controllers 109B-D have determined that the primary controller 109B is the new primary controller of all the groups 210A-B and the entire controller cluster network 200.

The primary controller 109B generates a BGP message 1306 indicating that the controller 109B is the primary controller of all the groups 210A-B and the entire controller cluster network 200. The BGP message 1306 is substantially similar to BGP message 1303 of FIG. 13A, except that the primary controller flag (C) 506 is set to 1, indicating that the controller 109B is now the primary controller of all the groups 210A-B and the entire controller cluster network 200.

The primary controller 109B transmits the BGP message 1306 to NE 111 through the enhanced BGP session 133. In one embodiment, NE 111 forwards the BGP message 1306 to all the other controllers 109C-D in the cluster 106. In another embodiment, NE 111 only forwards the BGP message 1306, to the primary controller 109C of the other group 210A of the cluster 106. Either way, upon receiving the BGP message 1306 from NE 111, all the controllers 109B-D maintain data indicating that controller 109B is the primary controller of all the groups 210A-B and the entire controller cluster network 200, and that controller 109B is active and reachable.

Figure 13E:
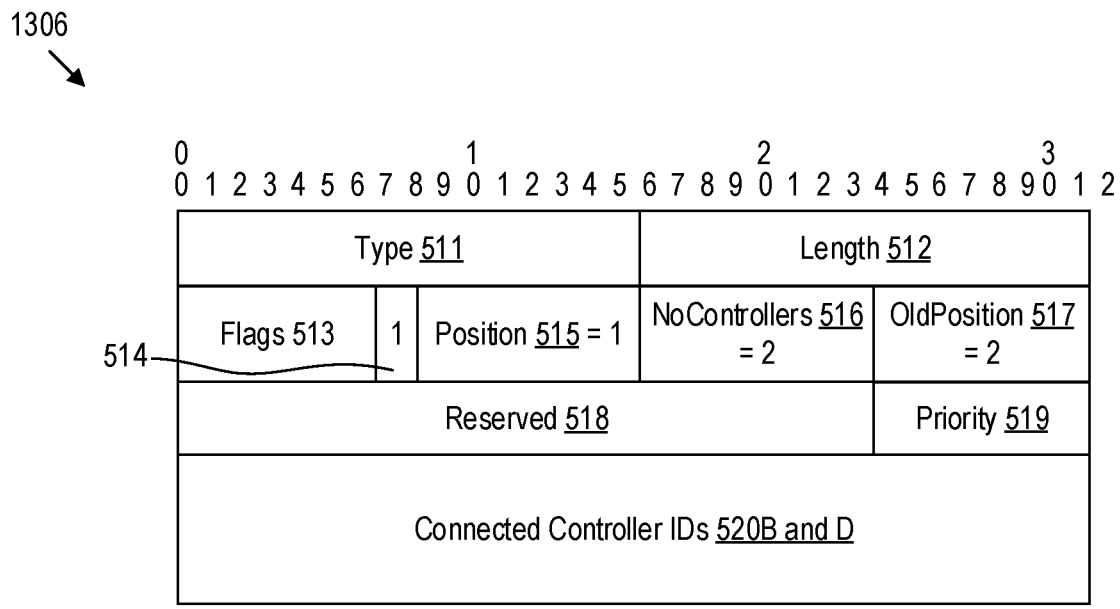

Referring now to FIG. 13E, shown is a TLV of the BGP message 1306 generated by the controller 109B encoded in a format similar to the controllers NLRI field 510 of FIG. 5B. The controller 109B generates and sends the BGP message 1306 after detecting the failures 215 and 1310 that occurred in the controller cluster network 200.

The TLV of the BGP message 1306 includes the type field 511, the length field 512, the flags 513, the position field 515, the number of controllers field 516, the old position field 517, the reserved bits 518, the priority field 519, and the connected controller IDs field 520B and D. In the TLV of the BGP message 1306, the flags 513 include the C bit 514, which is set to 1 to indicate that the controller 109B has been elected or promoted to be the primary controller of the entire controller cluster network 200. The position field 515 includes the position 306 of the controller 109A, indicating a value of 1. The number of controllers field 516 includes the quantity 312 of controllers 109B and D in the cluster group 210B, indicating a value of 2. The old position field 517 includes the old position 309 of the controller 109B, indicating a value of 2. The priority field 519 includes a value indicating that the controller 109B has the second highest priority 318 of all the controllers 109A-D in the cluster 106. The connected controller IDs field 520B and D still only includes the controller ID 315B of controller 109B and the controller ID 315D of controller 109D.

Figure 14:
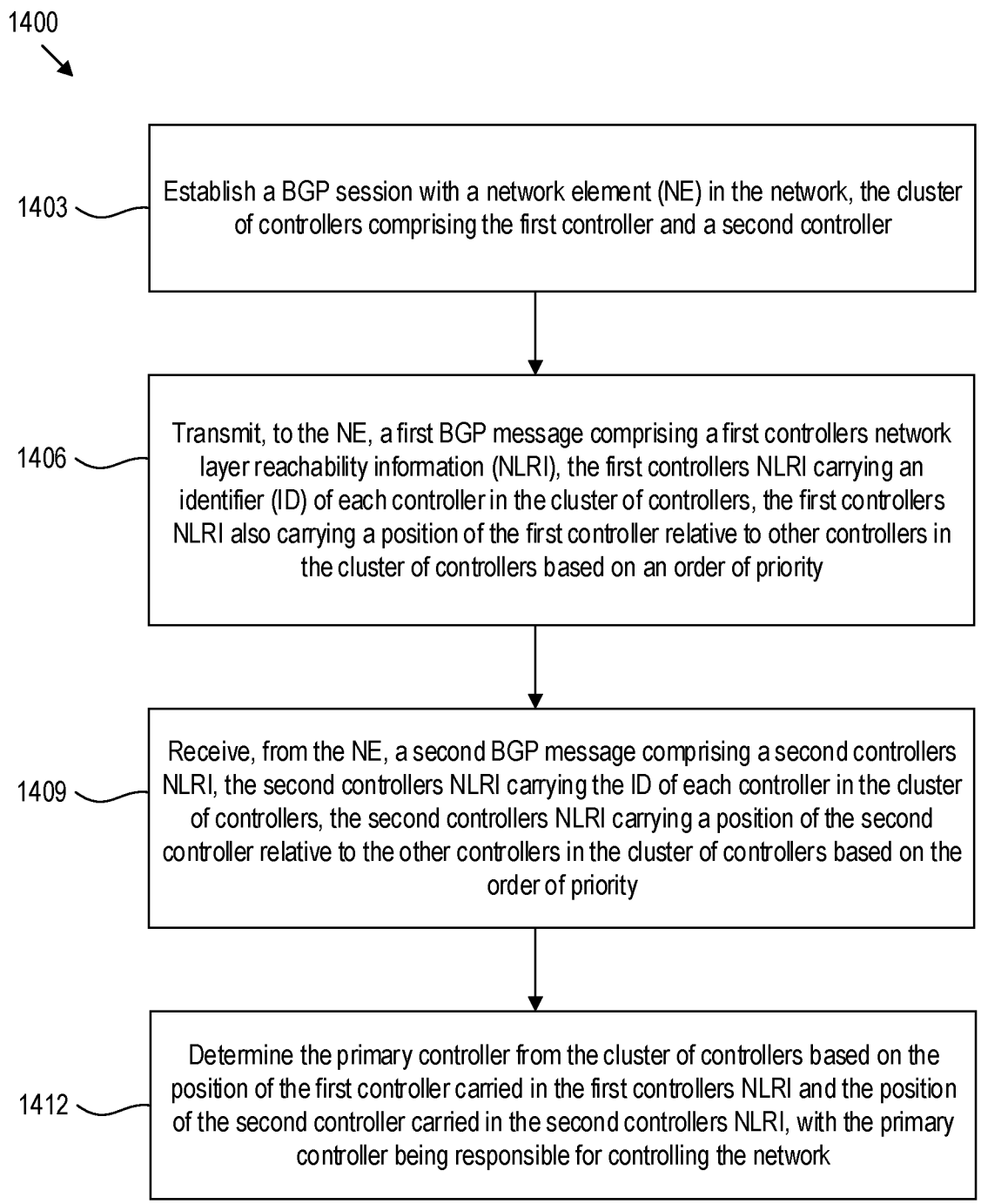
FIG. 14 is a flowchart illustrating a method performed by a controller to implement BGP for network HA according to various embodiments of the disclosure.

FIG. 14 is a flowchart illustrating a method 1400 performed by a first controller 109A-D to implement BGP for network HA according to various embodiments of the disclosure. Method 1400 is implemented by a first controller 109A-D (referred to hereinafter as "first controller") in the controllers cluster network 100 or 200 (referred to herein after "network"). The first controller implements method 1400 after being connected to one or more NEs 110-116.

At step 1403, the first controller establishes a BGP session with an NE 110-111 (referred to hereinafter as "NE") in the network. The first controller is included in a cluster 106, which includes at least two controllers. The BGP session may be an enhanced BGP session in which BGP messages with extensions may be communicated. In an embodiment, messages encoded according to FIGS. 4-7 may be communicated through the BGP session.

At step 1406, the controller transmits, to the NE a first BGP message 140, 800, 803, 900, 903, 1000, 1003, 1006, 1100, 1103, 1200, 1203, 1206, 1300, 1303, or 1306 (hereinafter referred to as "BGP message"). The first BGP message comprises a first controllers NLRI 503 indicating a status of the first controller. The first controllers NLRI 503 carries a controller ID 513 for each controller in the cluster 106. The first controllers NLRI 504 also carries a position 306 of the controller relative to other controllers in the cluster 106 based on an order of priority.

At step 1409, the controller receives, from the NE, a second BGP message. The second BGP message comprises a second controllers NLRI 503 indicating a status of a second controller in the cluster 106. The first BGP message comprises a first controllers NLRI 503 indicating a status of the first controller. The second controllers NLRI 503 carries a controller ID 513 for each controller in the cluster 106. The second controllers NLRI 503 also carries a position 306 of a second controller relative to other controllers in the cluster 106 based on the order of priority.

At step 1412, the controller uses the first controllers NLRI 503 and the second controllers NLRI 503 to determine a primary controller from the cluster 106 of controllers. For example, the controller determines the primary controller based on the position 306 of the controller carried in the first controllers NLRI 503 and the position 306 of the second controller carried in the second controllers NLRI 503. The primary controller is responsible for controlling the network.

Figure 15:
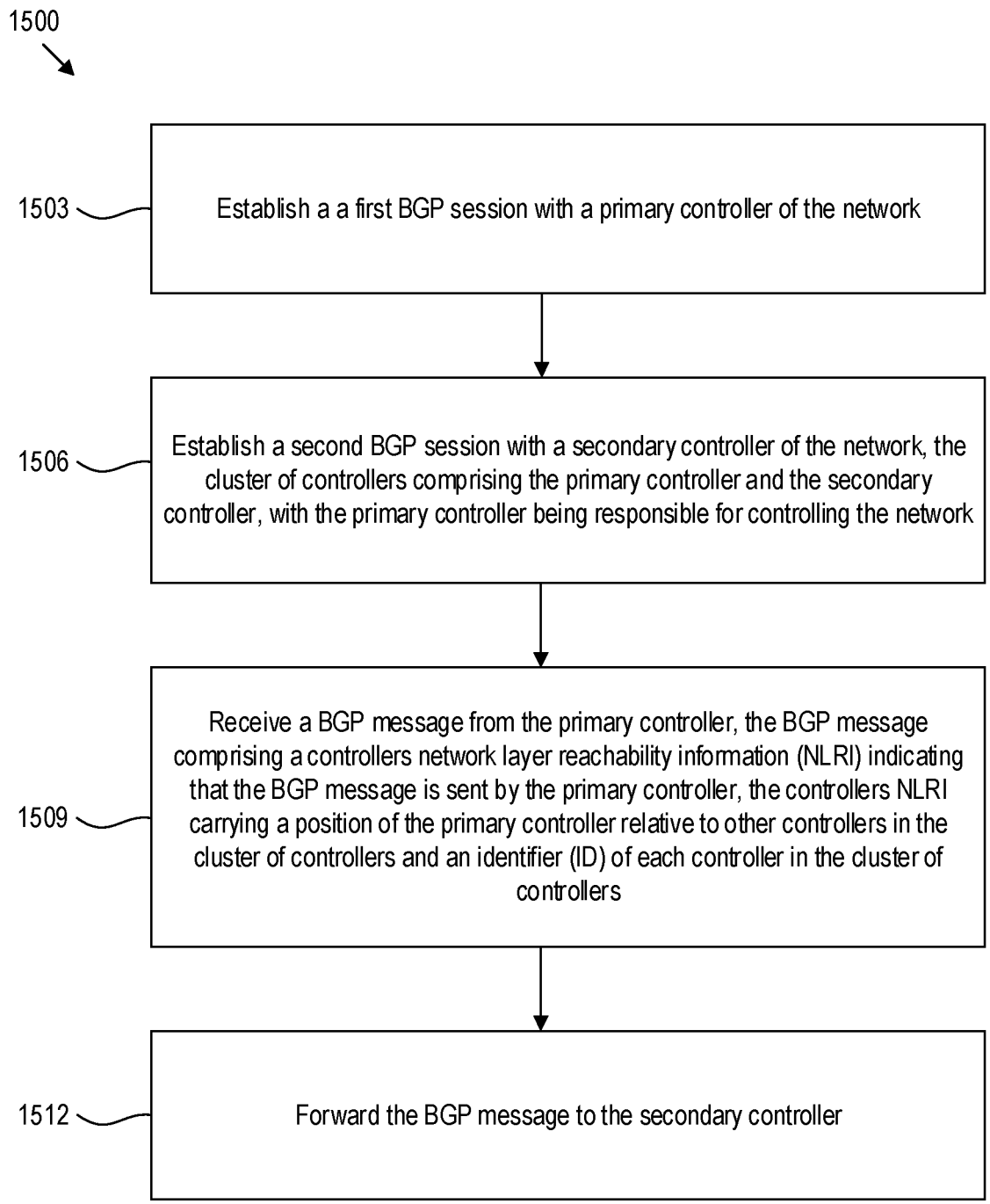
FIG. 15 is a flowchart illustrating a method performed by an NE to implement BGP for network HA according to various embodiments of the disclosure.

FIG. 15 is a flowchart illustrating a method 1500 performed by an NE 110-111 to implement BGP for network HA according to various embodiments of the disclosure. The method 1500 is performed by one of NEs 110-111 (hereinafter referred to as "NE") after being connected to one or more controllers in the cluster 106 of the network.

At step 1503, the NE establishes a first BGP session with a primary controller of the network. The BGP session may be an enhanced BGP session in which BGP messages with extensions may be communicated. In an embodiment, messages encoded according to FIGS. 4-7 may be communicated through the BGP session.

At step 1506, the NE establishes a second BGP session with a secondary controller of the network. For example, the primary controller is controller 109A of the cluster 106, and the secondary controller is controller 109B of the cluster 106. The cluster 106 includes at least two controllers. The primary controller is responsible for controlling the network.

At step 1509, the NE receives a BGP message from the primary controller. The BGP message comprises a controllers NLRI 503 indicating that the BGP message is sent by the primary controller. The controllers NLRI 503 also carries a position of the primary controller relative to other controllers in the cluster 106, and a controller ID 315A-N of each controller in the cluster 106. At step 1512, the NE forwards the BGP message to the secondary controller in the cluster 106.

Figure 16:
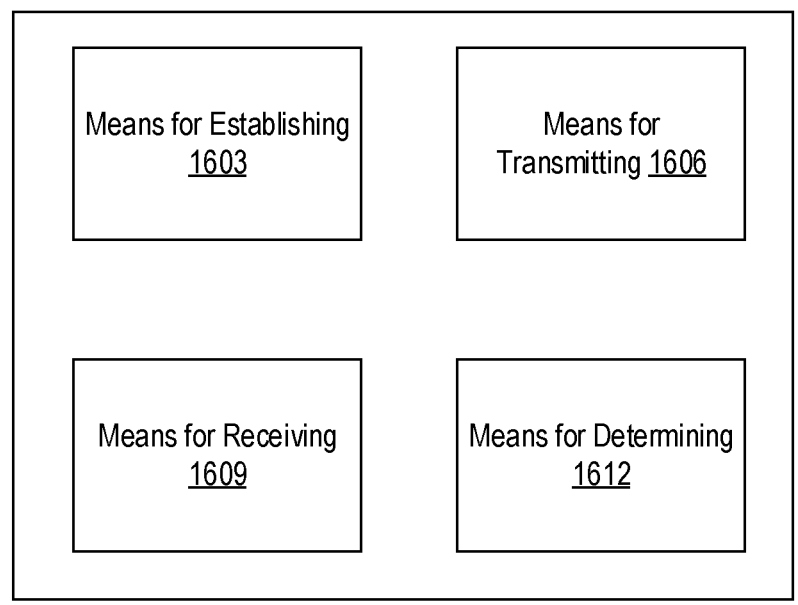
FIG. 16 is a diagram illustrating an apparatus implemented as a controller configured to perform BGP for network HA according to various embodiments of the disclosure.

FIG. 16 is a diagram illustrating an apparatus 1600 implemented as a controller to implement BGP for network HA according to various embodiments of the disclosure. Apparatus 1600 includes a means for establishing 1603, a means for transmitting 1606, a means for receiving 1609, and a means for determining 1612. The means for establishing 1603 comprises a means for establishing a BGP session with an NE in the network, in which a cluster 106 includes a first controller and a second controller. The means for transmitting 1606 comprises a means for transmitting, to an NE, a first BGP message comprising a first controllers NLRI indicating a status of the first controller. The means for receiving 1609 includes a means for receiving, from the NE, a second BGP message comprising a second controllers NLRI indicating a status of the second controller. The means for determining 1612 includes a means for determining the primary controller based on the first controllers NLRI and the second controllers NLRI, in which the primary controller is responsible for controlling the network.

Figure 17:
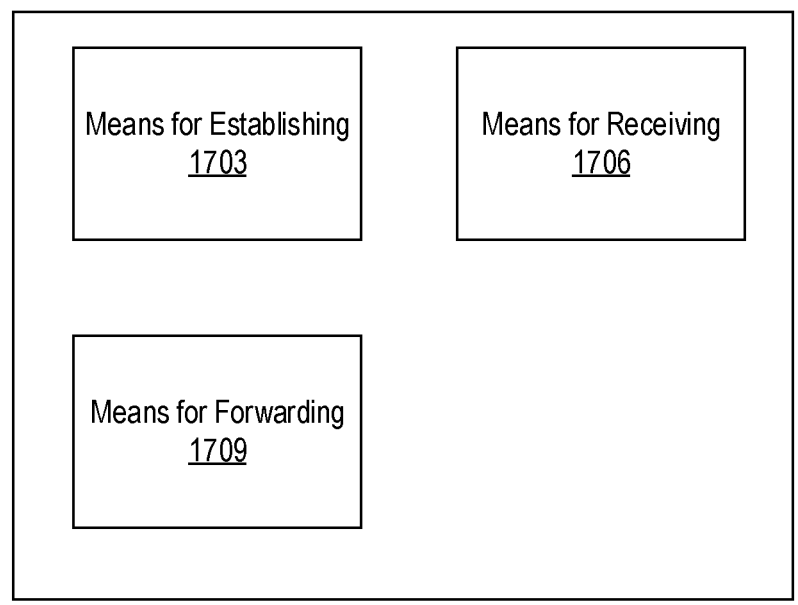
FIG. 17 is a diagram illustrating an apparatus implemented as an NE configured to perform BGP for network HA according to various embodiments of the disclosure.

FIG. 17 is a diagram illustrating an apparatus 1700 implemented as an NE to implement BGP for network HA according to various embodiments of the disclosure. Apparatus 1700 includes a means for establishing 1702, a means for receiving 1706, and a means for forwarding 1709. The means for establishing 1703 comprises a means for establishing a first BGP session with a primary controller of the network and establishing a second BGP session with a secondary controller of the network, in which the cluster 106 comprises a primary controller and a secondary controller, and the primary controller is responsible for controlling the network. The means for receiving 1706 comprises a means for receiving a BGP message from the primary controller, indicating that the BGP message is sent by the primary controller, and comprising a position 306 of the primary controller relative to other controllers in the cluster 106, and controller IDs 315 for each of the controllers in the cluster 106. The means for forwarding 1709 comprises a means for forwarding the BGP message to the secondary controller.

What is claimed is:

1. A method implemented by a first controller in a network comprising a cluster of controllers including the first controller and a second controller, the method comprising:
    establishing a border gateway protocol (BGP) session with a network element (NE) in the network;
    transmitting, to the NE, a first BGP message comprising a first controllers network layer reachability information (NLRI), the first controllers NLRI carrying an identifier (ID) of each controller in the cluster of controllers, the first controllers NLRI also carrying a position of the first controller relative to other controllers in the cluster of controllers based on an order of priority;
    receiving, from the NE, a second BGP message comprising a second controllers NLRI, the second controllers NLRI carrying the ID of each controller in the cluster of controllers, the second controllers NLRI carrying a position of the second controller relative to other controllers in the cluster of controllers based on the order of priority; and
    determining a primary controller from the cluster of controllers based on the position of the first controller carried in the first controllers NLRI and the position of the second controller carried in the second controllers NLRI, with the primary controller being responsible for controlling the network.

2. The method of claim 1, wherein the first BGP message comprises at least one of:
    a flag indicating whether the first controller is the primary controller of the network,
    the position of the first controller,
    an old position of the first controller,
    a quantity of controllers in the cluster of controllers, and
    a priority of the first controller relative to other controllers in the cluster of controllers.

3. The method of claim 1, wherein the second BGP message comprises at least one of a second flag indicating whether:
    the second controller is the primary controller of the network,
    the position of the second controller,
    an old position of the second controller,
    a quantity of controllers in the cluster of controllers, and
    a priority of the second controller relative to other controllers in the cluster of controllers.

4. The method of claim 1, wherein establishing the BGP session with the NE comprises:
    establishing a plurality of BGP sessions with a plurality of NEs in the network to create a plurality of control channels, the plurality of NEs including the NE; and
    establishing a BGP with extensions session with the NE to create an information channel.

5. The method of claim 1, wherein establishing the BGP session with the NE comprises:
    sending, to the NE, a first OPEN message with a high availability support capability triple, the high availability support capability triple comprising a flag indicating that the first controller is a controller; and
    receiving, from the NE, a second OPEN message with a high availability support capability triple, the high availability support capability triple comprising a flag indicating that the NE is a node in the network,
    wherein the high availability support capability triple in the first OPEN message is carried in an optional parameter of the first OPEN message, and wherein the high availability support capability triple in the second OPEN message is carried in an optional parameter of the second OPEN message.

6. The method of claim 1, wherein the first BGP message comprises a first controllers address family identifier (AFI), a first controllers sub-address family identifier (SAFI), and the first controllers NLRI, wherein the second BGP message comprises a second controllers AFI, a second controllers SAFI, and the second controllers NLRI.

7. The method of claim 1, wherein the first BGP message is encoded as a BGP UPDATE, wherein the first controllers NLRI is carried in a first path attributes field of the first BGP message, wherein the second BGP message is encoded as a BGP UPDATE, and wherein the second controllers NLRI is carried in a second path attributes field of the second BGP message.

8. The method of claim 1, wherein the method further comprises:
   determining whether the second controller has failed in response to receiving an indication that the second controller has failed from the NE or in response to determining that a BGP message has not been received from the second controller for a predetermined period of time;
   electing the first controller to be the primary controller of the network in response to the second controller having failed; and
   sending, to the NE, a third BGP message comprising a third controllers NLRI indicating that the first controller is the primary controller of the network.

9. The method of claim 1, wherein the cluster of controllers comprises a plurality of controllers including the first controller and the second controller, and wherein the method further comprises:
   determining that at least one failure has occurred within the cluster of controllers to create a first group of controllers and a second group of controllers within the cluster of controllers; and
   determining that the first controller is coupled to the first group of controllers excluding the second controller, the second controller being coupled to the second group of controllers excluding the first controller.

10. A method implemented by a network element (NE) in a network comprising a cluster of controllers, the method comprising:
    establishing a first border gateway protocol (BGP) session with a primary controller of the network;
    establishing a second BGP session with a secondary controller of the network, the cluster of controllers comprising the primary controller and the secondary controller, with the primary controller being responsible for controlling the network;
    receiving a BGP message from the primary controller, the BGP message comprising a controllers network layer reachability information (NLRI) indicating that the BGP message is sent by the primary controller, the controllers NLRI carrying a position of the primary controller relative to other controllers in the cluster of controllers and an identifier (ID) of each controller in the cluster of controllers; and
    forwarding the BGP message to the secondary controller.

11. The method of claim 10, wherein the BGP message comprises at least one of:
    a flag indicating that the primary controller controls the network,
    the position of the primary controller relative to other controllers in the cluster of controllers,
    an old position of the primary controller, a quantity of controllers in the cluster of controllers, and
    a priority of the primary controller relative to other controllers in the cluster of controllers.

12. The method of claim 10, wherein establishing the first BGP session with the primary controller comprises:
    sending, to the primary controller, a first OPEN message with a high availability support capability triple, the high availability support capability triple comprising a flag indicating that the NE is a node in the network; and
    receiving, from the primary controller, a second OPEN message with a high availability support capability triple, the high availability support capability triple comprising a flag indicating that the primary controller is a controller in the network.

13. The method of claim 12, wherein the high availability support capability triple in the first OPEN message is carried in an optional parameter of the first OPEN message, and wherein the high availability support capability triple in the second OPEN message is carried in an optional parameter of the second OPEN message.

14. The method of claim 10, further comprising:
    detecting a failure of the primary controller; and
    sending a second BGP message comprising a third controllers NLRI indicating that the primary controller has failed to the secondary controller, the second BGP message instructing the secondary controller to withdraw information regarding the primary controller from a status database.

15. A first controller implemented in a network comprising a cluster of controllers including the first controller and a second controller, the first controller comprising:
    a memory configured to store instructions; and
    a processor coupled the memory and configured to execute the instructions, which cause the first controller to be configured to:
      establish a border gateway protocol (BGP) session with a network element (NE) in the network;
      transmit, to the NE, a first BGP message comprising a first controllers network layer reachability information (NLRI), the first controllers NLRI carrying an identifier (ID) of each controller in the cluster of controllers, the first controllers NLRI also carrying a position of the first controller relative to other controllers in the cluster of controllers based on an order of priority;
      receive, from the NE, a second BGP message comprising a second controllers NLRI, the second controllers NLRI carrying the ID of each controller in the cluster of controllers, the second controllers NLRI carrying a position of the second controller relative to other controllers in the cluster of controllers based on the order of priority; and
      determine a primary controller from the cluster of controllers based on the position of the first controller carried in the first controllers NLRI and the position of the second controller carried in the second controllers NLRI, with the primary controller being responsible for controlling the network.

16. The first controller of claim 15, wherein the cluster of controllers comprises a plurality of controllers including the first controller and the second controller, and wherein the instructions further cause the first controller to be configured to:
    determine that at least one failure has occurred within the cluster of controllers to create a first group of controllers and a second group of controllers within the cluster of controllers; and
    determine that the first controller is coupled to the first group of controllers excluding the second controller, the second controller being coupled to the second group of controllers excluding the first controller.

17. The first controller of claim 16, wherein the first group of controllers has a first quantity of controllers, wherein the second group of controllers has a second quantity of controllers, and wherein the instructions further cause the first controller to be configured to:
    determine that the first controller from the first group of controllers is an intent primary controller of the first group of controllers based on an old position of the first controller or a priority of the first controller relative to other controllers in the first group of controllers;

send a third BGP message indicating a status of the first group of controllers to the NE, the third BGP message comprising a quantity of controllers in the first group of controllers, the old position of the first controller, and the priority of the first controller; and receive a fourth BGP message indicating a status of the second group of controllers from the NE, the fourth BGP message indicating that the second controller is an intent primary controller of the second group of controllers, the fourth BGP message comprising a quantity of controllers in the second group of controllers, an old position of the second controller, and a priority of the second controller relative to other controllers in the second group of controllers, wherein the instructions further cause the first controller to be configured to elect the first controller to be the primary controller of the network based on a quantity of controllers in each of the first group of controllers and the second group of controllers, a highest old position of the first controller or the second controller, or a highest priority of the first controller or the second controller.

18. A network element (NE) implemented a network comprising a cluster of controllers, the NE comprising:
a memory configured to store instructions; and
a processor coupled to the memory and configured to execute the instructions, which cause the NE to be configured to:
establish a first border gateway protocol (BGP) session with a primary controller of the network;
establish a second BGP session with a secondary controller of the network, the cluster of controllers comprising the primary controller and the secondary controller, with the primary controller being responsible for controlling the network;
receive a BGP message from the primary controller, the BGP message comprising a controllers network layer reachability information (NLRI) indicating that the BGP message is sent by the primary controller, the controllers NLRI carrying a position of the primary controller relative to other controllers in the cluster of controllers and an identifier (ID) of each controller in the cluster of controllers; and
forward the BGP message to the secondary controller.

19. The NE of claim 18, wherein the BGP message comprises at least one of:
a flag indicating that the primary controller controls the network,
the position of the primary controller relative to other controllers in the cluster of controllers, an old position of the primary controller,
a quantity of controllers in the cluster of controllers, and
a priority of the primary controller relative to other controllers in the cluster of controllers.

20. The NE of claim 18, wherein the instructions further cause the NE to be configured to:
send, to the primary controller, a first OPEN message with a high availability support capability triple, the high availability support capability triple comprising a flag indicating that the NE is a node in the network; and
receive, from the primary controller, a second OPEN message with a high availability support capability triple, the high availability support capability triple comprising a flag indicating that the primary controller is a controller in the network.

* * * * *